US011025928B2

(12) United States Patent
Suehring et al.

(10) Patent No.: US 11,025,928 B2
(45) Date of Patent: *Jun. 1, 2021

(54) EFFICIENT SCALABLE CODING CONCEPT

(71) Applicant: GE Video Compression, LLC, Albany, NY (US)

(72) Inventors: Karsten Suehring, Berlin (DE); Thomas Schierl, Berlin (DE); Valeri George, Berlin (DE); Detlev Marpe, Berlin (DE); Robert Skupin, Berlin (DE)

(73) Assignee: GE Video Compression, LLC, Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,632

(22) Filed: Feb. 20, 2020

(65) Prior Publication Data

US 2020/0195939 A1 Jun. 18, 2020

Related U.S. Application Data

(63) Continuation of application No. 16/123,184, filed on Sep. 6, 2018, now Pat. No. 10,609,396, which is a (Continued)

(51) Int. Cl.
*H04N 19/187* (2014.01)
*H04N 19/70* (2014.01)
(Continued)

(52) U.S. Cl.
CPC ......... *H04N 19/187* (2014.11); *H04N 19/102* (2014.11); *H04N 19/119* (2014.11);
(Continued)

(58) Field of Classification Search
CPC .. H04N 19/187; H04N 19/102; H04N 19/119; H04N 19/12; H04N 19/139;
(Continued)

(56) References Cited

U.S. PATENT DOCUMENTS

2007/0206673 A1 9/2007 Cipolli et al.
2008/0007438 A1 1/2008 Segall et al.
(Continued)

FOREIGN PATENT DOCUMENTS

CN 101529911 A 9/2009
CN 101627634 A 1/2010
(Continued)

OTHER PUBLICATIONS

Segall et al. ("Spatial Scalability Within the H.264/AVC Scalable Video Coding Extension," in IEEE Transactions on Circuits and Systems for Video Technology, vol. 17, No. 9, pp. 1121-1135, Sep. 2007, doi: 10.1109/TCSVT.2007.906824.) (Year: 2007).*
(Continued)

*Primary Examiner* — Maria E Vazquez Colon
(74) *Attorney, Agent, or Firm* — Morgan, Lewis & Bockius LLP

(57) ABSTRACT

Scalable coding concepts are described. One aspect improves parallel decoding of inter-dependent layers of a multi-layer video data stream by introducing a long-term syntax element structure for guaranteeing that during a predetermined time period the pictures of the dependent layer are subdivided so that borders of the spatial segments of the pictures of the second layer and the spatial segments of the first layer overlay. Another aspect concerns upsampling from base layer to enhancement layer. Another aspect introduces a long-term syntax element structure allowing the decoder to determine the inter-layer offset for a predetermined time period. Another aspect introduces a type indicator field changing a way a layer indicator field within the NAL unit headers is to be interpreted. Another aspect allows different codecs/standards to be used for the different layers. Another aspect concerns a syntax element structure which
(Continued)

indicates the inter-layer offset in units of the base layer blocks.

20 Claims, 34 Drawing Sheets

Related U.S. Application Data continuation of application No. 14/753,144, filed on Jun. 29, 2015, now Pat. No. 10,104,386, which is a continuation of application No. PCT/EP2014/050065, filed on Jan. 4, 2014.

(60) Provisional application No. 61/809,605, filed on Apr. 8, 2013, provisional application No. 61/749,042, filed on Jan. 4, 2013.

(51) Int. Cl.
| | |
|---|---|
| H04N 19/119 | (2014.01) |
| H04N 19/46 | (2014.01) |
| H04N 19/30 | (2014.01) |
| H04N 19/102 | (2014.01) |
| H04N 19/12 | (2014.01) |
| H04N 19/174 | (2014.01) |
| H04N 19/80 | (2014.01) |
| H04N 19/33 | (2014.01) |
| H04N 19/436 | (2014.01) |
| H04N 19/59 | (2014.01) |
| H04N 19/139 | (2014.01) |
| H04N 19/156 | (2014.01) |

(52) U.S. Cl.
CPC .......... *H04N 19/12* (2014.11); *H04N 19/139* (2014.11); *H04N 19/174* (2014.11); *H04N 19/30* (2014.11); *H04N 19/33* (2014.11); *H04N 19/436* (2014.11); *H04N 19/46* (2014.11); *H04N 19/59* (2014.11); *H04N 19/70* (2014.11); *H04N 19/80* (2014.11); *H04N 19/156* (2014.11)

(58) Field of Classification Search
CPC ...... H04N 19/174; H04N 19/30; H04N 19/33; H04N 19/436; H04N 19/46; H04N 19/59; H04N 19/70; H04N 19/80; H04N 19/156
See application file for complete search history.

(56) References Cited

U.S. PATENT DOCUMENTS

| | | | |
|---|---|---|---|
| 2008/0089412 | A1 | 4/2008 | Ugur et al. |
| 2009/0285306 | A1 | 11/2009 | Leonardi et al. |
| 2010/0195738 | A1 | 8/2010 | Zhu et al. |
| 2010/0208796 | A1 | 8/2010 | Luo et al. |
| 2010/0226440 | A1 | 9/2010 | Miyoshi et al. |
| 2010/0322529 | A1 | 12/2010 | Amonou et al. |
| 2011/0122944 | A1 | 5/2011 | Gupta et al. |
| 2011/0293004 | A1 | 12/2011 | An et al. |
| 2014/0254666 | A1* | 9/2014 | Rapaka ............... H04N 19/33 375/240.12 |
| 2014/0254669 | A1 | 9/2014 | Rapaka et al. |

FOREIGN PATENT DOCUMENTS

| | | |
|---|---|---|
| CN | 101971630 A1 | 2/2011 |
| CN | 102724556 A | 10/2012 |
| EP | 0 577 310 A2 | 1/1994 |
| JP | 2007-067552 A | 3/2007 |
| JP | 2009-518981 A | 5/2009 |
| WO | 2007064347 A | 6/2007 |
| WO | 2008047300 A2 | 4/2008 |
| WO | 2009048502 A2 | 4/2009 |
| WO | 2012036901 A1 | 3/2012 |
| WO | 2012096981 A1 | 7/2012 |
| WO | 2012167711 A1 | 12/2012 |
| WO | 2012167712 A | 12/2012 |

OTHER PUBLICATIONS

Boyce, J. et al., "Description of Low Complexity Scalable Video Coding Technology Proposal by Vidyo and Samsung", Joint Collaborative Team on Video Coding (JCT-VC) of ITU-T SG16 WP3 and ISO/EC JTC1/SC29/WG11, JCTVC-K0045, 11th Meeting, Oct. 10-19, 2012, pp. 1-25.

Bross, B. et al., "High Efficiency Video Coding (HEVC) Text Specification Draft 6", Joint Collaborative Team on Video Coding (JCT-VC) of ITU-T SG16 WP3 and ISO/IEC JTC1/SC29/WG11, JCTVC-H1003_d0, 7th Meeting, Nov. 21-30, 2011, 228 pages.

Bross, B. et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v1, 11th Meeting, Oct. 10-19, 2012, 280 pages.

Caban, M. et al., "Support of Independent Sub-Pictures", Joint Collaborative Team on Video Coding (JCT-VC) of ITU-T SG16 WP3 and ISO/IEC JTC1/SC29/WG11, JCTVC-I0356, 9th Meeting, Apr. 27-May 7, 2012, pp. 1-6.

Chen, Y. et al., "AHG7: Parallel Decoding SEI Message for MV-HEVC", Joint Collaborative Team on 3D Video Coding Extensions of ITU-T SG16 WP3 and ISO/IEC JTC1/SC29/WG11, JCT3V-D0199, 4th Meeting, Apr. 20-26, 2013, pp. 1-4.

Deshpande, S., "On Video Parameter Set", Joint Collaborative Team on Video Coding (JCT-VC) of ITU-T SG16 WP3 and ISO/IEC JTC1/SC29/WG11, JCTVC-K0223, m26554, 11th Meeting Oct. 10-19, 2012, pp. 1-6.

Ding, C. et al., "A Fast Mode Decision Algorithm for Multiview Auto-Stereoscopic 3D Video Coding Based on Mode and Disparity Statistic Analysis", Proc. of SPIE, vol. 8558, 2012, pp. 85580P-1-85580P-12.

Francois, E. et al., "Storage Reduction in Dependent Tiles", Joint Collaborative Team on Video Coding (JCT-VC) of ITU-T SG16 WP3 and ISO/IEC JTC1/SC29/WG11, JCTVC-H0179, 8th Meeting, Feb. 1-10, 2012, pp. 1-4.

Fuldseth. A. et al.. "Tiles". Joint Collaborative Team on Video Coding (JCT-VC) of ITU-T SG16 WP3 and ISO/IEC JTC1/SC29/WG11, JCTVC-F335, 6th Meeting, Jul. 14-22, 2011, pp. 1-15.

Henry, F. et al., "Wavefront Parallel Processing", Joint Collaborative Team on Video Coding (JCT-VC) of ITU-T SG16 WP3 and ISO/IEC JTC1/SC29/WG11, JCTVC-E196, M19714, 5th Meeting, Mar. 16-23, 2011, pp. 1-8.

Horimai, H. et al., "Full-Color 3D Display System with 360 Degree Horizontal Viewing Angle", Proc. Int. Symposium of 3D and Contents, 2010, 4 pages.

Ikai, T., "3D-CE5.h Related: Disparity Vector Restrictions", Joint Collaborative Team on 3D Video Coding of ITU-T SG16 WP3 and ISO/IEC JTC1/SC29/WG11, JCT3V-B0112, 2nd Meeting, Oct. 13-19, 2012, 7 pages.

Nakagami, 0. et al., "MV-HEVC: Vertical Length Restriction of Inter-view Vector for HEVC Simple 3D Extension", Joint Collaborative Team on 3D Video Coding of ITU-T SG16 WP3 and ISO/IEC JTC1/SC29/WG11, JCT3V-B0037, 2nd Meeting, Oct. 13-19, 2012, 7 pages.

Office Action dated Aug. 16, 2016 in Japanese Application No. 2015-551183.

Rapaka, K. et al., "Parallel Processing Indications for Tiles in HEVC Extensions", Joint Collaborative Team on Video Coding (JCT-VC) of ITU-T SG16 WP3 and ISO/IEC JTC1/SC29/WG11, JCTVC-M0334, 13th Meeting, Apr. 18-26, 2013, pp. 1-3.

Schwarz, H. et al., "Description of Scalable Video Coding Technology Proposal by Fraunhofer HHI (Configuration A)", Joint Collaborative Team on Video Coding (JCT-VC) of ITU-T SG16 WP3 and ISO/IEC JTC1/SC29/WG11, JCTVC- K0042, 11th Meeting, Oct. 10-19, 2012, pp. 1-37.

(56) References Cited

OTHER PUBLICATIONS

Segall, C. et al., "Spatial Scalability Within the H.264/AVC Scalable Video Coding Extension", IEEE Transactions on Circuits and Systems for Video Technology, vol. 17, No. 9, Sep. 2007, pp. 1121-1135.

Skupin, R. et al., "Inter-layer Delay Indication in VUI (Combining Aspects of JCTVC-M0200, JCT3V-D0064 and JCT3V D0199)", Joint Collaborative Team on Video Coding (JCT-VC) of ITU-T SG16 WP3 and ISO/IEC JTC1/SC29/WG11, JCTVC-M0463, 13th Meeting, Apr. 18-26, 2013, pp. 1-4.

Skupin, R. et al., "Layer Decoding Delay Indication for SHVC and 3D/MV-HEVC", Joint Collaborative Team on Video Coding (JCT-VC) of ITU-T SG16 WP3 and ISO/IEC JTC1/SC29/WG11, JCTVC-M0200, 13th Meeting, Apr. 18-26, 2013, pp. 1-4.

Skupin. R. et al., "On VPS Extension", Joint Collaborative Team on Video Coding (JCT-VC) of ITU-T SG16 WP3 and ISO/IEC JTC1/SC29/WG11, JCTVC-L0200, 12th Meeting, Jan. 14-23, 2013, 2 pages.

Sohring, K. et al., "Indication of Tile Boundary Alignment", Joint Collaborative Team on Video Coding (JCT-VC) of ITU-T SG16 WP3 and ISO/IEC JTC1/SC29/WG11, JCTVC-L0197, 12th Meeting, Jan. 14-23, 2013, 2 pages.

Sohring, K. et al., "Indication of Tile Boundary Alignment", Joint Collaborative Team on Video Coding (JCT-VC) of ITU-T SG16 WP3 and ISO/IEC JTC1/SC29/WG11, JCTVC-M0202, 13th Meeting, Apr. 18-26, 2013, pp. 1-3.

Sohring, K. et al., "Tile Boundary Alignment and Inter-layer Prediction Constraints for SHVC and MV-HEVC", Joint Collaborative Team on Video Coding (JCT-VC) of ITU-T SG16 WP3 and ISO/IEC JTC1/SC29/WG11, JCTVC-Mxxxx, 13th Meeting, Apr. 18-26, 2013, pp. 1-5.

Tech, G. et al., "AHG 13: Restriction of Inter-layer Prediction on Tile Boundaries", Joint Collaborative Team on 3D Video Coding Extensions of ITU-T SG16 WP3 and ISO/IEC JTC1/SC29/WG11, JCT3V-D0051_v1, 4th Meeting, Apr. 20-26, 2013, pp. 1-3.

Thang, T. et al., "Proposal to Video Parameter Set and its Extension", Joint Collaborative Team on Video Coding (JCT VC) of ITU-T SG16 WP3 and ISO/IEC JTC1/SC29/WG11, JCTV-K0228, 11th Meeting, Oct. 10-19, 2012, pp. 1-7.

Ugur, K. et al., "Parallel Decoding Info SEI Message for MVC", Joint Video Team (JVT) of ISO/IEC MPEG and ITU-T VCEG (ISO/IEC JTC1/SC29/WG11 and ITU-T SG16 0. 6) JVT-V098, JVT-V098r1.doc, 22nd Meeting, Jan. 13-19, 2007, pp. 1-8.

Wang, Y. et al., "Tile Groups", Joint Collaborative Team on Video Coding (JCT-VC) of ITU-T SG16 WP3 and ISO/IEC JTC1/SC29/WG11, JCTVC-G318, 7th Meeting, Nov. 21-30, 2011, pp. 1-9.

Wang, Y., "BoG on High-level Syntax for Extension Planning", Joint Collaborative Team on Video Coding (JCT-VC) of ITU-T SG16 WP3 and ISO/IEC JTC1/SC29/WG11, JCTVC-J00574, 10th Meeting, Jul. 11-20, 2012, pp. 1-17.

Wilburn, B. et al., "High Performance Imaging Using Large Camera Arrays", ACM Transactions on Graphics, vol. 24, No. 3, 2005, 12 pages.

Wilburn, B. et al., "The Light Field Video Camera", Electronic Imaging 2002, International Society for Optics and Photonics, 2001, 8 pages.

Office Action dated Nov. 29, 2016 in Japanese Application No. 2016-506938.

Byeongdoo Choi et al., "AHG9: NAL unit header design for base spec", Joint Collaborative Team on Video Coding (JCT-VC) of ITU-T SG16 WP3 and ISO/IEC JTC1/SC29/WG11 JCTVC-K0210, ITU-T, Oct. 19, 2012, p. 1-5.

Byeongdoo Choi et al., "AHG9: NAL unit header with layer ID partitioning", Joint Collaborative Team on Video Coding (JCT-VC) of ITU-T SG16 WP3 and ISO/IEC JTC1/SC29/WG11 JCTVC-K0177, ITU-T, Oct. 19, 2012, p. 1-8.

Office Action dated Aug. 8, 2017 in Japanese Application 2015-551183.

Fuldseth. A. et al., "Tiles", Joint Collaborative Team on Video Coding (JCT-VC) of ITU-T SG16 WP3 and ISO/IEC JTC1/SC29/ WG11 5th Meeting: Geneva, CH, Mar. 16-23, 2011, U.S., JCTVC, Mar. 11, 2011, JCTVC-E408, p. 1-p. 14, URL: http://phenix.it-sudparis.eu/jct/index.php.

Decision to Grant dated Aug. 31, 2017 in Korean Application 10-2015-7020813.

Office Action dated Oct. 24, 2017 In Chinese Application 2014800324507.

Office Action dated Oct. 31, 2017 in European Application 14715932.1.

Office Action dated Nov. 3, 2017 in Chinese Application 2014800122327.

Boyce, J. et al., "NAL Unit Header and Parameter Set Designs for HEVC extensions," Joint Collaborative Team on Video Coding (JCT-VC) of ITU-T SG 16 WP and ISO/IEC JTC 1/SC 29/WG 11, 11th Meeting, Shanghai, CN, Oct. 19, 2012.

Sjoberg, R. et al., "Overview of HECV high-level syntax and reference picture management," IEEE Transactions on Circuits and Systems for Video Technology, Jan. 1, 2012, XP055045360, ISSN: 1051-8215.

Bross, B. et al., "High Efficiency Video Coding (HEVC) Text Specification Draft 10 (for FDIS & Last Call)", Joint Collaborative Team on Video Coding (JCT-VC) of ITU-T SG16 WP3 and ISO/IEC JTC1/SC29/WG11, JCTVC-H1003_d0, 12th Meeting, Mar. 19, 2013.

Suehring, K et al., "3D/MV-HEVC HLS: Extending the supported number of layers", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16); URL: HTTP://PHENIX.INT-EVRY.FR/JCT2/, No. JCT3V-E0092, Jul. 19, 2013 (Jul. 19, 2013).

Suehring, K et al., "MV-HEVC/SHVC HLS: Extending the supported number of layers", 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16 ); URL: HTTP://PHENIX.INT-EVRY.FR/JCT2/, No. JCT3V-D0211, Apr. 13, 2013.

Suehring, K et al., "3D/MV-HEVC HLS: Study and proposal of methods for extending the supported number of layers" 15 JCT-VC Meeting; Oct. 23, 2013; Nov. 1, 2013 Geneva; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/,, No. JCTVC-O0200, Oct. 15, 2013 (Oct. 15, 2013), XP030115242.

Choi B. et al., "Layer identifier extension for MV-HEVC and other HEVC extension", 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16 ); URL: HTTP://PHENIX.INT-EVRY.FR/JCT2/,, No. JCT3V-D0238, Apr. 14, 2013 (Apr. 14, 2013), XP030130902.

Notice of Allowance U.S. Appl. No. 14/753,144 dated Jun. 7, 2018.

Non-final Office Action U.S. Appl. No. 14/875,808 dated Oct. 9, 2018.

Decision to Grant dated Nov. 6, 2018 Japanese Patent Application No. 2016-506938.

Non-final Office Action U.S. Appl. No. 16/123,184 dated Feb. 7, 2019.

Final Office Action U.S. Appl. No. 14/875,808 dated Jun. 20, 2019.

Office Action Korean Patent Application No. 10-2017-7023826 dated Jun. 20, 2019.

Final Office Action U.S. Appl. No. 16/123,184 dated Jul. 12, 2019.

Office Action dated Oct. 29, 2019 in Japanese Application 2018-206897.

Office Action dated Feb. 5, 2020 in U.S. Appl. No. 14/875,808. (No New Refs).

Office Action dated Dec. 3, 2019 in Japanese Application 2018-228292.

Gerhard Tech et.al., 3D-HEVC Test Model 3, Joint Collaborative Team on 3D Video Coding Extension Development of ITU-T SG16 WP3 and ISO/IEC JTC1/SC29/WG11, 3rd Meeting: Geneva, CH, [JCT3V-C1005_d0], Mar. 2013, JCT3V-C1005 (version 1), pp. 13-19.

Ye-Kui Wang et al., Tile groups, Joint Collaborative Team on Video Coding (JCT-VC) of ITU-T SG16 WP3 and ISO/IEC JTC1/SC29/

(56) References Cited

OTHER PUBLICATIONS

WG11, 7th Meeting: Geneva, CH, [JCTVC-G318], Nov. 2011, JCTVC-G318 (version 1), pp. 1-9.
Office Action dated Jan. 30, 2020 in Korean Application 10-2017-7034815.
Decision to Grant dated Mar. 22, 2020 in Korean Application 10-2017-7023826.
Ki-Kit Lai et al., "Viewpoint Switching in Multiview video Using SP-Frames", pp. 1776-1779, ICIP, 2008.
Decision to Grant dated May 26, 2020 in Korean Application 10-2017-7034815.
Office Action dated Jun. 9, 2020 in Japanese Application 2018-206897.
Office Action dated Sep. 28, 2020 in Korean Application 10-2020-7017996.
Office Action dated Aug. 27, 2020 in U.S. Appl. No. 14/875,808.
Decision to Grant a Patent issued in corresponding Japanese Patent Application No. 2018-206897 dated Jan. 12, 2021, with English translation.
Office Action issued in corresponding Japanese Patent Application No. 2018-228292 dated Dec. 1, 2020, with English translation.
Tomohiro Ikai et al., "AHG13: Disparity vector restrictions", Joint Collaborative Team on 3D Video Coding Extension Development of ITU-T SG16 WP3 and ISO/IEC JTC1/SC29/WG11, 3rd Meeting: Geneva, CH, [JCT3V-C0083], Jan. 2013, JCT3V-00083 (version 1), pp. 1-5.
Partial European Search Report issued in corresponding European Patent Application No. 20176564.1 dated Nov. 3, 2020.
Extended European Search Report issued in corresponding European Patent Application No. 20176564 dated Jan. 21, 2021.
Junghak Nam et al., "Advanced motion an disparity prediction for 3D video coding", 98. MPEG Meeting, M22560, Geneva, CH, Nov. 28, 2011-Dec. 2, 2011.
Extended European Search Report issued in corresponding European Application No. 20196003.6 dated Feb. 26, 2021.
Zhou, M., "AHG4: Enable parallel decoding with tiles", JCTVC-I0118, Geneva, CH, Apr. 27-May 7, 2012.

\* cited by examiner

| 0  | 1  | 2  | 3  | 12 | 13 | 14 | 21 | 22 | 23 | 24 |
|----|----|----|----|----|----|----|----|----|----|----|
| 4  | 5  | 6  | 7  | 15 | 16 | 17 | 25 | 26 | 27 | 28 |
| 8  | 9  | 10 | 11 | 18 | 19 | 20 | 29 | 30 | 31 | 32 |
| 33 | 34 | 35 | 36 | 41 | 42 | 43 | 47 | 48 | 49 | 50 |
| 37 | 38 | 39 | 40 | 44 | 45 | 46 | 51 | 52 | 53 | 54 |
| 55 | 56 | 57 | 58 | 63 | 64 | 65 | 69 | 70 | 71 | 72 |
| 59 | 60 | 61 | 62 | 66 | 67 | 68 | 73 | 74 | 75 | 76 |

FIG 5

| pic_parameter_set_rbsp( ) { | Descriptor |
|---|---|
|   pic_parameter_set_id | ue(v) |
|   ... | |
|   if( tiles_enabled_flag ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i = 0; i < num_tile_columns_minus1; i++ ) | |
|         column_width_minus1[ i ] | ue(v) |
|       for( i = 0; i < num_tile_rows_minus1; i++ ) | |
|         row_height_minus1[ i ] | ue(v) |
|     } | |
|     loop_filter_across_tiles_enabled_flag | u(1) |
|   } | |
|   ... | |
| } | |

FIG 6

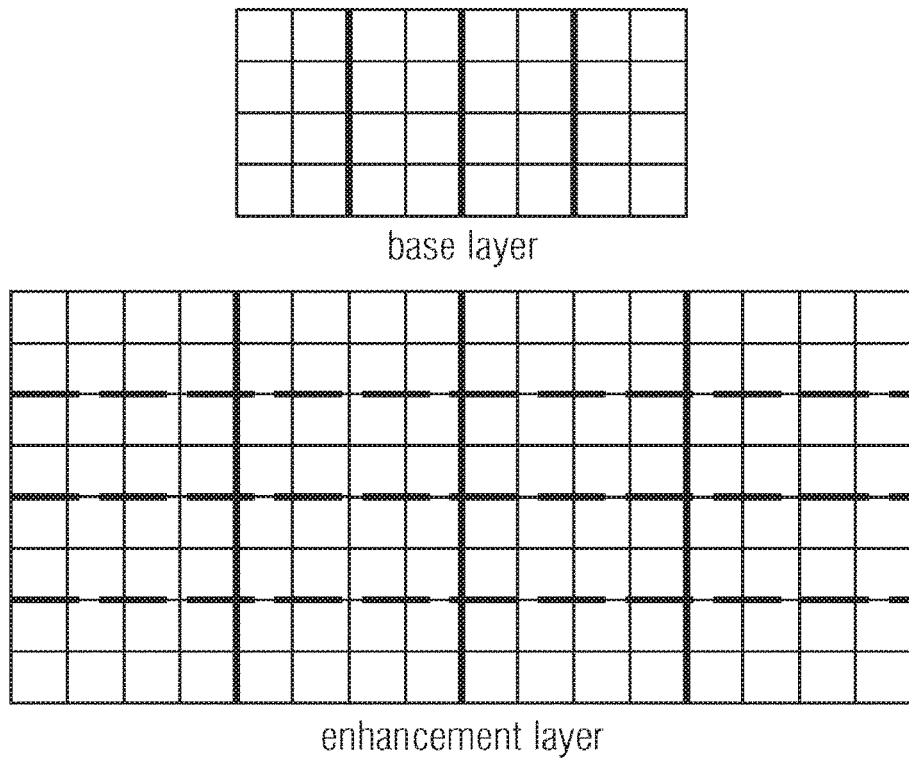

FIG 7

| vui_parameters( ) { | Descriptor |
|---|---|
|     aspect_ratio_info_present_flag | u(1) |
|     ... | |
|     if( bit stream_restriction_flag ) { | |
|         tiles_fixed_structure_flag | u(1) |
|         tile_boundaries_aligned_flag | u(1) |
|         motion_vectors_over_pic_boundaries_flag | u(1) |
|         restricted_ref_pic_lists_flag | u(1) |
|         min_spatial_segmentation_idc | u(8) |
|         max_bytes_per_pic_denom | ue(v) |
|         max_bits_per_mincu_denom | ue(v) |
|         log2_max_mv_length_horizontal | ue(v) |
|         log2_max_mv_length_vertical | ue(v) |
|     } | |
| } | |

FIG 8

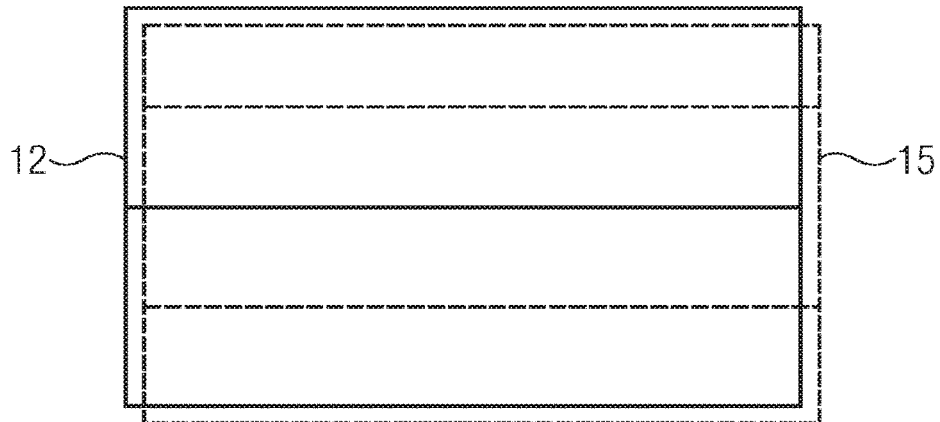

FIG 13

| pic_parameter_set_rbsp( ) { | Descriptor |
|---|---|
|    pic_parameter_set_id | ue(v) |
|    ... | |
|    if( tiles_enabled_flag ) { | |
|       num_tile_columns_minus1 | ue(v) |
|       num_tile_rows_minus1 | ue(v) |
|       uniform_spacing_flag | u(1) |
|       if( !uniform_spacing_flag ) { | |
|          for( i = 0; i < num_tile_columns_minus1; i++ ) | |
|             column_width_minus1[ i ] | ue(v) |
|          for( i = 0; i < num_tile_rows_minus1; i++ ) | |
|             row_height_minus1[ i ] | ue(v) |
|       } | |
|       loop_filter_across_tiles_enabled_flag | u(1) |
|       independent_tile_upsampling_idc | ue(v) |
|    } | |
|    ... | |
| } | |

FIG 14

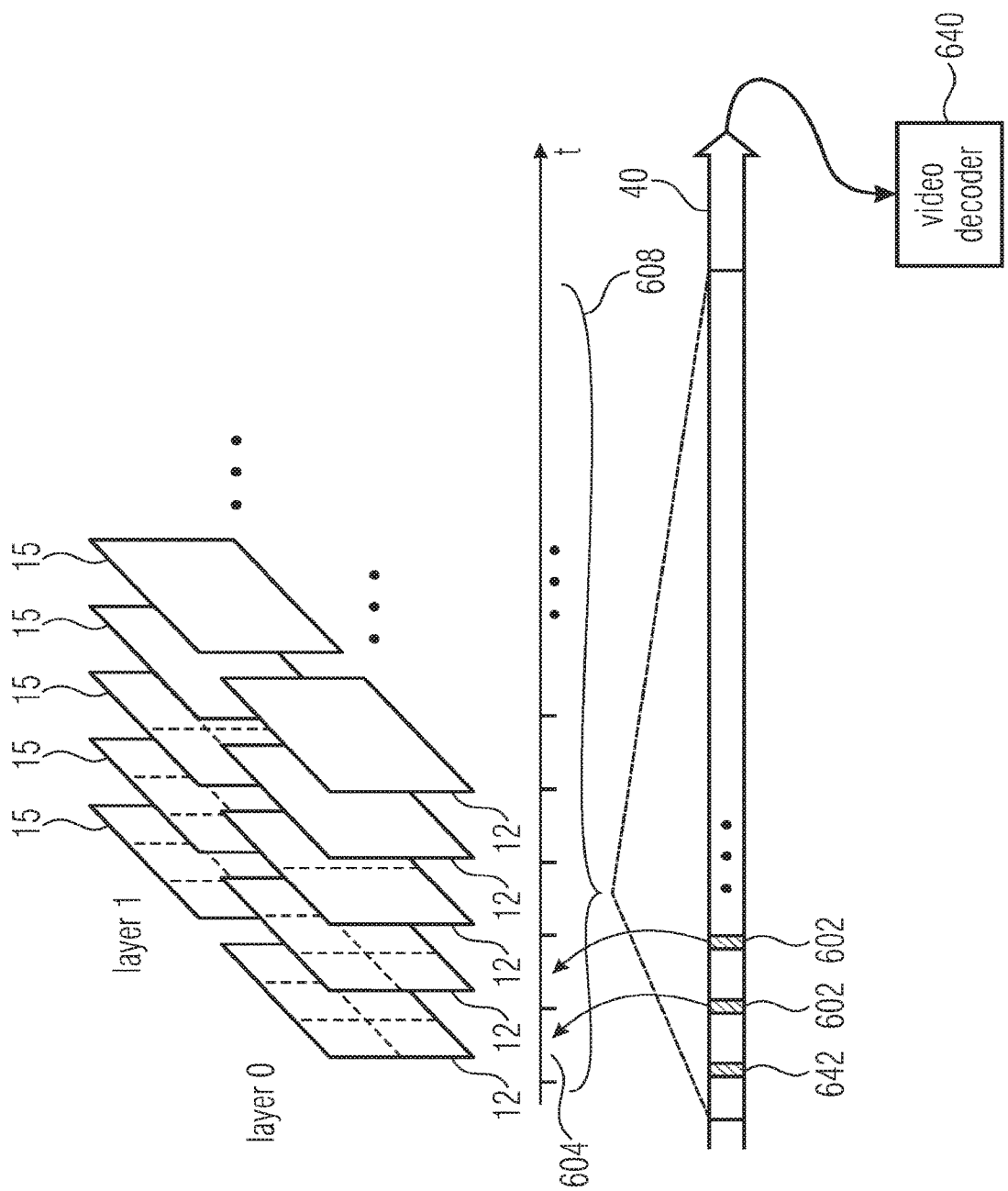

| picture size scaling factor | CTB sizes in both layers | | CTB rows covering corresponding image areas | | layer decoding delay (CTB row offset before first CTB row of layer (n+1) can be decoded) |
| --- | --- | --- | --- | --- | --- |
| | base layer max CTB size | enhancement layer max CTB size | base layer CTB rows | enhancement layer CTB rows | layer decoding delay in CTB rows |
| 1.5 | 64 | 16 | 1 | 6 | 1 |
| 1.5 | 64 | 32 | 1 | 3 | 1 |
| 1.5 | 64 | 64 | 2 | 3 | 1 |
| 1.5 | 32 | 64 | 4 | 3 | 2 |
| 1.5 | 16 | 64 | 8 | 3 | 3 |
| 2 | 64 | 16 | 1 | 8 | 1 |
| 2 | 64 | 32 | 1 | 4 | 1 |
| 2 | 64 | 64 | 1 | 2 | 1 |
| 2 | 32 | 64 | 1 | 1 | 1 |
| 2 | 16 | 64 | 2 | 1 | 2 |

FIG 19

| vui_parameters( ) { | Descriptor |
|---|---|
|    aspect_ratio_info_present_flag | u(1) |
|    ... | |
|    if( bit stream_restriction_flag ) { | |
|       tiles_fixed_structure_flag | u(1) |
|       motion_vectors_over_pic_boundaries_flag | u(1) |
|       restricted_ref_pic_lists_flag | u(1) |
|       min_spatial_segmentation_idc | u(8) |
|       min_spatial_segment_delay | ue(v) |
|       max_bytes_per_pic_denom | ue(v) |
|       max_bits_per_mincu_denom | ue(v) |
|       log2_max_mv_length_horizontal | ue(v) |
|       log2_max_mv_length_vertical | ue(v) |
|    } | |
| } | |

FIG 20

| vps_extension( ) { | Descriptor |
|---|---|
|    while( !byte_aligned( ) ) | |
|    ... | |
|    for( i = 1; i <= vps_max_layers_minus1; i++ ) { | |
|       profile_tier_level( 1, vps_max_sub_layers_minus1 ) | |
|       min_spatial_segment_delay[ i ] | ue(v) |
|    } | |
|    for( i = 1; i <= vps_max_layers_minus1; i++ ) { | |
|       // layer dependency | |
|       num_direct_ref_layers[ i ] | u(6) |
|       for( j = 0; j < num_direct_ref_layers[ i ]; j++ ) | |
|          ref_layer_id[ i ][ j ] | u(6) |
|    } | |
| } | |

FIG 21

| nal_unit_header( ) { | Descriptor |
|---|---|
|    forbidden_zero_bit | f(1) |
|    nal_unit_type | u(6) |
|    layer_id | u(6) |
|    nuh_temporal_id_plus1 | u(3) |
| } | |

FIG 22

| vps_extension( ) { | Descriptor |
|---|---|
| ... | |
|    dedicated_scalability_ids_flag | u(1) |
|    scalability_mask | u(16) |
|    for( i = 0; i < NumScalabilityTypes; i++ ) { | |
|       dimension_id_len_minus1[ i ] | u(3) |
|    } | |
|    if ( !dedicated_scalability_ids_flag) { | |
|       vps_nuh_layer_id_present_flag | u(1) |
|       // layer specific information | |
|       for( i = 1; i <= vps_max_layers_minus1; i++ ) { | |
|          // mapping of layer ID to scalability dimension IDs | |
|          if( vps_nuh_layer_id_present_flag ) | |
|             layer_id_in_nuh[ i ] | u(6) |
|          for( j = 0; j <= num_dimensions_minus1; j++ ) | |
|             dimension_id[ i ][ j ] | u(v) |
|       } | |
|    } | |
| ... | |
| } | |

FIG 26

| vps_extension( ) { | Descriptor |
|---|---|
|     avc_base_layer_flag | u(1) |
|     vps_vui_offset | u(16) |
|     splitting_flag | u(1) |
|     for( i = 0, NumScalabilityTypes = 0; i < 16; i++ ) { | |
|         scalability_mask_flag[ i ] | u(1) |
|         NumScalabilityTypes += scalability_mask_flag[ i ] | |
|     } | |
|     for( j = 0; j < ( NumScalabilityTypes - splitting_flag); j++) | |
|         dimension_id_len_minus1[ j ] | u(3) |
|     vps_nuh_layer_id_present_flag | u(1) |
|     for( i = 1; i <= vps_max_layers_minus1; i++ ) { | |
|         if ( vps_nuh_layer_id_present_flag ) | |
|             layer_id_in_nuh[ i ] | u(6) |
|         if ( !splitting_flag) | |
|             for( j = 0; j < NumScalabilityTypes; j++) | |
|                 dimension_id[ i ][ j ] | u(v) |
|     } | |
|     ⋮ | |
|     ⋮ | |
|     ⋮ | |
| | |

FIG 31

| vui_parameters( ) { | Descriptor |
|---|---|
|    aspect_ratio_info_present_flag | u(1) |
|    ... | |
|    if( bit stream_restriction_flag ) { | |
|       tiles_fixed_structure_flag | u(1) |
|       motion_vectors_over_pic_boundaries_flag | u(1) |
|       restricted_ref_pic_lists_flag | u(1) |
|       min_spatial_segmentation_idc | u(8) |
|       ctb_based_delay_enabled_flag | u(1) |
|       min_spatial_segment_delay | ue(v) |
|       max_bytes_per_pic_denom | ue(v) |
|       max_bits_per_mincu_denom | ue(v) |
|       log2_max_mv_length_horizontal | ue(v) |
|       log2_max_mv_length_vertical | ue(v) |
|    } | |
| } | |

FIG 41

| | Descriptor |
|---|---|
| vui_parameters( ) { | |
|   aspect_ratio_info_present_flag | u(1) |
|   ... | |
|   if( bit stream_restriction_flag ) { | |
|     tiles_fixed_structure_flag | u(1) |
|     motion_vectors_over_pic_boundaries_flag | u(1) |
|     restricted_ref_pic_lists_flag | u(1) |
|     min_spatial_segmentation_idc | u(8) |
|     min_spatial_segment_delay | ue(v) |
|     max_bytes_per_pic_denom | ue(v) |
|     max_bits_per_mincu_denom | ue(v) |
|     log2_max_mv_length_horizontal | ue(v) |
|     log2_max_mv_length_vertical | ue(v) |
|   } | |
|   ... | |
| } | |

FIG 42

| Layer_decoding SEI( payloadSize) { | Descriptor |
|---|---|
| ctb_based_delay_enabled_flag | u(1) |
| min_spatial_segment_delay | ue(v) |
| } | |

EFFICIENT SCALABLE CODING CONCEPT

CROSS-REFERENCE TO RELATED APPLICATIONS

The present application is a continuation of U.S. patent application Ser. No. 16/123,184 filed Sep. 6, 2018, which is continuation of U.S. patent application Ser. No. 14/753,144 filed Jun. 29, 2015, which is a continuation of International Application PCT/EP2014/050065 filed Jan. 4, 2014, which claims priority from U.S. Provisional Application 61/749,042 filed Jan. 4, 2013, and U.S. Provisional Application 61/809,605 filed Apr. 8, 2013, all of which are incorporated herein by reference in their entireties.

BACKGROUND OF THE INVENTION

The present application is concerned with scalable coding concepts such as scalable video coding.

Scalable coding concepts are known in the art. In video coding, for example, H.264 involves an SVC extension (Scalable Video Coding) allowing a base layer coded video data stream to be accompanied by additional enhancement layer data so as to increase the reconstruction quality of the base layer quality video in different terms, such as spatial resolution, signal-to-noise ratio (SNR) or the like. The recently finalized HEVC standard will also be extended by SVC profiles. HEVC differs from its predecessor H.264 in many aspects, such as, for example, suitability for parallel decoding/encoding and low delay transmission. As far as the parallel encoding/decoding is concerned, HEVC supports WPP (Wavefront Parallel Processing) encoding/decoding as well a tile parallel processing concept. According to the WPP concept, the individual pictures are segmented in a row-wise manner into substreams. The coding order within each substream is directed from left to right. The substreams have a decoding order defined thereamong which leads from the top substream to the bottom substream. The entropy coding of the substreams is performed using probability adaptation. The probability initialization is done for each substream individually or on the basis of a preliminarily adapted state of the probabilities used in entropy coding the immediately preceding substream up to a certain position from the left-hand edge of the preceding substream, respectively, on such as the end of the second CTB (Coded Tree Block). Spatial prediction does not need to be restricted. That is, spatial prediction may cross borders between immediately succeeding substreams. In this manner, such substreams may be encoded/decoded in parallel with the locations of current encoding/decoding forming a wavefront which runs, in a tilted manner leading from bottom left to top right, from left to right. According to the tile concept, the pictures are segmented into tiles and in order to render the encoding/decoding of these tiles a possible subject of parallel processing, spatial prediction across tile boundaries is prohibited. Merely in-loop filtering across tile boundaries may be allowed. In order to support low delay processing, the slice concept has been extended: slices are allowed to be switchable to either initialize the entropy probabilities anew, to adopt the entropy probabilities saved during processing a previous substream, i.e. a substream preceding the substream to which the current slice begin belongs, and to adopt the entropy probabilities having been continuously updated until the end of the immediately preceding slice. By this measure, WPP and tile concepts are rendered more suitable for low delay processing.

Nevertheless, it would be more favorable to have concepts at hand which further improve scalable coding concepts.

SUMMARY

An embodiment may have a video decoder for decoding a multi-layer video data stream into which a scene is coded in a hierarchy of layers using inter-layer prediction from a first layer to a second layer, the video decoder supporting parallel decoding the multi-layer video data stream in spatial segments into which pictures of the layers are sub-divided, wherein the decoder is configured to inspect a long-term syntax element structure (e.g. tile_boundaries_aligned_flag) of the multi-layer video data stream so as to interpret the long-term syntax element structure assuming a value out of a first possible-values-set (e.g. tile_boundaries_aligned_flag=1), as a guarantee that, during a predetermined time period, the pictures of the second layer are subdivided so that borders between the spatial segments of the pictures of the second layer overlay every border of the spatial segments of the pictures of the first layer and periodically determine, in time intervals smaller than the predetermined time period, the subdivision of the pictures of the first layer and the second layer into the spatial segments based on short-term syntax elements (e.g. column_width_minus1 [and column_width_minus1[i]) of the multi-layer video data stream, and if the long-term syntax element structure has assumed a value out of a second possible-values-set (e.g. tile_boundaries_aligned_flag=0), periodically determine, in the time intervals smaller than the predetermined time period, the subdivision of the pictures of the layers into the spatial segments from the short-term syntax elements of the multi-layer video data stream such that, at least for a first possible value of the short-term syntax elements, there exists a border between the spatial segments of the pictures of the second layer not overlaying any of the borders of the spatial segments of the first layer, and, at least for a second possible value of the short-term syntax elements, borders between the spatial segments of the pictures of the second layer overlay every border of the spatial segments of the first layer.

Another embodiment may have a video encoder for encoding a scene into a multi-layer video data stream in a hierarchy of layers using inter-layer prediction from a first layer to a second layer so that the multi-layer video data stream is decodable in parallel in spatial segments into which pictures of the layers are sub-divided, wherein the encoder is configured to insert a long-term syntax element structure and short-term syntax elements into the multi-layer video data stream, the short-term syntax elements defining, in time intervals, the subdivision of the pictures of the first layer and the second layer into the spatial segments, and switch between setting the long-term syntax element structure to a value out of a first possible-values-set with, during a predetermined time period greater than the time intervals, setting the short-term syntax elements to a proper subset out of a set of possible settings, the proper subset being chosen so that, during the predetermined time period, the pictures of the second layer are subdivided so that borders between the spatial segments of the pictures of the second layer overlay every border of the spatial segments of the first layer, or a value out of a second possible-values-set with, during the predetermined time period, setting the short-term syntax elements to any of the set of possible settings, the set of possible settings encompassing at least one setting according to which a border exists between the spatial segments of the pictures of the second layer not overlaying any of the borders of the spatial segments of the first layer, and at least another setting according to which borders between the spatial segments of the pictures of the second layer overlay every border of the spatial segments of the first layer.

According to another embodiment, a method for decoding a multi-layer video data stream into which a scene is coded in a hierarchy of layers using inter-layer prediction from a first layer to a second layer, the video decoder supporting parallel decoding the multi-layer video data stream in spatial segments into which pictures of the layers are sub-divided, may have the steps of: inspecting a long-term syntax element structure (e.g. tile_boundaries_aligned_flag) of the multi-layer video data stream so as to interpreting the long-term syntax element structure assuming a value out of a first possible-values-set (e.g. tile_boundaries_aligned_flag=1), as a guarantee that, during a predetermined time period, the pictures of the second layer are subdivided so that borders between the spatial segments of the pictures of the second layer overlay every border of the spatial segments of the pictures of the first layer and periodically determining, in time intervals smaller than the predetermined time period, the subdivision of the pictures of the first layer and the second layer into the spatial segments based on short-term syntax elements (e.g. column_width_minus1[i] and column_width_minus1[i]) of the multi-layer video data stream, and if the long-term syntax element structure has assumed a value out of a second possible-values-set (e.g. tile_boundaries_aligned_flag=0), periodically determining, in the time intervals smaller than the predetermined time period, the subdivision of the pictures of the layers into the spatial segments from the short-term syntax elements of the multi-layer video data stream such that, at least for a first possible value of the short-term syntax elements, there exists a border between the spatial segments of the pictures of the second layer not overlaying any of the borders of the spatial segments of the first layer, and, at least for a second possible value of the short-term syntax elements, borders between the spatial segments of the pictures of the second layer overlay every border of the spatial segments of the first layer.

According to another embodiment, a method for encoding a scene into a multi-layer video data stream in a hierarchy of layers using inter-layer prediction from a first layer to a second layer so that the multi-layer video data stream is decodable in parallel in spatial segments into which pictures of the layers are sub-divided may have the steps of: inserting a long-term syntax element structure and short-term syntax elements into the multi-layer video data stream, the short-term syntax elements defining, in time intervals, the subdivision of the pictures of the first layer and the second layer into the spatial segments, and switching between setting the long-term syntax element structure to a value out of a first possible-values-set with, during a predetermined time period greater than the time intervals, setting the short-term syntax elements to a proper subset out of a set of possible settings, the proper subset being chosen so that, during the predetermined time period, the pictures of the second layer are subdivided so that borders between the spatial segments of the pictures of the second layer overlay every border of the spatial segments of the first layer, or a value out of a second possible-values-set with, during the predetermined time period, setting the short-term syntax elements to any of the set of possible settings, the set of possible settings encompassing at least one setting according to which a border exists between the spatial segments of the pictures of the second layer not overlaying any of the borders of the spatial segments of the first layer, and at least another setting according to which borders between the spatial segments of the pictures of the second layer overlay every border of the spatial segments of the first layer.

Another embodiment may have a computer program having a program code for performing, when running on a computer, the inventive methods.

A first aspect of the present application is concerned with scalable video coding in connection with parallel processing concepts. Parallel processing concepts such as WPP and tile segmentation allow for parallely decoding the pictures of a video in spatial segments into which pictures are subdivided, e.g. in substreams, tiles or slices. Just like spatial intra-picture prediction, inter-layer prediction limits the degree of parallelization in decoding layers dependent on each other via inter-layer prediction. To be more precise, spatial intra-layer prediction limits the degree of parallelization in decoding the picture of a single layer, which problem is solved in different ways. For example, when using tiles as spatial segments, spatial intra-layer prediction is restricted so as to not cross tile boundaries. In the case of WPP substreams, the parallel processing thereof is performed in a staggered manner so as to result in the appropriate tilted processing wavefront. In the case of inter-layer prediction, the decoding of a dependent layer is rendered dependent on co-located portions of a reference layer. Accordingly, the decoding of a dependent layer's spatial segment may be commenced at the earliest at the time where the co-located portion of the reference layer has already been processed/decoded. The area of the "co-located portion" is enlarged in the case of allowing for "motion compensation", as is the case with inter-layer prediction in case of different views as different layers, or owing to upsampling from lower to higher layer. That is, it is feasible for a video decoder supporting scalable decoding using inter-layer prediction and parallel decoding to derive the degree of parallelization in parallel processing inter-dependent layers from short-term syntax elements concerning these inter-dependent layers, which short-term syntax elements define the subdivision of the pictures of these inter-dependent layers into their spatial segments. However, steadily doing so is cumbersome and computationally complex. Beyond that, when doing so, the video decoder is unable to appropriately schedule the decoding threads which run in parallel in order to decode the multi-layer video data stream. Accordingly, in accordance with the first aspect of the present invention, parallel decoding of inter-dependent layers of a multi-layer video data stream is improved by introducing a long-term syntax element structure which, when assuming a certain value, guarantees to the video decoder that during a predetermined time period greater than the short-term syntax element's time intervals, the pictures of the dependent layer are subdivided so that borders between the spatial segments of the pictures of the second layer overlay every border of the spatial segments of the first layer. By this measure, the video decoder is able to rely on the fact that the multi-layer video data stream has been appropriately encoded so that the subdivision of the inter-dependent layers' pictures into spatial segments does not inadvertently reduce the degree of parallelization feasible among these inter-dependent layers. Rather, the decoder may, for the predetermined period, schedule the distribution of the spatial segments onto the video decoder's parallel processing threads in advance by exploiting the constraint that the spatial segments' borders in the different layers overlay each other in the signaled manner. Still, the long-term syntax element structure allows for switching off this guarantee, thereby allowing, in other application scenarios or for high-end video decoders, to perform the parallel processing scheduling on a short-term basis depending on the short-term syntax elements only, i.e. without exploiting any guarantee concerning the relative location between the borders of spatial segments of the inter-dependent layers. For purposes of decisions in opportunistic decoding, the long-term syntax element may be used, too.

Another aspect of the present application concerns scalable coding according to which pictures of inter-dependent layers are subject to inter-layer prediction using upsampling from the base layer to the enhancement layer, in connection with parallel processing of the inter-dependent layers. In particular, this aspect concerns the interpolation used to do the upsampling from base layer to enhancement layer. Normally, such interpolation causes neighboring partitions of the base layer picture to become dependent on each other. That is, the interpolation causes that the interpolation result at the outer circumference of portions of the upsampled base layer reference picture is dependent on both pixels/pels within the co-located partition of the base layer picture as well as pixel s/pels of neighboring partitions. In other words, the areas of the base layer picture serving as a reference for inter-layer prediction for co-located portions to be predicted in the enhancement layer picture "smear out" and widen. Inadvertently, such inter-dependency caused by the interpolation of the inter-layer prediction negatively affects the degree of parallelism achievable in parallel processing of the inter-dependent layers. According to this second aspect of the present application, a syntax element is introduced which informs the decoder that the interpolation along the base layer's partitions is modified so as to not mix-up pixels/pels of neighboring partitions of the base layer picture, the partitioning of the base layer picture and its upsampled version depending on the spatial segments of the enhancement layer picture or both the base and enhancement layers, for example. By introducing such a syntax element, the encoder is able to switch between two modes: if the interpolation is restricted to leave the portions of the base layer picture self-contained, i.e. restriction is switched on, the degree of parallelism in parallel decoding of the inter-dependent layers which is maximally achievable is increased with slightly decreasing the interpolation quality along the partition edges of the base layer picture, and in the case of not restricting the interpolation, the parallelism degree is decreased, however, with increasing the interpolation quality at the partition's edges.

A third aspect of the present application concerns scalable video coding with parallel decoding of inter-dependent layers and seeks to alleviate the decoder's burden of performing the parallel processing scheduling, i.e. distribute the spatial segments onto the parallel processing threads, by introducing a long-term syntax element structure which allows the decoder to determine the inter-layer offset—or inter-layer delay—for a predetermined time period greater than the time intervals at which the short-term syntax elements signal sizes and locations of the spatial segments of the pictures of the inter-dependent layers as well as the spatial sampling resolutions of these pictures. By introducing the long-term syntax element signaling the inter-layer offset, the video encoder is able to switch between two modes: according to a first mode, the encoder guarantees to the decoder a certain inter-layer offset, corresponding to a certain degree of parallelism between decoding the inter-dependent layers, and sets, within this predetermined time period, the short-term syntax elements correspondingly so that the actual inter-layer offset is equal to the guaranteed one or even lower. In accordance with the other mode, such a guarantee is not provided to the decoder, and hence the encoder is free to set the short-term syntax elements so as to meet other criteria such as, for example, optimally adapting the short-term syntax elements to the video content during the predetermined time period. The inter-layer offset, thus explicitly signaled in the data stream, may be a count of base layer spatial segments which at the minimum have to be decoded, before the first spatial segment of the temporally co-aligned enhancement layer picture is commenced with, when obeying this count over the whole predetermined time period, not facing any conflicts at least with respect to decoding the first spatial segment of the enhancement layer pictures during this predetermined time period.

A fourth aspect of the present application concerns scalable video coding and the signaling of the layers to which the various NAL units of the multi-layer video data stream belong, as well as the location of these layers within a scalability space as well as the meaning of the scalability dimensions spanning the scalability space. In order to ease the tasks to be performed by intermediate network entities involved with transporting a multi-layer video data stream, such information should be easily accessible for these intermediate network entities and should be able to be managed easily. The fourth aspect of the present application is based on a discovery of the inventors, according to which the typical application scenarios justify the expenditure for a type indicator field which changes away the layer indicator field within the NAL unit headers associated with the various layers is to be interpreted: if the type indicator field has a first state, mapping information in general information NAL units maps possible values of the layer indicator field to the operational points and the layer's NAL units are associated with the operational points using the respective layer indicator field and the mapping information. This way, the mapping between layers and scalability constellations may be adapted variably and allows for a multitude of scalability spaces to be realized, with the drawback however that the management overhead is increased. If the type indicator field has a second state, the layer indicator field is split into more than one portion, and the operation point the respective NAL unit is associated with is located by using the values of these portions as coordinates of a vector within the scalability space. By this measure, the mapping between layers and scalability constellations allows for a lower number of scalability spaces to be realized, with the advantage, however, that the management overhead for the network entities is decreased. The layer indicator field may be the same in both cases irrespective of the application scenario, but the way the layer indicator field navigates the layer's NAL units through the scalability space may be adapted to the current application and its specifics. The adaptation advantages overcompensate the necessity of the additional expenditure for the type indicator field.

A fifth aspect of the present application concerns multi-layer video coding, i.e. scalable video coding, allowing different codecs/standards to be used for the different layers. The possibility of allowing different codecs/standards to be used for successive layers enables a belated expansion of an already existing video environment to cope with multi-layer video data streams which have been subsequently extended by further enhancement layers and to use, to this end, new and potentially better codecs/standards. Network sinks not able to understand codecs/standards of some enhancement layers are still able to handle the lower layers and multi-codec decoders are fed by a transport layer decoder which identifies, for each NAL unit of the multi-layer video data stream, which codec same is associated with and hands over the NAL units of the multi-layer video data stream to the multi-standard multi-layer decoder accordingly.

A sixth aspect of the present application relates to multi-layer video coding where both, pictures of a base layer and pictures of an enhancement layer are subdivided into an array of blocks, each. In that case, the inter-layer offset may be signaled efficiently by inserting a syntax element structure into the multi-layer video data stream, which indicates the inter-layer offset for parallel decoding the pictures of base and enhancement layers in units of the base layer blocks. That is, the sixth aspect of the present application is based on the finding that the explicit transmission of a syntax element structure which indicates the inter-layer offset between base layer and enhancement layer in units of base layer blocks increases the data to be transmitted merely in a minor manner, whereas the computational complexity for the decoder is greatly reduced compared to the case where the decoder otherwise derives the inter-layer offset for parallel decoding the pictures of base and enhancement layers on the basis of other syntax elements which reveal, for example, the block size of the base and enhancement layer blocks, the sample resolution of base and enhancement layer pictures and the like. The sixth aspect is closely related to the third aspect when realizing the syntax element structure as a long-term syntax element structure so that the inter-layer offset is indicated to the decoder as a guarantee which holds true for a predetermined time period which is greater than the time intervals at which the short-term syntax elements in the multi-layer video data stream indicate those hints which would be otherwise necessitated in order to determine the inter-layer offset by combining these syntax elements in a relatively complex manner.

Naturally, all of the above aspects may be combined in pairs, triplets, quadruples or all of them.

BRIEF DESCRIPTION OF THE DRAWINGS

Embodiments of the present invention will be detailed subsequently referring to the appended drawings, in which:

FIG. 5 shows a schematic diagram of a picture subdivided into code blocks and tiles respectively, with the tiles being composed of integer multiples of the code blocks and a decoding order defined among the code blocks following the picture's subdivision into tiles;

FIG. 6 shows a syntax example for realizing the embodiment of FIG. 4;

FIG. 7 shows a schematic diagram of a pair of base layer and enhancement layer pictures differently subdivided into tiles;

FIG. 8 shows another exemplary syntax applicable in connection with the embodiment of FIG. 4;

FIG. 13 shows a schematic diagram of an overlay of base layer and enhancement layer pictures, both being subdivided into WPP substreams;

FIG. 14 shows an exemplary syntax for realizing the embodiment of FIG. 10;

FIG. 16 shows a schematic block diagram of a video decoder in accordance with an embodiment according to which the video decoder is responsive to a long-term syntax element structure within the multi-layer video data stream so as to derive or not derive a guarantee concerning inter-layer offset between base and enhancement layer decoding therefrom;

FIG. 19 shows a table illustrating the relation between minimum inter-layer decoding offset and block sizes and sampling resolution ratio between base and enhancement layers in accordance with an embodiment of the present application;

FIG. 20 shows an exemplary syntax for realizing the long-term syntax element structure signaling in accordance with FIG. 16;

FIG. 21 shows another example for a syntax for realizing the embodiment of FIG. 16;

FIG. 22 shows a syntax of a NAL unit header in accordance with an example for an HEVC like configuration;

FIG. 26 shows an illustrative syntax for realizing the switchable layer indicator field interpretation in accordance with FIG. 23;

FIG. 31 shows another example for a syntax for realizing the switchable layer indicator field interpretation in accordance with a further embodiment;

FIG. 41 shows an example for a syntax for implementing any of the embodiments of FIGS. 35 to 40;

FIG. 42 shows another syntax example as an alternative to the one of FIG. 41;

DETAILED DESCRIPTION OF THE INVENTION

First, as an overview, an example for an encoder/decoder structure is presented which fits to any of the subsequently presented concepts.

Figure 1:
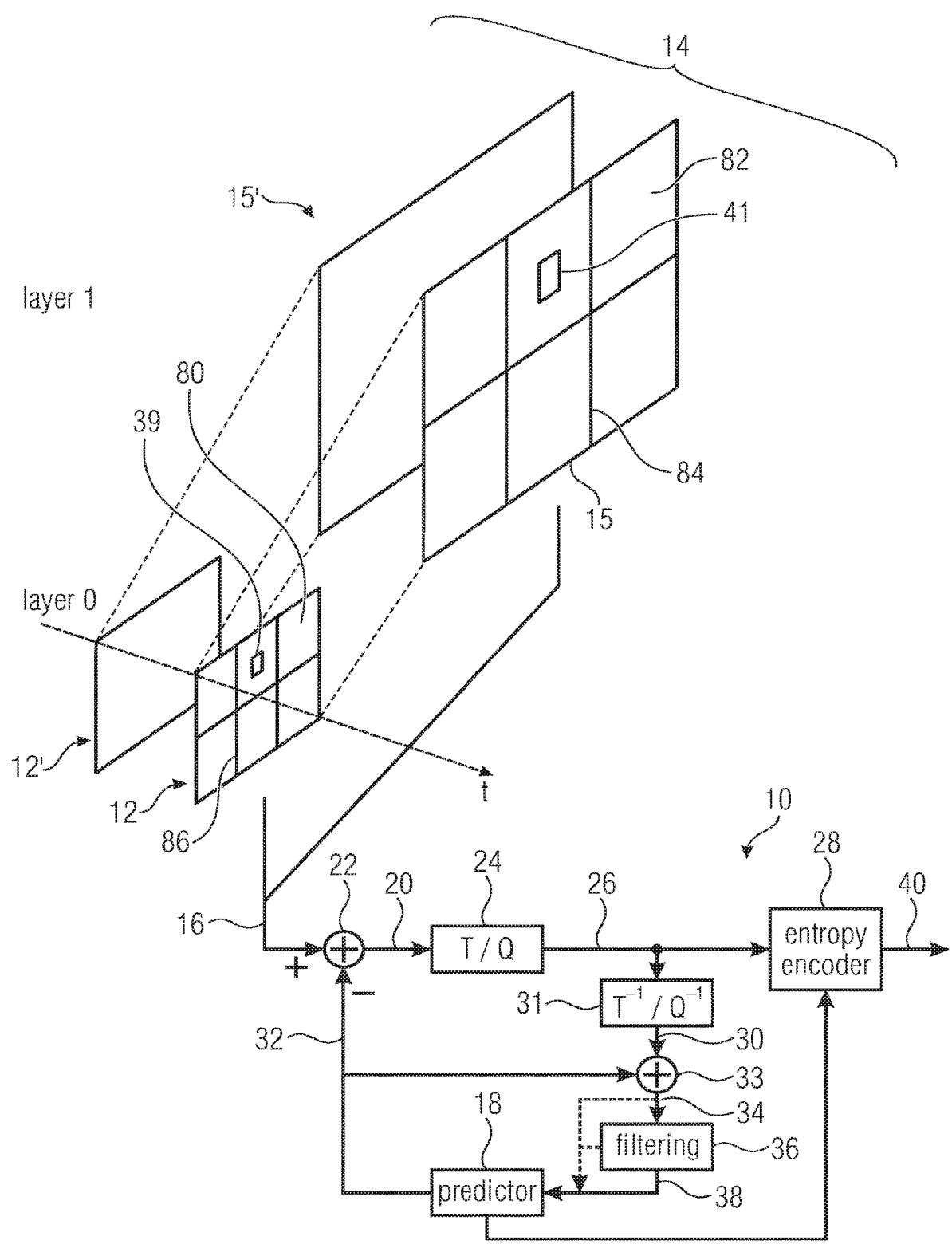
FIG. 1 shows a video encoder serving as an illustrative example for implementing any of the multi-layer encoders further outlined with respect to the following figures.

FIG. 1 shows a general structure of an encoder in accordance with an embodiment. The encoder 10 could be implemented to be able to operate in a multi-threaded way or not, i.e., merely single-threaded. That is, encoder 10 could, for example, be implemented using multiple CPU cores. In other words, the encoder 10 could support parallel processing but it does not have to. The bitstreams generated will also be generatable/decodable by single-threaded encoders/decoders. The coding concept of the present application enables, however, parallel processing encoders to efficiently apply parallel processing without, however, compromising the compression efficiency. With regard to the parallel processing ability, similar statements are valid for the decoder which is described later with respect to FIG. 2.

The encoder 10 is a video encoder but in general the encoder 10 may also be a picture encoder. A picture 12 of a video 14 is shown as entering encoder 10 at an input 16. Picture 12 shows a certain scene, i.e., picture content. However, encoder 10 receives at its input 16 also another picture 15 pertaining the same time instant with both pictures 12 and 15 belonging to different layers. Merely for illustration purposes, picture 12 is shown as belonging to layer zero whereas picture 15 is shown as belonging to layer 1. FIG. 1 illustrates that layer 1 may involve, with respect to layer zero, a higher spatial resolution, i.e., may show the same scene with a higher number of picture samples but this is merely for illustration purposes only and picture 15 of layer 1 may, alternatively, have the same spatial resolution but may differ, for example, in the view direction relative to layer zero, i.e., pictures 12 and 15 may have been captured from different viewpoints.

The encoder 10 is a hybrid breed encoder, i.e., pictures 12 and 15 are predicted by a predictor 18 and the prediction residual 20 obtained by a residual determiner 22 is subject to a transform, such as a spectral decomposition such as a OCT, and a quantization in a transform/quantization module 24. A transformed and quantized prediction residual 26, thus obtained, is subject to entropy coding in an entropy coder 28, such as arithmetic coding or variable length coding using, for example, context-adaptivity. The reconstructible version of the residual is available for the decoder, i.e., the dequantized and retransformed residual signal 30 is recovered by a retransform/requantizing module 31 and recombined with a prediction signal 32 of predictor 18 by a combiner 33, thereby resulting in a reconstruction 34 of picture 12 and 15 respectively. However, encoder 10 operates on a block basis. Accordingly, reconstructed signal 34 suffers from discontinuities at block boundaries and, accordingly, a filter 36 may be applied to the reconstructed signal 34 in order to yield a reference picture 38 for pictures 12 and 15, respectively, on the basis of which predictor 18 predicts subsequently encoded pictures of the different layers. As shown by a dashed line in FIG. 1, predictor 18 may, however, also, such as in other prediction modes such as spatial prediction modes, exploit the reconstructed signal 34 directly without filter 36 or an intermediate version.

The predictor 18 may choose among different prediction modes in order to predict certain blocks of picture 12. One such block 39 of picture 12 is exemplarily shown in FIG. 1. There may be a temporal prediction mode according to which block 39 which is representative for any block of picture 12 into which picture 12 is partitioned, is predicted on the basis of a previously coded picture of the same layer such as picture 12'. A spatial prediction mode may also exist according to which a block 39 is predicted on the basis of a previously coded portion of the same picture 12, neighboring block 39. A block 41 of picture 15 is also illustratively shown in FIG. 1 so as to be representative for any of the other blocks into which picture 15 is partitioned. For block 41, predictor 18 may support the prediction modes just-discussed, i.e. temporal and spatial prediction modes. Additionally, predictor 18 may provide for an inter-layer prediction mode according to which block 41 is predicted on the basis of a corresponding portion of picture 12 of a lower layer. "Corresponding" in "corresponding portion" shall denote the spatial correspondence, i.e., a portion within picture 12 showing the same portion of the scene as bock 41 to be predicted in picture 15.

The predictions of predictor 18 may, naturally, not be restricted to picture samples. The prediction may apply to any coding parameter, too, i.e. prediction modes, motion vectors of the temporal prediction, disparity vectors of the multi-view prediction, etc. Merely the residuals may then be coded in bitstream 40.

A certain syntax is used in order to compile the quantized residual data 26, i.e., transform coefficient levels and other residual data, as well as the coding parameters including, for example, prediction modes and prediction parameters for the individual blocks 39 and 41 of pictures 12 and 15 as determined by predictor 18 and the syntax elements are subject to entropy coding by entropy coder 28. The thus obtained data stream 40 as output by entropy coder 28 forms the bitstream 40 output by encoder 10.

Figure 2:
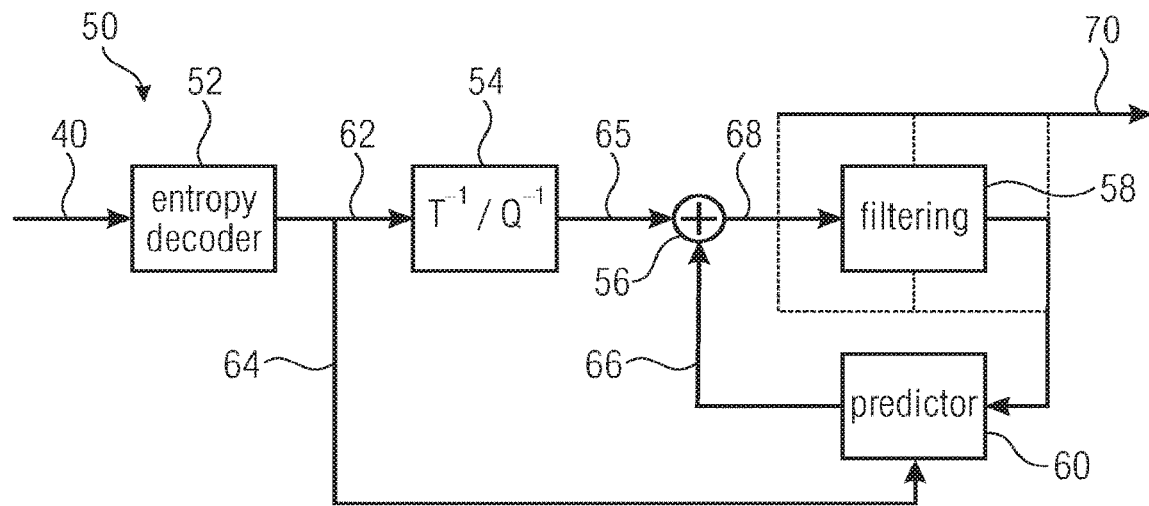
FIG. 2 shows a schematic block diagram showing a video decoder fitting to the video encoder of FIG. 1.

FIG. 2 shows a decoder which fits to the encoder FIG. 1, i.e., is able to decode the bitstream 40. The decoder of FIG. 2 is generally indicated by reference sign 50 and comprises an entropy decoder, a retransform/dequantizing module 54, a combiner 56, a filter 58 and a predictor 60. The entropy decoder 42 receives the bitstream and performs entropy decoding in order to recover the residual data 62 and the coding parameters 64. The retransform/dequantizing module 54 dequantizes and retransforms the residual data 62 and forwards the residual signal thus obtained to combiner 56. Combiner 56 also receives a prediction signal 66 from predictor 60 which, in turn, forms the prediction signal 66 using the coding parameter 64 on the basis of the reconstructed signal 68 determined by combiner 56 by combining the prediction signal 66 and the residual signal 65. The prediction mirrors the prediction finally chosen be predictor 18, i.e. the same prediction modes are available and these modes are selected for the individual blocks of pictures 12 and 15 and steered according to the prediction parameters. As already explained above with respect to FIG. 1, the predictor 60 may use the filtered version of the reconstructed signal 68 or some intermediate version thereof, alternatively or additionally. The pictures of the different layers to be finally reproduced and output at output 70 of decoder 50 may likewise be determined on an unfiltered version of the combination signal 68 or some filtered version thereof.

In accordance with the tile concept, the pictures 12 and 15 are subdivided into tiles 80 and 82, respectively, and at least the predictions of blocks 39 and 41 within these tiles 80 and 82, respectively, are restricted to use, as a basis for spatial prediction, merely data relating to the same tile of the same picture 12, 15, respectively. This means, the spatial prediction of block 39 is restricted to use previously coded portions of the same tile, but the temporal prediction mode is unrestricted to rely on information of a previously coded picture such as picture 12'. Similarly, the spatial prediction mode of block 41 is restricted to use previously coded data of the same tile only, but the temporal and inter-layer prediction modes are unrestricted. The subdivision of pictures 15 and 12 into six tiles, respectively, has merely been chosen for illustration purposes. The subdivision into tiles may be selected and signaled within bitstream 40 individually for pictures 12', 12 and 15, 15', respectively. The number of tiles per picture 12 and 15, respectively, may be any of one, two, three, four, six and so forth, wherein tile partitioning may be restricted to regular partitioning into rows and columns of tiles only. For the sake of completeness, it is noted that the way of coding the tiles separately may not be restricted to the intra-prediction or spatial prediction but may also encompass any prediction of coding parameters across tile boundaries and the context selection in the entropy coding may also be restricted to be dependent only on data of the same tile. Thus, the decoder is able to perform the just-mentioned operations in parallel, namely in units of tiles.

Figure 3:
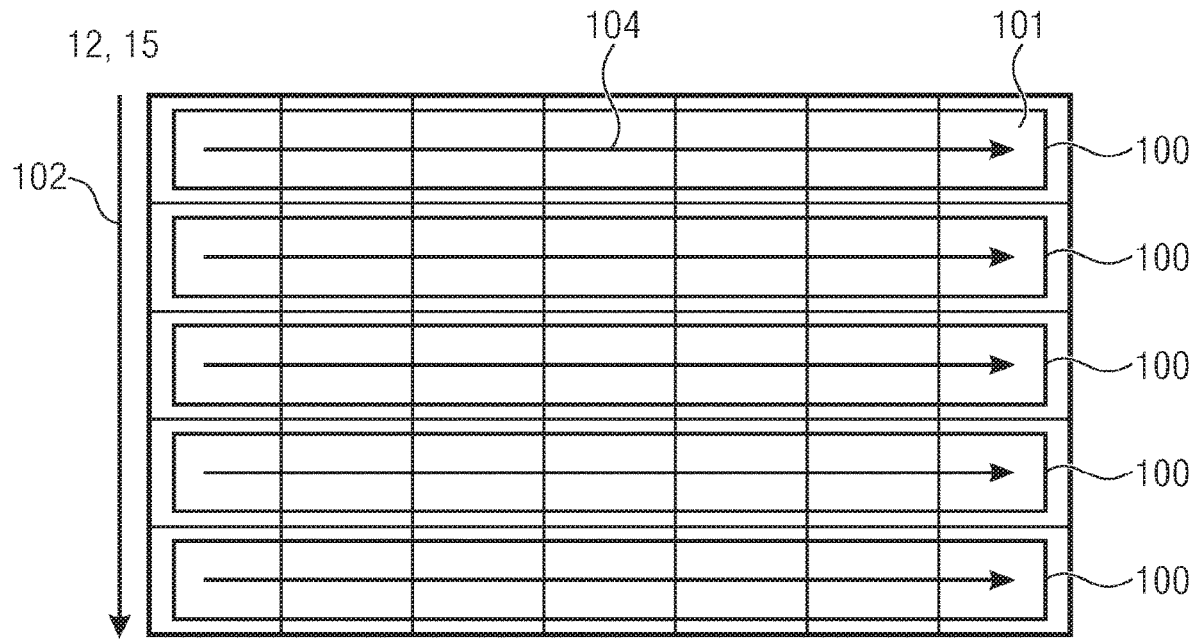
FIG. 3 shows a schematic diagram of a picture subdivided into substreams for WPP processing.

The encoder and decoders of FIGS. 1 and 2 could alternatively or additionally be able to use the WPP concept. See FIG. 3. WPP substreams 100 also represent a spatial partitioning of a picture 12, 15 into WPP substreams. In contrast to tiles and slices, WPP substreams do not impose restrictions onto predictions and context selections across WPP substreams 100. WPP substreams 100 extend row-wise such as across rows of LCUs (Largest Coding Unit) 101, i.e. the greatest possible blocks for which prediction coding modes are individually transmittable in the bitstream, and in order to enable parallel processing, merely one compromise is made in relation to entropy coding. In particular, an order 102 is defined among the WPP substreams 100, which exemplarily leads from top to bottom, and for each WPP substream 100, except for the first WPP substream in order 102, the probability estimates for the symbol alphabet, i.e. the entropy probabilities, are not completely reset but adopted from or set to be equal to the probabilities resulting after having entropy coded/decoded the immediately preceding WPP substream up to the second LCU, thereof, as indicated by lines 104, with the LCU order, or the substreams' decoder order, starting, for each WPP substream at the same side of the picture 12 and 15, respectively, such as the left-hand side as indicated by arrow 106 and leading, in LCU row direction, to the other side. Accordingly, by obeying some coding delay between the sequence of WPP substreams of the same picture 12 and 15, respectively, these WPP substreams 100 are decodable/codable in parallel, so that the portions at which the respective picture 12, 15 is coded/decoded in parallel, i.e. concurrently, forms a kind of wavefront 108 which moves across the picture in a tilted manner from left to right.

It is briefly noted that orders 102 and 104 also define a raster scan order among the LCUs leading from the top left LCU 101 to the bottom right LCU row by row from top to bottom. WPP substreams may correspond to one LCU row each. Briefly referring back to tiles, the latter may also restricted to be aligned to LCU borders. Substreams may be fragmented into one or more slices without being bound to LCU borders as far as the borders between two slices in the inner of a substream is concerned. The entropy probabilities are, however, adopted in that case when transitioning from one slice of a substream to the next of the substream. In case of tiles, whole tiles may be summarized into one slice or one tile may be fragmented into one or more slices with again not being bound to LCU borders as far as the borders between two slices in the inner of a tile is concerned. In case of tiles, the order among the LCUs is changed so as to traverse the tiles in tile order in raster scan order first before proceeding to the next tile in tile order.

As described until now, picture 12 may be partitioned into tiles or WPP substreams, and likewise, picture 15 may be partitioned into tiles or WPP substreams, too. Theoretically, WPP substream partitioning/concept may be chosen for one of pictures 12 and 15 while tile partitioning/concept is chosen for the other of the two. Alternatively, a restriction could be imposed onto the bitstream according to which the concept type, i.e. tiles or WPP substreams, has to be the same among the layers. Another example for a spatial segment encompasses slices. Slices are used to segment the bitstream 40 for transmission purposes. Slices are packed into NAL units which are the smallest entities for transmission. Each slice is independently codable/decodable. That is, any prediction across slice boundaries is prohibited, just as context selections or the like is. These are, altogether, three examples for spatial segments: slices, tiles and WPP substreams. Additionally all three parallelization concepts, tiles, WPP substreams and slices, can be used in combination, i.e. picture 12 or picture 15 can be split into tiles, where each tile is split into multiple WPP substreams. Also slices can be used to partition the bitstream into multiple NAL units for instance (but not restricted to) at tile or WPP boundaries. If a picture 12, 15 is partitioned using tiles or WPP substreams and, additionally, using slices, and slice partitioning deviates from the other WPP/tile partitioning, then spatial segment shall be defined as the smallest independently decodable section of the picture 12,15. Alternatively a restriction may be imposed on the bitstream which combination of concepts may be used within a picture (12 or 15) and/or if borders have to be aligned between the different used concepts.

Before discussing the above presented concepts of the present application, again referring to FIGS. 1 and 2, it should be noted that the block structure of the encoder and decoder in FIGS. 1 and 2 is merely for illustration purposes and the structure may also be different.

According to a first aspect, which could be called "Alignment of Tile Boundaries", a long-term syntax element structure is used to signal a guarantee that, during a predetermined time period, such as a time period extending over a sequence of pictures, the pictures 15 of the second layer are subdivided so that borders 84 between the spatial segments 82 of the pictures of the second layer overlay every border 86 of the spatial segments 80 of the first layer. The decoder still periodically determines, in time intervals smaller than the predetermined time period, such as in units of individual pictures, i.e. in picture pitch intervals, the actual subdivision of the pictures 12, 15 of the first layer and the second layer into the spatial segments 80 and 82 based on short-term syntax elements of the multi-layer video data stream 40, but the knowledge on the alignment already helps in planning the parallel processing workload assignment. The solid lines 84 in FIG. 1, for example, represent an example where the tile boundaries 84 are completely spatially aligned to the tile boundaries 86 of layer 0. The just-mentioned guarantee would, however, also allow for the tile partitioning of layer 1 to be finer than the tile partitioning of layer 0 so that the tile partitioning of layer 1 would encompass further, additional tile boundaries not spatially overlapping any of the tile boundaries 86 of layer 0. In any case, the knowledge about the tile registration between layer 1 and layer 0 helps the decoder in allocating the workload or processing power available among the spatial segments concurrently processed in parallel. Without the long-term syntax element structure, the decoder would have to perform the workload allocation in the smaller time intervals, i.e. per picture, thereby wasting computer power in order to perform the workload allocation. Another aspect is "opportunistic decoding": a decoder with multiple CPU cores may exploit the knowledge about the parallelism of the layers to decide to try to decode or not try to decode layers of higher complexity, i.e. of higher spatial resolution or higher number of layers. Bitstreams that exceed the capability of a single core might be decodable by utilizing all cores of the same decoder. This information is especially helpful, if profile and level indicators do not involve such indication on minimum parallelism.

Figure 4:
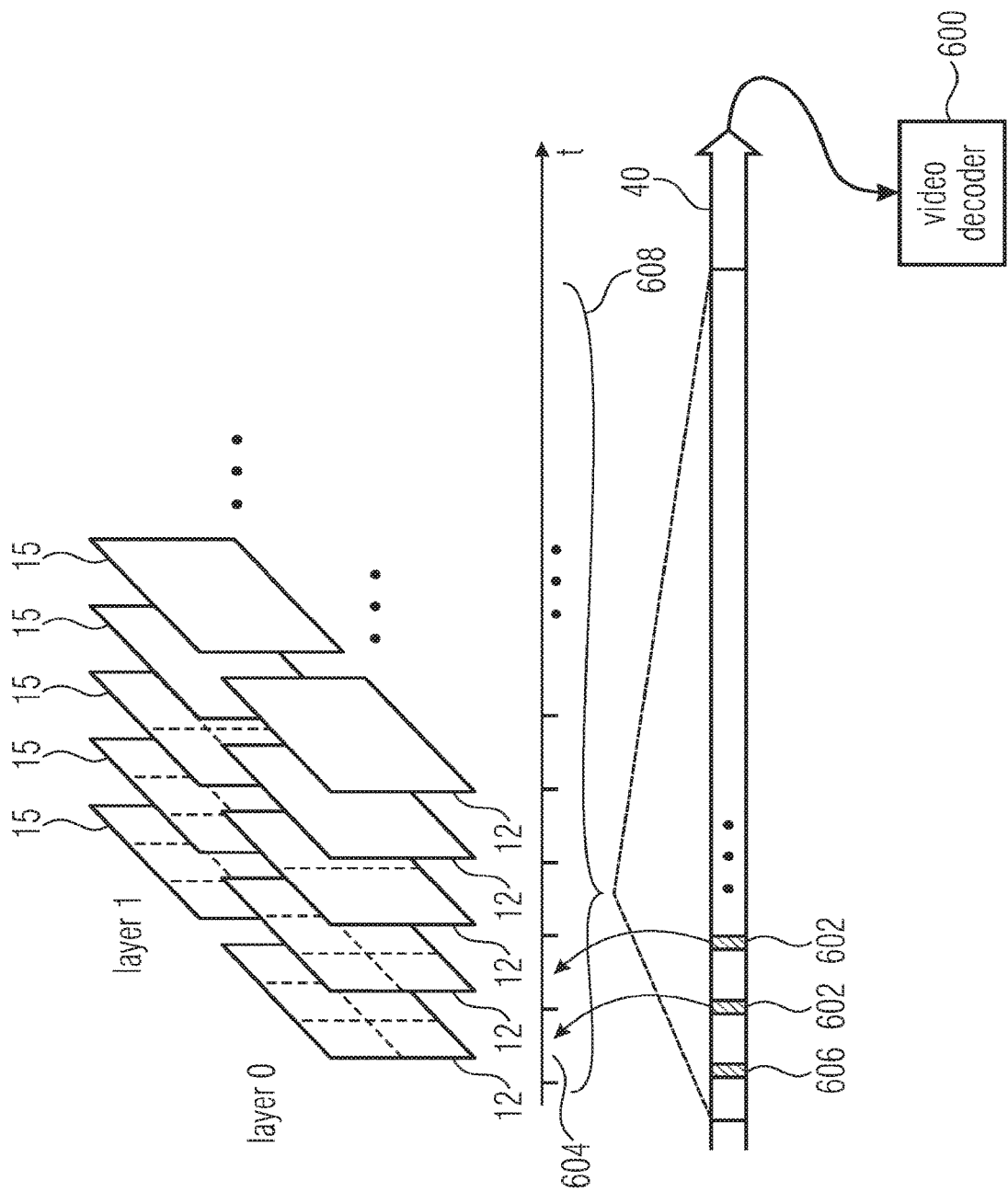
FIG. 4 schematically shows a video decoder in accordance with an embodiment according to which an inter-layer alignment of spatial segments of base and enhancement layers is exploited so as to alleviate the decoding process.

In order to more clearly understand the just-outlined aspect of the present application, reference is made to FIG. 4 showing a video decoder 600 which could be implemented as set out with respect to FIG. 2. That is, the decoder 600 is configured to decode a multi-layer video data stream into which a scene is coded in a hierarchy of layers using inter-layer prediction from a first layer O to a second layer 1 as already described above. The video decoder supports parallel decoding the multi-layer video data stream in spatial segments into which pictures of the layers are subdivided, the spatial segments being, for example, tiles, WPP substreams or the like. In other words, the video decoder is able to decode the multi-layer video data stream in parallel and in doing so, the video decoder 600 operates on the pictures 12 and 15 of layers O and 1 in units of spatial segments.

For example, as outlined above, the spatial segments could be tiles and while video decoder 600 is configured to decode the pictures 12 and 15 of layers O and 1 using intra-picture spatial prediction, the video decoder 600 disrupts the intra-picture spatial prediction for each tile at its tile boundary. The subdivision of the pictures 12 and 15 into the tiles is signaled within the data stream 40 by way of short-term syntax elements on a short-term basis, such as for example in units of time intervals, such as for example individually for the time frames 604 to which each picture 12 and 15 relates, i.e. for each pair of pictures 12 and 15 belonging to a certain time frame 604. As described above, the subdivision of pictures 12 and 15 into tiles could be restricted to rectangular regular subdivisions only, i.e. into rows and columns of tiles. The short-term syntax elements 602 would thus set the number of rows and the number of columns of the tile-subdivisioning for each picture 12 and for each picture 15 of both layers individually. In decoding the inbound multi-layer video data stream 40, video decoder 600 is configured to apply spatial prediction, and potentially temporal prediction. Optionally, video decoder 600 entropy decodes each of the tiles separately. If probability adaptation is used during decoding each tile, video decoder 600 initializes the entropy probabilities for each tile separately so that the tiles are entropy decodable in parallel. In addition to spatial prediction, and optionally temporal prediction, the video decoder 600 supports inter-layer prediction as far as the decoding of the tiles of pictures 15 of layer 1 is concerned. As described above, inter-layer prediction may concern different parameters involved in decoding layer 1: inter-layer prediction may predict a prediction residual of layer 1, such as transform coefficients, prediction modes used in decoding layer 1, prediction parameters used in decoding layer 1, samples of the enhancement layer 1 picture and so forth. The inter-layer prediction predicts portions within tiles of pictures 15 of layer 1 based on already decoded portions of pictures 12 of layer 0—either directly (centrally) co-located ones or ones slightly spatially deviating from the directly co-located position by way of, for example, a disparity vector prediction parameter controlling the inter-layer prediction in the case of the layers 0 and 1 concerning, for example, different views of the same scene.

Video decoder 600 is responsive to a long-term syntax element structure of data stream 40, indicated using reference sign 606 in FIG. 4, so as to differently process a predetermined time period 608 following the long-term syntax element structure 606, the predetermined time period 608 encompassing several time intervals, i.e. multiple time frames 604 for which the short-term syntax elements 602 individually signal the picture's subdivision into tiles. It should be noted that 608 may relate to the scope (=time period) of an SPS and SPS changes lead to significant re-initialization anyway. The just-mentinoed note is also valied for all embodiments relating to the other aspects as far as the long-term feature is mentioned therein. In particular, if the long-term syntax element structure 606 assumes a value out of a first possible-values-set, the video decoder 600 interprets this circumstance as a guarantee that during the predetermined time period the pictures 15 of layer 1 are subdivided so that borders between the tiles of pictures 15 overlay every border of the tiles of the pictures 12 of layer 0. The video decoder 600 still inspects, in that case, the short-term syntax elements 602 in order to determine for the time intervals 602 within the predetermined time period 608 the subdivision of pictures 12 and 15 into their tiles, but video decoder 600 may rely on the fact, and will realize that, the borders of the base layer tiles of pictures 12 are completely overlaid by borders of the enhancement layer tiles of pictures 15, i.e. that the tile subdivision of pictures 15 locally corresponds, or represents, a spatial refinement of the subdivision of pictures 12 into tiles, by comparing each time-aligned pair of pictures 12 and 15. As described above, the video decoder 600 may take advantage of such signaling, i.e. long-term syntax element structure 606 assumes a value out of the first possible-values-set, by accordingly scheduling the parallel processing of the tiles of pictures 12 and 15 within predetermined time period 608 in parallel, i.e. in parallel decoding of tiles of a temporally aligned pair of pictures 12 and 15. For example, in case of the long-term syntax element's structure assuming the value out of the first possible-values-set, the video decoder 600 may know the following: for a certain picture 12 of layer 0, the first tile in tile order among the tiles of picture 12 either locally coincides with a respective tile of the time-aligned enhancement layer picture 15, or completely locally overlays the first tile of the time-aligned enhancement layer picture 15 in tile order among the tiles of the enhancement layer picture 15. Accordingly, at least in the case of inter-layer prediction without disparity/motion compensation, video decoder 600 may commence decoding the first tile of the enhancement layer picture 15 as soon as the decoding of the first tile of the time-aligned base layer picture 12 has been finalized, since the just-mentioned guarantee indicates to the video decoder 600 that the co-located portions of the base layer picture 12 needed for inter-layer prediction will be available for the whole first tile of the enhancement layer picture 15. The inter-layer offset or degree of parallelism between base layer pictures 12 and enhancement layer pictures 15 may thus be recognized/determined by video decoder 600 to be equal to one tile of the base layer pictures 12. The offset may be slightly increased in case of the inter-layer prediction involving disparity vectors having a non-zero vertical component and/or disparity vectors having a horizontal component which shifts the corresponding portions within the base layer picture towards the right, wherein the tile order among the tiles may lead in a raster scan order row-wise from the left top corner of pictures 12, 15 towards the bottom right corner thereof.

If the long-term syntax element structure, however, assumes a value out of a second possible-values-set, which is distinct from the first possible-values-set, video decoder 600 does not take advantage of any guarantee, but plans and schedules on a short-term basis using the short-term syntax elements 602 the parallel decoding of the tiles of pictures 12 and 15 with, potentially, parallel decoding for at least some of the time-aligned pairs of pictures 12 and 15, tiles of base and enhancement layers. In that case, the video decoder 600 determines the minimum inter-layer offset or interlayer spatial processing offset in the parallel decoding between layers 0 and 1, i.e. the degree of parallelism between layers 0 and 1, on the short-term basis which is, however, a cumbersome procedure. At least for a subset of the set of possible values of the short-term syntax elements, there exists a border between the spatial segments of the pictures of the second layer not overlaying any of the borders of the spatial segments of the first layer. But a further subset of the set of possible values for the short-term syntax elements exist according to which borders between the spatial segments of the pictures of the second layer overlay every border of the spatial segments of the first layer. The latter subset is solely used in case of the long-term syntax element indicating tile boundaries alignment between base and enhancement layers.

Additionally or alternatively, video decoder 600 may use or exploit the fact that the long-term syntax element structure assumes a value out of the first possible-values-set in order to perform a trial of, i.e. try to perform, decoding layer 1 at all, with refraining to perform this trial in case of the long-term syntax element structure 606 assuming a value out of the second possible-values-set. In that case, especially for battery driven devices, valuable computation power is saved in cases where the outcome or success in decoding the enhancement layer 1 in time, i.e. in real time, is speculative. Is it worth mentioning that refraining may also be chosen based on the level indicators mentioned below with respect to the fourth aspect.

Although FIG. 4 has been described above exemplarily using tiles as spatial segments, it is clear that the video decoder 600 may take advantage of the long-term syntax element structure and the guarantee which may be signaled thereby, in connection with other spatial segments such as substreams or slices. In the former case, the video decoder 600 would decode the pictures 12 and 15 of the layers using intra-pictures spatial prediction with decoding the spatial segments of a picture of the first layer 12 in parallel and supporting the intra-picture spatial prediction crossing boundaries of the spatial segments of the picture of the first layer and with obeying a decoding delay between decoding of these spatial segments, i.e. substreams. As described above, substreams may correspond to horizontal stripes of the respective picture, i.e. vertically subdivide the respective picture. In decoding each substream, video decoder 600 may use a decoding order which generally leads from left to right, and the decoding order defined among the substreams of a picture may lead from top to bottom. Using a typical spatial prediction concept, according to which spatial prediction is performed from a top neighboring already decoded portion and a left-hand already decoded portion of the current picture, obeying a certain decoding delay between immediately succeeding substreams, thus, allows a parallel decoding of the substreams. The decoding delay may be measured in, for example, units of LCUs. This may be done in pictures 12 of layer 0 as well as pictures 15 of layer 1. Thus, parallelism in decoding the video data stream may involve both parallelism within the pictures 12 and 15 individually, but also the parallel decoding of substreams belonging to pictures 12 and 15 of different layers of one time frame 604. As far as an optional entropy decoding of the substreams is concerned, same may involve an adaptation of the entropy probability during the course of decoding the respective substream. The first substream in substream order of each picture 12 or 15 may be subject to an individual initialization of the entropy probabilities independent from other substreams. Any subsequent substream may be subject to entropy probability initialization depending on intermediately adapted entropy probabilities of the immediately preceding substream in decoding order of the same picture such as by adopting the entropy probabilities adapted during decoding the immediately preceding substream up to a certain distance from the left-hand of the respective preceding substream, such as after having decoding two LCUs of the immediately preceding substream.

Even in the wavefront parallel processing substream case, the video decoder 600 is able to take advantage of the long-term syntax element structure 606: if the guarantee is signaled by way of this syntax element structure 606, video decoder 600 may rely on the fact that all borders between consecutive/neighboring substreams of the base layer pictures 12 within the predetermined time period 608 are overlaid by a respective border between neighboring/successive substreams of the time-aligned enhancement layer pictures 15. That is, either a base layer substream locally coincides with a respective enhancement layer substream of a time-aligned enhancement layer picture 15, or same exactly corresponds to two or more substreams of the time-aligned enhancement layer picture. Accordingly, if the guarantee applies, the decoder 600 knows that decoding the first substream of the time-aligned enhancement layer picture 15 may be commenced as soon as the decoding of the first substream of the base layer picture 12 has been finalized.

As described above, differing from the tile subdivisioning, the short-term syntax elements 602 may be selected such that same define the position of the substreams in pictures 12 and 15 in relation to a subdivision of these pictures into some coding blocks, such as LCUs. Substreams may accordingly be a collection of one or more rows of such coding blocks. As in the case with the tile subdivisioning, the time intervals 604 may be such that the short-term syntax elements 602 signal the subdivision of pictures 12 and 15 into substreams on a per picture basis, i.e. on a per picture frame 604 basis. If the guarantee is not provided by the long-term syntax element structure 606, video decoder 600 may nevertheless try to decode, in parallel, substreams of different layers of a common time frame, but in order to do so, the video decoder 600 needs to inspect the short-term syntax element 602.

As it is the case with using tiles as spatial segments, the video decoder 600 may render a speculative trial of decoding the enhancement layer 1 dependent on the value assumed by the long-term syntax element structure 606.

It should be noted that as far as the video encoder side is concerned, a respective video encoder which may be implemented as shown in FIG. 1, inserts and sets the long-term syntax element structure 606 into data stream 40 and decides on granting the guarantee to decoder 600 or not. If granted, the encoded restricts the possibilities in setting the short-term syntax element 602 for the corresponding predetermined time period 608 to settings which obey the border alignment guarantee. If not, the encoder remains free to set the short-term syntax elements 602 during time period 608 as it likes to. When using tiles as the spatial segments, the encoder obeys the restriction that the spatial prediction does not cross tile boundaries and that the optional entropy encoding of the tiles of the pictures 12 and 15 is performed in a self-contained manner for each tile. For example, the entropy probabilities are initialized for each tile anew independent from other tiles, for each tile. In case of substreams, the entropy probability initialization of the substreams is performed anew, i.e. independent from any other substream, for any first substream of a respective picture 12, 15, and by adopting the entropy probabilities as adapted up to an intermediate position of an immediately preceding substream as far as any second and following substreams are concerned. The spatial prediction is performed without any restriction concerning the crossing of substream borders.

In a manner described with respect to FIG. 4, the alignment concept could be introduced into the currently envisaged extension of the HEVC standard, namely in the manner described below. Insofar, the description brought forward immediately in the following shall also be interpreted as a basis of possible implementation details concerning the description brought forward above with respect to FIG. 4.

HEVC allows dividing the CTBs of a coded base layer picture via a grid of vertical and horizontal boundaries into rectangular regions that are referred to as tiles and can be processed independently except for in-loop filtering. The in-loop filters can be turned off at tile boundaries to make them completely independent.

Parsing and prediction dependencies are broken at tile boundaries much like on picture boundaries, whereas in-loop filters can cross tile boundaries if configured accordingly in order to reduce tile boundary artifacts. Therefore, processing of individual tiles does not rely on other tiles within a picture completely or to a vast extent depending of the filtering configuration. A restriction is installed in that all CTBs of a tile should belong to the same slice or all CTBs of a slice should belong to the same tile. As can be seen in FIG. 1, tiles force the CTB scan order to regard the order of tiles, i.e. going through all CTBs belonging to the first, e.g. upper-left tile, before continuing with the CTBs that belong to the second tile, e.g. upper-right. Tile structure is defined through number and size of the CTBs in each tile row and column that constitute a grid within a picture. This structure can either be changing on a per frame basis or stay constant throughout a coded video sequence.

FIG. 5 shows an exemplary division of CTBs within a picture into nine tiles. The thick black lines represent tile boundaries and the numbering represents the scanning order of CTBs, also revealing a tile order.

An enhancement layer tile of an HEVC extension can be decoded as soon as all tiles are decoded that cover that corresponding image area in the base layer bitstream.

The following section describes constrains, signaling and decoding process modifications that allow easier access to the base layer information using the concept of FIG. 4.

The simplest case for tile level parallelization is, when tile boundaries in base and enhancement layer are aligned. For SNR scalability this means, that the boundaries are exactly at the same position. For spatial scalability this means, that for each two enhancement layer pels, which belong to the same tile, the corresponding base layer pels also belong to the same tile and that that for each two base layer pels, which belong to the same tile, the corresponding enhancement layer pels also belong to the same tile.

HEVC features short-term signaling corresponding to 602 in FIG. 4 to indicate the dimension and structure of tiles within a picture on a per picture basis by the use of picture parameter sets given below with column_width_minus1 [i] and row_height_minus1 [i] from [1]. FIG. 6 shows the exemplary syntax.

HEVC further features signaling of restrictions that guarantee a certain setting for a HEVC coded video sequence, e.g. to indicate a fixed tile structure in a single layer HEVC coded video sequence (cp. tiles_fixed_structure_flag in VUI syntax given below). Further restrictions of tiles in a scalable coded video sequence are beneficial for decoder initialization and operation. To allow the decoder to start decoding the enhancement layer image area that is associated with a base layer tile after that base layer tile is finished, it is not necessitated to enforce a complete alignment. Especially in spatial scalability, it might be helpful to allow more tiles in the enhancement layer than in the base layer. For instance in factor two spatial scalability, four times the number of pels is contained in the enhancement layer image area compared to the corresponding base layer image area. So it might be helpful to allow four tiles in the enhancement layer for each base layer tile. See FIG. 7, which shows an example for aligned tile boundaries with spatial scalability. All vertical boundaries are aligned in the base and enhancement layer. In the enhancement layer additional tiles (horizontal boundaries) are used to allow parallelization using the same number of pels per enhancement layer tile as in the base layer tile partitioning.

Thus we define tile boundary alignment in a way that only each base layer boundary has a corresponding boundary in the enhancement layer, but not the other way around. Precisely this means, that for each two enhancement layer pels, which belong to the same tile, the corresponding base layer pels also belong to the same tile.

The signaling 606 helps to initialize a parallel decoder environment which, otherwise, would have to gather the information by parsing multiple parameter sets. Furthermore, in the form of a bitstream restriction, the concept of FIG. 4 guarantees that the said restriction is valid for the complete coded video sequence, for example.

A possible embodiment allows saving signaling of the base layer tile boundaries in the enhancement layer if tile boundaries of the base layer are a subset of the tile boundaries of the enhancement layer.

The information about tile alignment may be signaled explicitly in the bitstream for easy access by the decoder.

In a specific embodiment the signaling could be achieved by using a flag in the VUI parameters of the enhancement layer SPS, as given in FIG. 8:

tiles_fixed_structure_flag equal to 1 indicates that each picture parameter set that is active in the coded video sequence has the same value of the syntax elements num_tile_columns_minus1, num_tile_rows_minus1, uniform_spacing_flag, column_width_minus1[i], row_height_minus1[i] and loop_filter_across_tiles_enabled_flag, when present. tiles_fixed_structure_flag equal to 0 indicates that tiles syntax elements in different picture parameter sets may or may not have the same value. When the tiles_fixed_structure_flag syntax element is not present, it is inferred to be equal to 0.

Note that the signaling of tiles_fixed_structure_flag equal to 1 is a guarantee to a decoder that each picture in the coded video sequence has the same number of tiles distributed in the same way which might be useful for workload allocation in the case of multi-threaded decoding.

tile_boundaries_aligned_flag corresponds to the structure 606 in FIG. 4. If same is equal to 1 it indicates that all tile boundaries of the corresponding base layer picture have corresponding tile boundaries in the given enhancement layer. tile_boundaries_aligned_flag equal to 0 indicates that there is no restriction on the tile configuration between corresponding base layer and the given enhancement layer.

It is noted that the long-term syntax element structure may guarantee that, during the predetermined time period, e.g. picture sequence, a minimum number of spatial segments 82 into which the pictures 15 of the second layer are subdivided is n times more than the minimum number of spatial segments 80 into which the pictures 12 of the first layer are subdivided or that each spatial segment of pictures 12 is made up of exactly n spatial segments of time-aligned picture 15, with n depending on the value of the long-term syntax element structure. In the case of FIG. 7, n would be equal to 3. The decoder would still periodically determine, in time intervals smaller than the predetermined time period, the actual subdivision of the pictures 12, 15 of the first layer and the second layer into the spatial segments 80 and 82 based on the short-term syntax elements of the multi-layer video data stream 40, but again, the guarantee could be exploited by the decoder in order to more efficiently perform the workload allocation. Another aspect is "opportunistic decoding": a decoder with multiple CPU cores may exploit the guarantee as a hint regarding the parallelism of the layers and to decide thereon to decode layers of higher complexity, i.e. of higher spatial resolution or higher number of layers. Bitstreams that exceed the capability of a single core might be decodable by utilizing all cores of the same decoder. This information is especially helpful, if profile and level indicators do not involve such indication on minimum parallelism.

Figure 9:
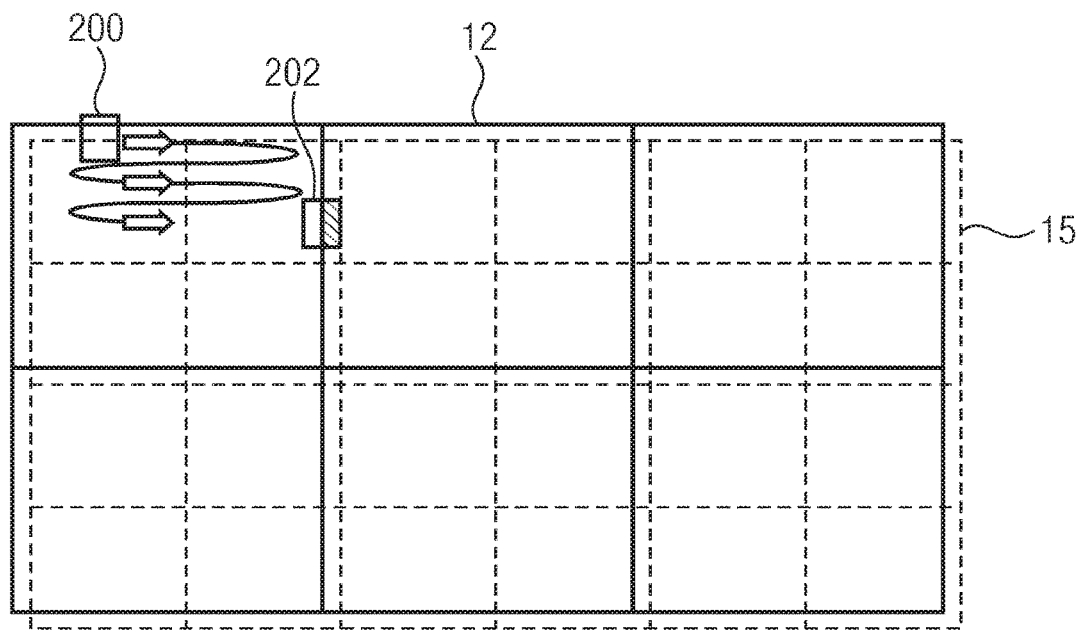
FIG. 9 shows a schematic diagram of a picture, its subdivision into tiles and the application of an interpolation filter in order to perform upsampling for the sake of inter-layer prediction.

A second aspect discussed and presented hereinafter, concerns a concept which could be called "Restricted Inter-Layer Upsampling": a syntax element in the bitstream (c.p., exemplarily, independent_tile_upsampling_idc) is used in order to steer the upsampling filter 36 in case of a spatial scalable multi-layer video. If the upsampling filtering is performed in layer 0 across spatial segment boundaries 86, then the delay to be met in parallel decoding/encoding the spatial segments 82 of layer 1 relative to the encoding/decoding of the spatial segments 80 of layer 0 is increased as the upsampling filtering combines, and thus renders mutually dependent, the information of neighboring spatial segments of layer 0 to serve as the prediction reference 38 used in inter-layer prediction of blocks 41 of layer 1. See, for example, FIG. 9 Both pictures 12 and 15 are shown in an overlaying manner with both pictures dimensioned and registered to each other according to spatial correspondence, i.e. portions showing the same portion of the scene overlay each other. Pictures 12 and 15 are exemplarily shown to be split into 6 and 12, spatial segments such as tiles, respectively. A filter kernel 200 is illustratively shown as moving across the left-upper tile of picture 12 so as to obtain the upsampled version thereof which serves as a basis for inter-layer predicting any block within the tiles of picture 15, spatially overlaying the left-upper tile. At some intermediate instances such as at 202 the kernel 200 overlaps a neighboring tile of picture 12. The sample value of the mid of kernel 200 at position 202 of the upsampled version thus depends on both samples of the upper-left tile of picture 12 as well as samples of the tile of picture 12 to the right thereof. If the upsampled version of picture 12 serves as the basis for inter-layer prediction, the inter-layer offset in parallel processing the segments of the layers is increased. A restriction could, thus, help in increasing the parallelization amount across the different layers and, accordingly, decreasing the overall coding delay. Naturally, the syntax element could also be a long-term syntax element which is valid for a sequence of pictures. The restriction could be achieved in one of the following ways: filling the overlapping portion of kernel 200 at overlapping position 202, for example, with a central tendency of the sample values within the non-dashed portion of kernel 200, extrapolating the non-dashed portion using linear or other functions into the dashed one or the like.

Figure 10:
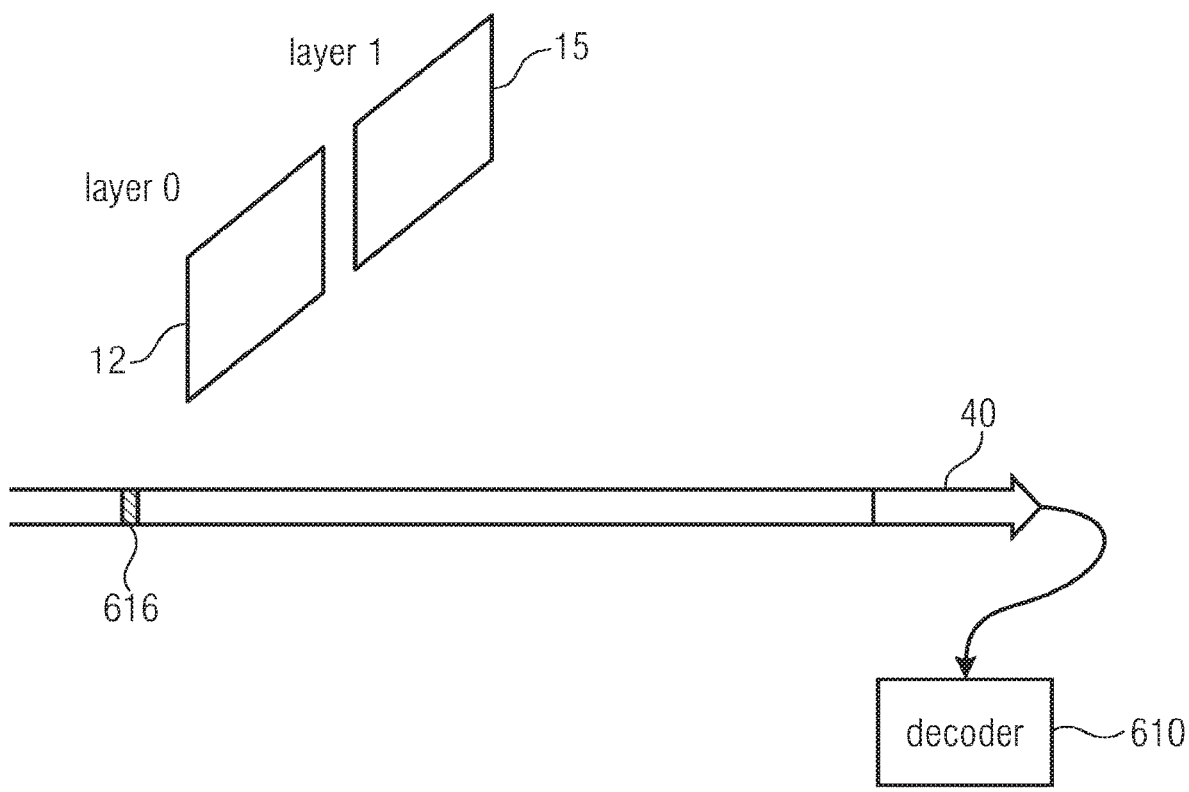
FIG. 10 shows a schematic block diagram of a multi-layer decoder which is configured to be responsive to a syntax element within the multi-layer data stream so as to switch on or off an upsampling interpolation separation.
Figure 11:
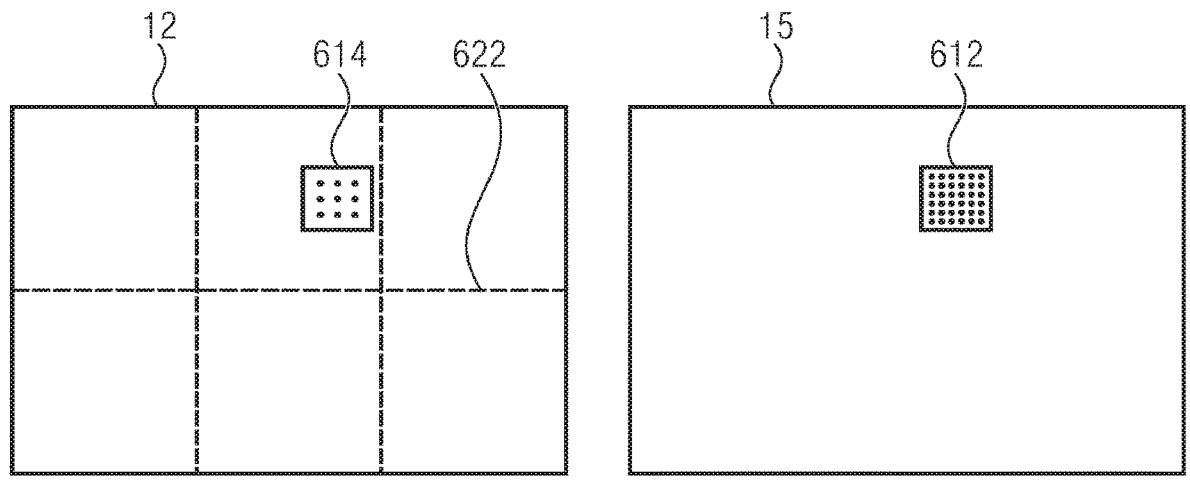
FIG. 11 shows a schematic diagram of a pair of base layer and enhancement layer pictures using inter-layer prediction from base layer to enhancement layer using upsampling so as to transit from base layer sample resolution to the increased enhancement layer sample resolution.

In order to render the latter aspect even clearer, reference is made to FIG. 10 which shows a decoder 610 receiving a spatially scalable bitstream 40 into which a picture is coded in different spatial layers corresponding to picture 12 in layer 0 and picture 15 in layer 1. At least for one of these spatial layers, decoder 610 is configured to decode same in spatial segments. Coinciding with the description above, these spatial segments may be tiles or substreams or slices. Likewise, the decoder 610 may be configured to subject such spatial segments of picture 12 or picture 15 to parallel decoding. That is, base layer picture 12 may be subdivided into spatial segments such as tiles and/or substreams and/or slices and/or enhancement layer picture 15 may be subdivided into tiles and/or substreams and/or slices. As far as the details concerning parallel decoding are concerned, reference is made to the above description of FIG. 4, which may be readily transferred onto a decoder 610 of FIG. 10. That is, in decoding base layer picture 12, decoder 610 uses spatial prediction, and optionally temporal prediction, if base layers 12 and 15 are, for example, part of a layered video. In case of tiles, spatial prediction is restricted to not cross tile boundaries and the same applies to entropy decoding, which is performed completely separately for tiles if entropy decoding is used. The same applies to the enhancement layer picture 15, while additionally supporting inter-layer prediction. As already described above, inter-layer prediction not only concerns prediction parameters of the enhancement layer which are predicted based on corresponding prediction parameters having been used in decoding the base layer, but also concerns predictions derived from reconstructed samples of the base layer picture at a co-located portion relative to the portion of the enhancement layer picture 15 currently to be predicted using inter-layer prediction. However, as bitstream 40 may be a spatially scalable bitstream, any co-located portion of the base layer picture 12 to form the basis of inter-layer prediction of a currently processed portion of the enhancement layer picture 15 may be to be upsampled by the decoder 610 in order to account for the higher spatial resolution of picture 15 relative to picture 12. See, for example, FIG. 11. A currently to be predicted portion of enhancement layer picture 15 is indicated in FIG. 11 using reference signs 612. The co-located portion in base layer picture 12 is indicated using reference sign 614. Owing to the higher spatial resolution of enhancement layer picture 15, the number of sample positions within portion 612 (indicated by dots) is illustrated to be higher than the samples within portion 614 (likewise indicated by dots). Accordingly, decoder 610 uses interpolation in order to upsample the already reconstructed version of portion 614 of the base layer picture 12. In doing so, the decoder 610 of FIG. 10 is responsive to a syntax element 616 in the spatially scalable bitstream 40.

Figure 12:
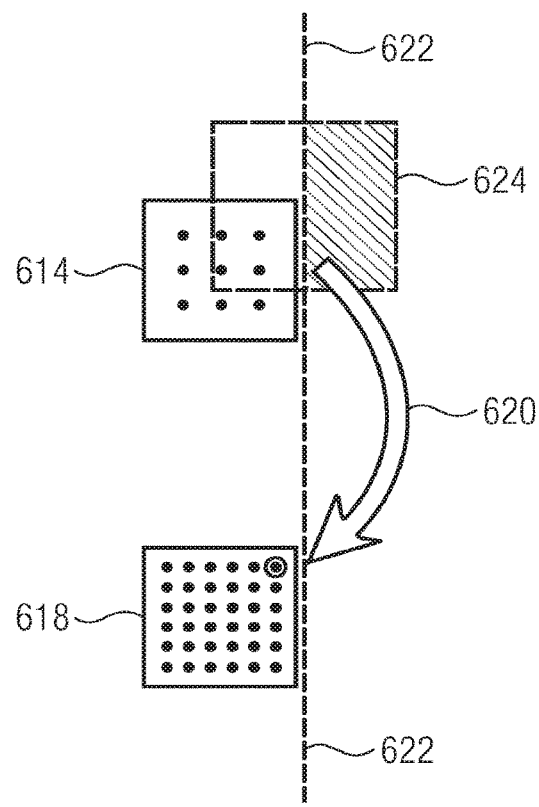
FIG. 12 shows a schematic diagram illustrating the switchable upsampling interpolation separation according to FIG. 10.

In particular, the just-mentioned responsiveness is explained in more detail with respect to FIG. 12. FIG. 12 shows portion 614 within base layer picture 12, i.e. the reference portion in the non-upsampled version thereof, as well as the corresponding upsampled version thereof, indicated using reference sign 618. As just mentioned, version 618, which is later used for inter-layer prediction by copying, for example, the respective upsampled sample values in portion 618 into the portion 612 of enhancement layer 15, is obtained from the base layer picture 12 by interpolation 620. However, the interpolation 620 depends on the just mentioned syntax element 616. The way the interpolation 620 changes depending on syntax element 616 pertains to the areas along borders between neighboring partitions of a partitioning of base layer picture 12 and its upsampled version, respectively. In particular, the partitioning depends on the aforementioned spatial segments into which at least one of pictures 12 and 15 are subdivided. The partitioning is illustrated in FIG. 11 within the base layer picture 12 using dashed lines 622. The partitioning 622 may, for example, as will be outlined in more detail below, correspond to a logical AND or logical OR combination of a spatial overlay of borders of spatial segments of pictures 12 and 15 or spatially coincide with the partitioning defined by the spatial segments of enhancement layer picture 15. In any case, depending on syntax element 616, decoder 610 either performs the interpolation 620 irrespective of the partitioning 622 or considering partitioning 622. When considering the partitioning, decoder 610 performs the interpolation 620 such that all the samples within upsampled portion 618 merely stem, or depend on, or are influenced by, samples of one of the partitions of partitioning 622, while being independent from any other partitions of partitioning 622. If, for example, partitioning 622 is either a local AND combination of the borders of the spatial segments of pictures 12 and 15 or a local OR combination thereof, then this means that all the samples of interpolated portion 618 stem from merely one partition of base layer picture 12. If, however, the syntax element 616 directs decoder 610 to be insensitive to partitioning 622, it may happen that different samples within interpolated portion 618 stem from neighboring partitions of partitioning 622.

612, for example, illustrates the case that a filter kernel 200 is used in order to perform the interpolation 620 and that, in order to obtain the interpolated sample encircled in FIG. 12, the kernel 624 overlaps a border between two neighboring partitions of partitioning 622. In that case, the decoder 610 is responsive to syntax element 616 so as to either fill the filter kernel 624 normally, i.e. by applying the filter kernel 624 onto the respective encompassed samples of base layer picture 12 completely, or by filling the fragment of filter kernel 624 protruding into the neighboring partition not including portion 614 and 618, respectively, indicated using hashing in FIG. 12, using a fallback rule according to which this respective fragment is filled independent from the underlying samples of base layer picture 12. For example, the hashed portion of filter kernel 624 is filled with some mean measure of the sample values of the non-hashed portion of filer kernel 624, or by way of some extrapolation. In another alternative, the sample values of the base layer picture 12 overlaid by the hashed portion are filled using a predetermined value such as 0 or the like. Generally, decoder 610 could treat the partition border separating the portion encompassing portion 614 and the neighboring partition just like an outer edge of picture 12 itself and could use, for example, the same fallback rule in the interpolation 620 as used in performing the upsampling/interpolation near or at the outer circumference of picture 12.

In accordance with one embodiment of the present application, the partitioning 622 is chosen to coincide with the base layer picture's subdivision into spatial segments irrespective of any subdivision of the enhancement layer picture 15 into spatial segments. Then, the inter-layer offset between decoding the base layer picture 12 and the enhancement layer picture 15 by decoder 610 may be decreased as portions such as portion 614 of the base layer picture 12 do not necessitate the decoder 610 to have the neighboring partition/spatial segment to be decoded before performing the inter-layer prediction of portion 612 of the enhancement layer picture 15.

Alternatively, decoder 610 could be configured to determine partitioning 622 to locally coincide with the subdivision of picture 15 into spatial segments. In another alternative, decoder 610 could be configured to select partitioning 622 to be merely made up of borders of spatial segments of pictures 12 and 15, which spatially coincide, i.e. so as to correspond to a logical AND of the borders of pictures 12 and 15—in other words, merely those borders of picture's 15 subdivision into spatial segments form corresponding borders between partitions of partitioning 622, which spatially correspond to respective borders of base layer picture's 12 subdivision into spatial segments.

It is also feasible, and will be outlined in more detail below, that the syntax element 616 may direct decoder 610 not only to either disregard partitioning 622 in interpolating 620 or not, but also distinguish between different ways of selecting partitioning 622. See, for example, FIG. 9, where tiles were exemplarily used as spatial segments. If syntax element 616 signals to decoder 610 to perform the interpolation 620 separately for partitioning 622, decoder 610 could, for example, use the borders of the base layer picture 12 as borders of partitioning 622 since they coincide with a finer subdivision of enhancement layer picture 15 into tiles. Accordingly, in order to commence decoding the second tile in the uppermost tile row of enhancement layer picture 15, decoder 610 does not need to wait for the finalization of decoding of the second tile in the uppermost row of the base layer picture 12, as the "interpolation separation" prohibits any mixture of reconstructed samples of the first two tiles in the uppermost row of the base layer picture 12. If adopting the enhancement layer picture's 15 subdivision into tiles completely, in order to determine partitioning 622, the interpolation separation is also performed at the dashed lines in FIG. 9 and decoder 610 is able to commence decoding the upper left tiles of the enhancement layer picture 15 even earlier, namely as soon as decoder 610 has managed to decode the respective co-located sub-portion of the first tile of the base layer picture 12. In this regard, it is noted that even in decoding tiles, decoder 610 may use some decoding order which may, for example, involve some raster scan order leading from the respective tile's upper left corner in a row-wise manner to the right bottom corner of the respective tile.

That is, in accordance with the second aspect, an encoder forming bitstream 40 is able to choose between two modes by way of syntax element 616: if syntax element 616 is set—and inserted into the bitstream 40—to direct decoder 610 to be insensitive to partitioning 622, a better inter-layer prediction may be achieved due to the better interpolation, but the obtainable degree of parallelization in parallel decoding pictures 12 and 15 is reduced, i.e. the minimum inter-layer offset to be obeyed is increased. In the other mode, syntax element 616 directs decoder 610 to take the partitioning 622 into account when performing interpolation 620 for inter-layer prediction purposes, and accordingly the inter-layer prediction quality is decreased in favor of an increased degree of parallelism and a reduced minimum inter-layer decoding offset in parallel decoding pictures 12 and 15, respectively.

Although the description of the second aspect of the present application primarily focused on a tile subdivisioning or a tile parallel processing concept, it should be clear that the usage of syntax element 616 in order to control interpolation 620 is also advantageous when using WPP substreams. See, for example, FIG. 13. FIG. 13 illustrates the case where the base layer picture 12 is exemplarity subdivided into two substreams wherein co-located portions of the enhancement layer picture 15 are both subdivided into two substreams each. In case of applying the interpolation separation responsive to syntax element 616, decoder 610 may commence decoding the first, i.e. uppermost, substream of enhancement layer picture 15, as soon as decoder 610 has decoded the first substream of the base layer picture 12 far enough in order to cover the respective left-hand portion of the first enhancement layer substream of picture 15 and this holds true even for those portions of the first enhancement layer substream of picture 15 bordering the second substream of picture 15 as the interpolation separation renders any inter-layer prediction independent from any reconstructed portions of the base layer substream of picture 12 spatially overlaying the second enhancement layer substream.

Before providing below a detailed embodiment which implements the above outlined switchable restricted inter-layer upsampling, it is noted that the syntax element 616 may signal or switch the restriction per time-frame in case of pictures 12 and 15 being a time-aligned pair of pictures of a video just as it was the case in FIG. 4, for example. Moreover, again, it is noted that a decoder in accordance with an embodiment of the present application may coincide with the description and functionalities provided above with respect to both FIG. 4 as well as FIG. 10. In this regard, it is noted that the description provided above with respect to FIG. 4 concerning the short-term syntax elements and the signaling of the position and location of the spatial segments of pictures 12 and 15 shall be treated as equally applying to the embodiment described with respect to FIGS. 10 to 13. Lastly, It is noted that the second aspect would also be advantageous if the decoder of FIG. 10 was a picture decoder decoding a picture in layers 0 and 1. The temporal component is optional.

Implementing restricted inter-layer upsampling in HEVC could be done as follows. In spatial scalability an upsampled base layer picture is used to predict the enhancement layer picture. In this process, a prediction value is calculated for each pel position of the enhancement layer using multiple pel values of the corresponding base layer image area (usually in horizontal and vertical direction). If pels from different base layer tiles are used, it is not possible to decode an enhancement layer tile only from base layer tile information covering the same image area as the enhancement layer tile. Signaling the restricted inter-layer upsampling as a bitstream restriction guarantees a decoder that the spatial partitioning signaled in all parameter sets of a coded video sequence will obey the restriction and thus simplifies initialization and operation of a parallel multi-layer decoder.

The concept of FIG. 10 could be implemented as a mechanism to disallow usage of neighboring pel information for upsampling that are not contained in the base layer tile that corresponds to the enhancement layer tile. It is signaled in the bitstream whether the decoder is allowed to use pels outside the corresponding image area of the base layer at all enhancement layer tile borders.

As an alternative it is signaled in the bitstream whether the decoder is allowed to use pels outside the corresponding image area of the base layer at all enhancement layer tile borders only for enhancement layer tile boundaries that correspond to base layer tile boundaries.

In a specific embodiment the upsampling of base layer at tile boundaries is performed as it would be on a picture boundary where no neighboring pels are available.

In a specific embodiment the signaling could be achieved by using a flag in the picture parameter set of the enhancement layer, as given in FIG. 14.

independent_tile_upsampling_idc corresponds to syntax element 612. independent_tile_upsampling_idc not being equal to 0 restricts the upsampling filter to not cross tile boundaries. If independent_tile_upsampling_idc is equal to 2, no base layer samples that lie outside the picture area that corresponds to the enhancement layer tile shall be used for upsampling. If independent_tile_upsampling_idc is equal to 1, the restriction applies only to enhancement layer tile boundaries which are aligned with base layer tile boundaries independent_tile_upsampling_idc equal to 0 does not imply this restriction.

Figure 15A:
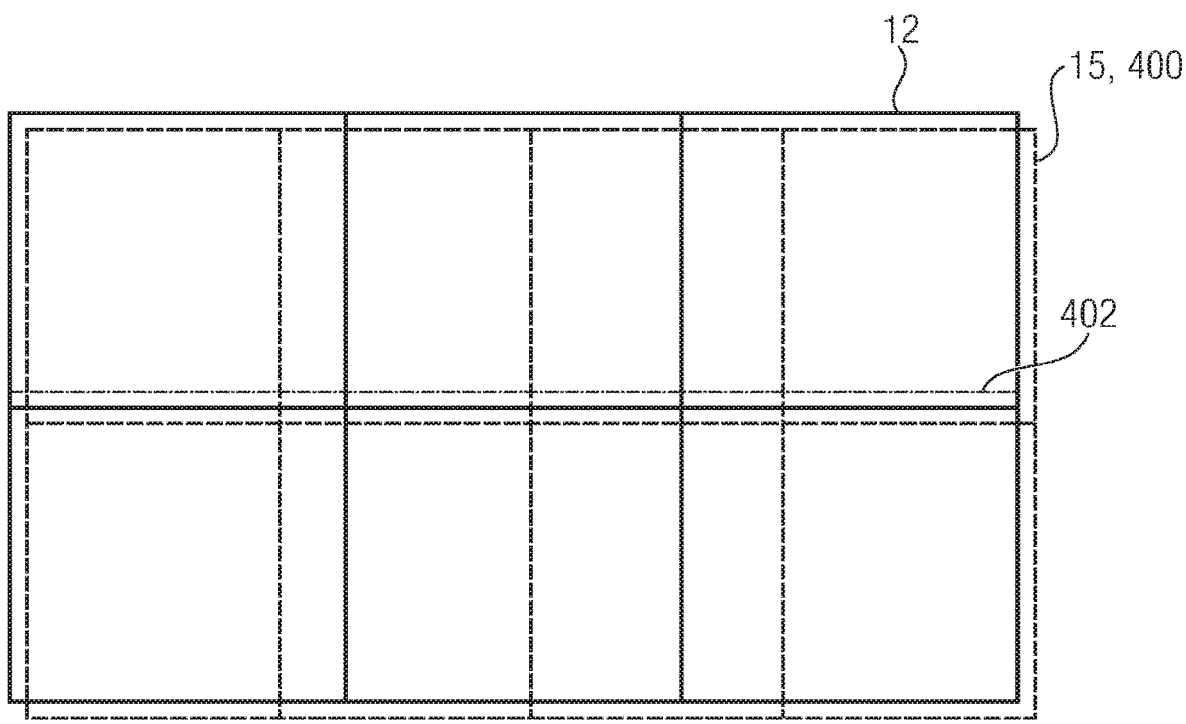
FIG. 15a shows a schematic diagram of a spatially aligned overlay of base and enhancement layer pictures both being differently subdivided into spatial segments.

Finally, FIG. 15a exemplarily shows two tile-partitioned pictures 12 and 15 overlaid in a spatially corresponding manner so as to illustrate the syntax element's 612 example of FIG. 14: independent_tile_upsampling_idc being equal to 2 restricts the upsampling filter to not cross any enhancement layer tile boundaries. See the dashed-simple-dotted lines 400. If independent_tile_upsampling_idc is equal to 1, the restriction applies only at enhancement layer tile boundaries which are aligned with base layer tile boundaries. See the dashed-twice-dotted lines 402 independent_tile_upsampling_idc equal to 0 does not imply this restriction.

Figure 15B:
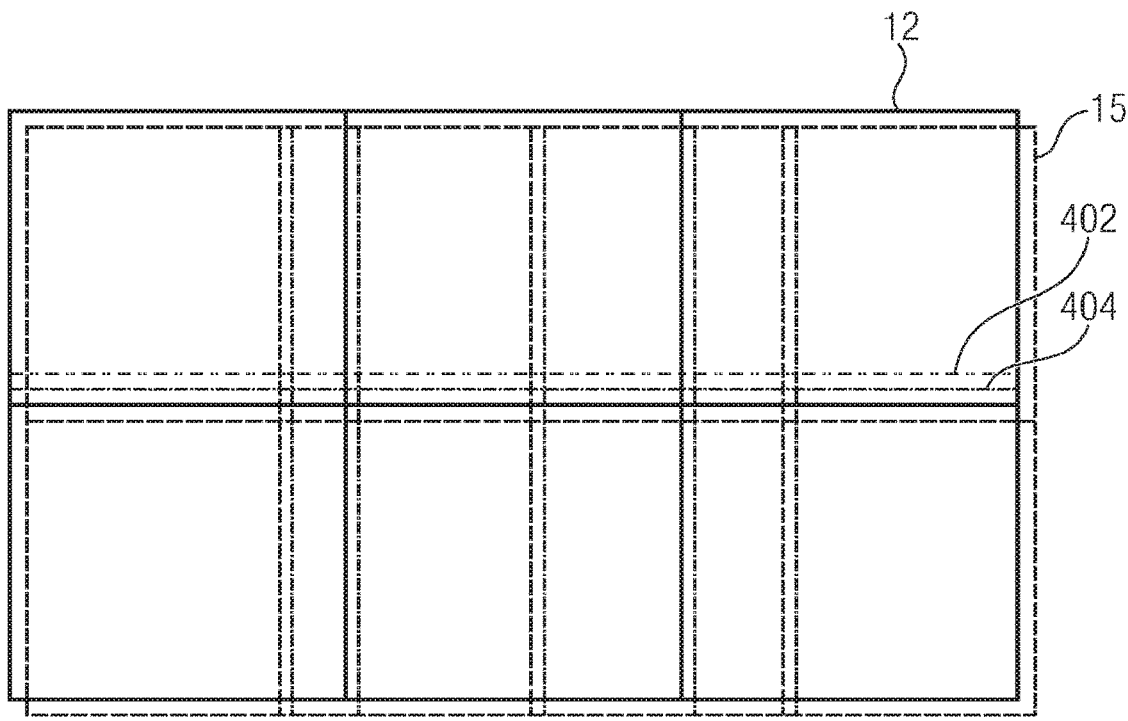
FIG. 15b shows a schematic diagram of the overlay of base and enhancement layer pictures of FIG. 15a, but illustrating another possibility for choosing a partitioning along which upsampling interpolation separation is performed.

Alternatively to mode independent_tile_upsampling_idc=2, or as additional mode such as independent_tile_upsampling_idc=3, the upsampling filter could be restricted to not cross any tile boundary, neither those of the base layer nor those of the enhancement layer. See line 404 in FIG. 15b.

That is, depending on the mode, at border 400, 402, or 404, the up-sample filter would be handled as explained above with respect to FIG. 9.

Before turning to the next aspect of the present application, it is briefly noted that the interpolation 620 discussed above would be performed, for example, in predictor 60 in FIG. 2 in order to obtain the inter-layer prediction result. As the encoder performs the same prediction at the encoding side, the interpolation 620 is performed dependent on the setting of the syntax element 616 likewise at the encoder side, such as, for example, within predictor 18. At the encoding side, the decision how to set the syntax element may be performed depending on the application scenario, for example. In case of low delay being of higher importance, for example, the syntax element could be set so as to restrict the inter-layer upsampling, and in other application scenarios, it may be more important to have a better prediction and to increase the compression ratio so that it is more advisable to set the syntax element 612 so as to not restrict the inter-layer upsampling.

The just-mentioned minimum coding delay—or offset—between the coding of spatial segments of consecutive layers is the subject of the next aspect as well, which could be named "Layer Decoding Delay Indication". The decoder would be able to determine such minimum decoding delay—or offset—between coding of spatial segments of picture 15 relative to spatial segments of picture 12 based on short-term syntax elements, but according to the next concept, a long-term syntax element structure is used so as to signal this inter-layer—delay—or offset—in advance for a predetermined time period. Again, this helps the decoder in performing the workload allocation within the parallel decoding of the bitstream 40. As a measure for the "delay" or "offset" spatial segments may be used, i.e. the offset may be expressed in units of spatial segments (tiles, slices, or CTB rows for WPP).

In order to describe the latter aspect in more detail, reference is made to FIG. 16, which largely coincides with FIG. 4. Accordingly, where feasible, the same reference signs have been used in FIG. 16 and with respect to the elements referred to by these common elements, the description brought forward above with respect to FIG. 4 shall equally apply to FIG. 16. It should also be mentioned that the video decoder 640 shown in FIG. 16 could, in addition to the functionalities set out below, incorporate the functionality described in FIG. 4 with respect to the long-term syntax element 606. Now, the aspect of the present application of FIG. 16 also uses a long-term syntax element structure, namely 642, which is also inserted into bitstream 40 so as to refer or pertain to the predetermined time period 608. In other words, although video decoder 640 could be responsive to the syntax element structure 606 of FIG. 4 as well as the syntax element structure 642, merely the latter functionality which is further outlined below is important for the decoder 640 of FIG. 16, whereas the functionality with respect to the syntax element structure 606 and the presence of the syntax element structure 606 in bitstream 40 is optional for video decoder 640. The description set out above with respect to video decoder 600, however, equally applies to the video decoder 640. That is, the video decoder 640 is able to decode the multi-layer video data stream 40, into which a scene is coded in a hierarchy of layers using inter-layer prediction from a first layer, layer 0, to a second layer, layer 1. The video decoder 40 supports parallel decoding the multi-layer video data stream in spatial segments, into which pictures of the layers are partitioned by sequentially traversing the spatial segments in the temporally overlapping manner with an inter-layer offset between the traversal of spatial segments of pictures of the first layer relative to the traversal of spatial segments of pictures of the second layer. As a minor note it is expressed that spatial segments might be tiles, substreams or slices, but even mixtures of the just mentioned segment units are feasible. In combining the slice concept with the tile and/or substream concept, the definition of what "spatial segments" actually are, may differ.

In any case, the video decoder 640 of FIG. 16 is able to, concerning pictures 12 and 15 of a common time frame 604, decode the spatial segments of picture 12 on the one hand and spatial segments of picture 15 on the other hand in parallel, i.e. in a temporally overlapping manner. Naturally, to this end the video decoder 640 needs to obey some minimum decoding offset between both layers as due to the inter-layer prediction, the currently decoded portions of the enhancement layer 1 within in picture 15 have to belong to the already decoded portion of the temporally aligned picture 12 of layer 0.

In case of FIG. 16, the long-term syntax element's structure 642 is used by the video decoder 640 to determine the inter-layer offset in advance of the predetermined time period 608.

In connection with the embodiment of FIG. 16, the inter-layer offset is a scalar measure for the "distance" of a first spatial segment of picture 12 on the one hand and time-aligned picture 15 on the other hand. The "distance" is measured spatially. Moreover, in order to be meaningful, the inter-layer offset, which may be determined based on the long-term syntax element structure 642, shall be valid for the whole decoding process of the picture's 12 first spatial segment. That is, all necessitated reference portions in picture 12 for inter-layer prediction are available for the decoding of the whole first spatial segment of picture 15 provided the first "inter-layer offset" spatial segments of the base layer picture 12 have previously been decoded.

As described previously, the "currently decoded portion" within picture 15 traverses picture 15 in a certain predetermined manner, namely in the aforementioned tile order in case of using tile parallel processing, and in the form of a tilted wavefront in the case of using the WPP concept using substreams. The same applies to the spatial segments of the base layer picture 12. The inter-layer offset determines the portion of the traversal of picture 12 which has to be already processed before the first spatial segment of picture 15 may be subject to decoding at the earliest.

Figure 17A:
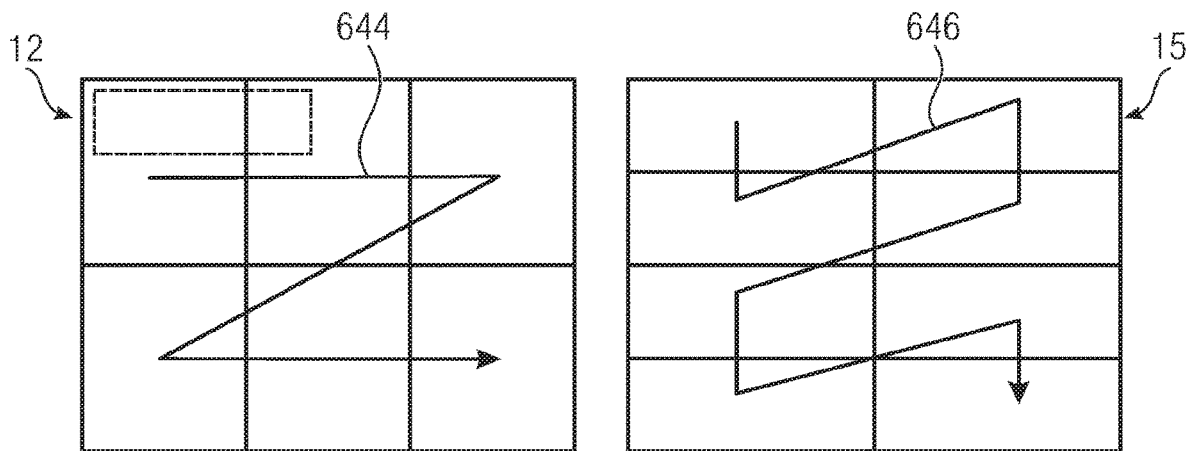
FIG. 17a shows a schematic diagram of a pair of base layer and enhancement layer pictures, both being subdivided into tiles, so as to illustrate the inter-layer offset signalization conveyed by the long-term syntax element structure of FIG. 16 in accordance with an embodiment.
Figure 17B:
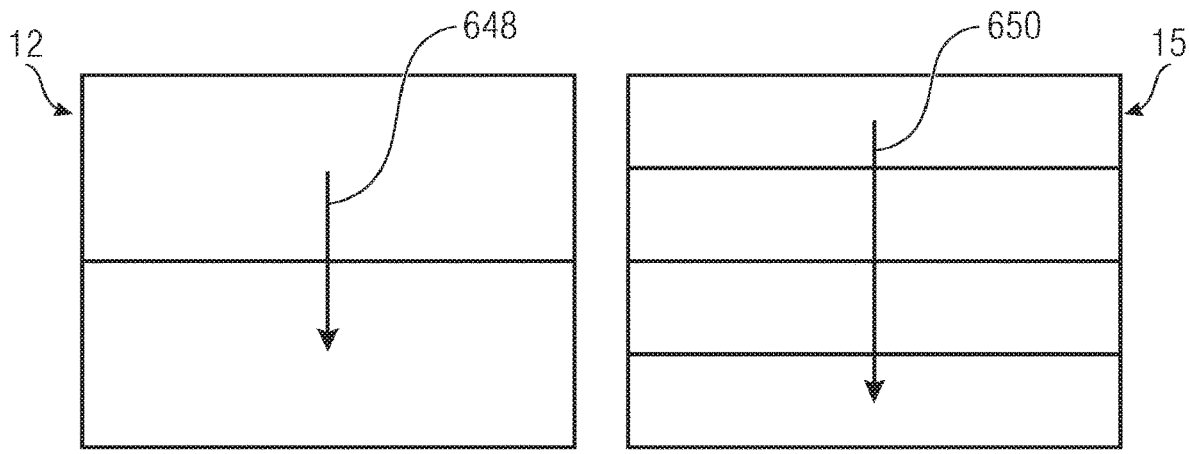
FIG. 17b shows a schematic diagram of a pair of base and enhancement layer pictures, both being subdivided into substreams for WPP processing, so as to explain an example for implementing the long-term syntax element structure of FIG. 16 in accordance with an embodiment.

In order to describe this in more detail, reference is made to FIGS. 17a and 17b. FIG. 17a describes the inter-layer offset determinable from the long-term syntax element structure 642 in more detail in relation to the tile concept, while FIG. 17b describes the inter-layer offset determined based on the long-term syntax element structure 642 in more detail with respect to WPP. Later on, in connection with FIG. 17c, it will be shown that the inter-layer offset signaling concept using the long-term syntax element structure 642 is not restricted to the usage of the tile and/or WPP concept. Rather, the mere subdivision of a picture into slices which are decodable in a self-contained manner by definition (i.e. entropy decoding and spatial intra-picture prediction are performed completely "in-slice" or independent from neighboring slices), renders the interpretation of an inter-layer offset on the basis of the long-term syntax element 642 feasible.

FIG. 17a shows two time-aligned pictures 12 and 15, both subdivided into tiles. As became clear from the description of the tile concept presented above, normally there is no fixed order within the tiles of a picture 12 or 15 in which they have to be decoded. Rather, tiles may be decoded in any order. Nevertheless, in connection with the embodiment of FIG. 16, a tile order is defined at least with respect to the tiles of base layer picture 12. The tile order 644 is defined to lead in a raster scan order row-wise from the top left tile to the bottom right tile of the regular arrangement of tiles. In accordance with the embodiment of FIG. 17a, the inter-layer offset signaled by the long-term syntax element structure 642 indicates the number of tiles which have to be already decoded in tile order 644 of base layer picture 12, in order to allow decoder 640 to commence decoding the first tile of enhancement layer picture 15. In order to determine the "first tile" among the tiles of enhancement layer picture 15, the first tile of enhancement layer picture 15 may fixedly be defined as the top left tile of enhancement layer picture 15. Starting from this first tile of enhancement layer picture 15, video decoder 640 may adapt a tile order for traversing the enhancement layer tiles of picture 15 depending on the tile subdivision of picture 12. In the case of FIG. 17a, for example, picture's 12 subdivision into tiles comprises two rows and three columns of tiles, whereas picture 15 is subdivided into four rows of tiles with two columns of tiles. In that case, it may be favorable for decoder 640 to choose the tile order for traversing the enhancement layer tiles so as to traverse the left-hand tiles of the first two rows first, then traversing the right-hand ones of the first two rows, and then repeating this traversal with respect to the lower rows of tiles of enhancement layer picture 15 as shown by arrow 646. In accordance with an alternative example which is valid for all aspects described herein, however, the tile decoding order among the enhancement layer tiles of picture 15 is fixed and independent from the base layer picture sub-divisioning into tiles. IN cases of using the signaled inter-layer coding offset merely as a trigger for starting/commencing decoding the enhancement layer picture, reorder is not necessitated anyway. Using dashed lines, FIG. 17a shows the location in picture 12 locally corresponding to the position of the first tile of enhancement layer picture 15. As becomes clear from FIG. 17a, in the exemplary case of FIG. 17a, the inter-layer offset determined by the long-term syntax element structure 642 would be "2", as the first two tiles of picture 12 would have had to be decoded before the decoder 640 may commence decoding the first tile of the enhancement layer picture 15. Merely in that case are the co-located portions needed for inter-layer prediction available in base layer picture 12.

That is, in the case of FIG. 17a, the video decoder 640 would determine from the long-term syntax element structure 642 that the inter-layer offset between the traversal 644 of base layer tiles of picture 12 relative to decoding the first tile of the enhancement layer tiles of picture 15 is two base layer tiles: the decoding of the first two base layer tiles in tile order 644 has to be awaited before video decoder 640 may commence decoding the first tile of the enhancement layer tiles of picture 15 in tile order 646.

FIG. 17b relates to the exemplary case where both time-aligned pictures 12 and 15 are subdivided into substreams, namely two substreams in the case of FIG. 12, and four substreams in the case of FIG. 15. For example, substreams may coincide with the aforementioned regular subdivision of pictures 12 and 15 in rows and columns of coding blocks, namely in a manner so that each substream corresponds to one row of such coding blocks. In any case, owing to WPP processing there is, as described above, a decoding order defined among the substreams of picture 12, and the substreams of picture 15, respectively, both decoding orders 648 and 650 leading from top to bottom. Similar to the case of FIG. 17a, the decoder 640 is configured to determine from the long-term syntax element structure 642 the number of leading substreams which have to already been decoded before commencing decoding the first substream of picture 15. In the present case, the long-term syntax element structure 642 would signal the inter-layer offset to be 1, since the complete decoding of the first substream of base layer picture 12 suffices in order to provide the necessitated basis for any inter-layer prediction for the first substream of enhancement layer picture 15.

Figure 17C:
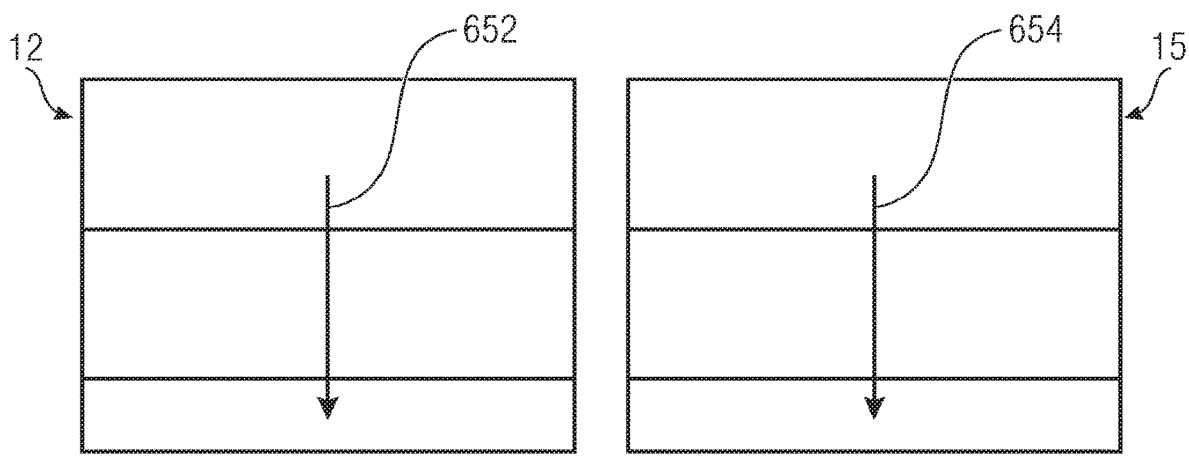
FIG. 17c shows a schematic diagram of a pair of base and enhancement layer pictures, both being subdivided into slices, so as to explain an example for realizing the long-term syntax element structure of FIG. 16 in accordance with an even further embodiment.

FIG. 17c shows a pair of time-aligned pictures 12 and 15, both being subdivided into slices. Again, a slice order or decoding order is defined among the slices of picture 12 and among the slices of picture 15, respectively, both orders 652 and 654 leading from top to bottom. In the exemplary case of FIG. 17c, the borders between the slices within pictures 12 on the one hand and picture 15 on the other hand, locally correspond to each other. Accordingly, depending on the "blurring" introduced by the inter-layer prediction from base layer picture 12 to enhancement layer picture 15, the long-term syntax element structure 642 will either signal the inter-layer offset to be equal to 1 or equal to 2. In particular, owing to enlargements of corresponding co-located reference portions in picture 12 for inter-layer predicted portions of picture 15, due to, for example disparity compensation vector or due to upsampling interpolation filter kernels as discussed above with respect to FIG. 9, for example, the first two slices of picture 12 in slice order 652 may have to be already decoded before the decoder 640 is able to commence decoding the first slice of enhancement layer picture 15. If, however, such blurring options of inter-layer prediction are either switched off or do not apply because of, for example, the sampling resolution between pictures 12 and 15 being equal to each other and both pictures 12 and 15 pertaining to the same view so that no disparity compensation takes place, then the long-term syntax element structure would be set to be equal to 1 by the encoder so that the decoder 640 may commence decoding the first slice of enhancement layer picture 15 as soon as the first slice of base layer picture 12 has been completely decoded.

Accordingly, the description of FIGS. 16 to 17c has revealed that the usage of long-term syntax element structure 642 helps the encoder to support the decoder in scheduling any parallel decoding of time aligned pictures 12 and 15, namely by informing the decoder on the basis of the long-term syntax element's structure about the inter-layer offset which is valid for the whole predetermined time period 608 and pertains to the number of spatial segments of the base layer picture 12 which has to be already decoded before commencing the first spatial segment of the time-aligned picture 15. It should be noted that the video decoder 640 would be able to determine the inter-layer offset signaled by way of the long-term syntax element structure 642 even by itself based on an inspection/evaluation of the short-term syntax elements 602 and further syntax elements concerning potential options relating to the inter-layer prediction with these options switching on or off the just-outlined blurring in inter-layer predicting from base layer to enhancement layer. However, video decoder 640 will have to inspect a multitude of syntax elements in order to derive the same information as provided by the long-term syntax element structure 642, and video decoder 640 would merely be able to derive the same information on a short-term basis rather than in advance for the long predetermined time period 608.

Similar to aspects 1 and 2, in the following, a possible way of introducing the delay indication aspect into HEVC is described hereinafter.

Figure 18:
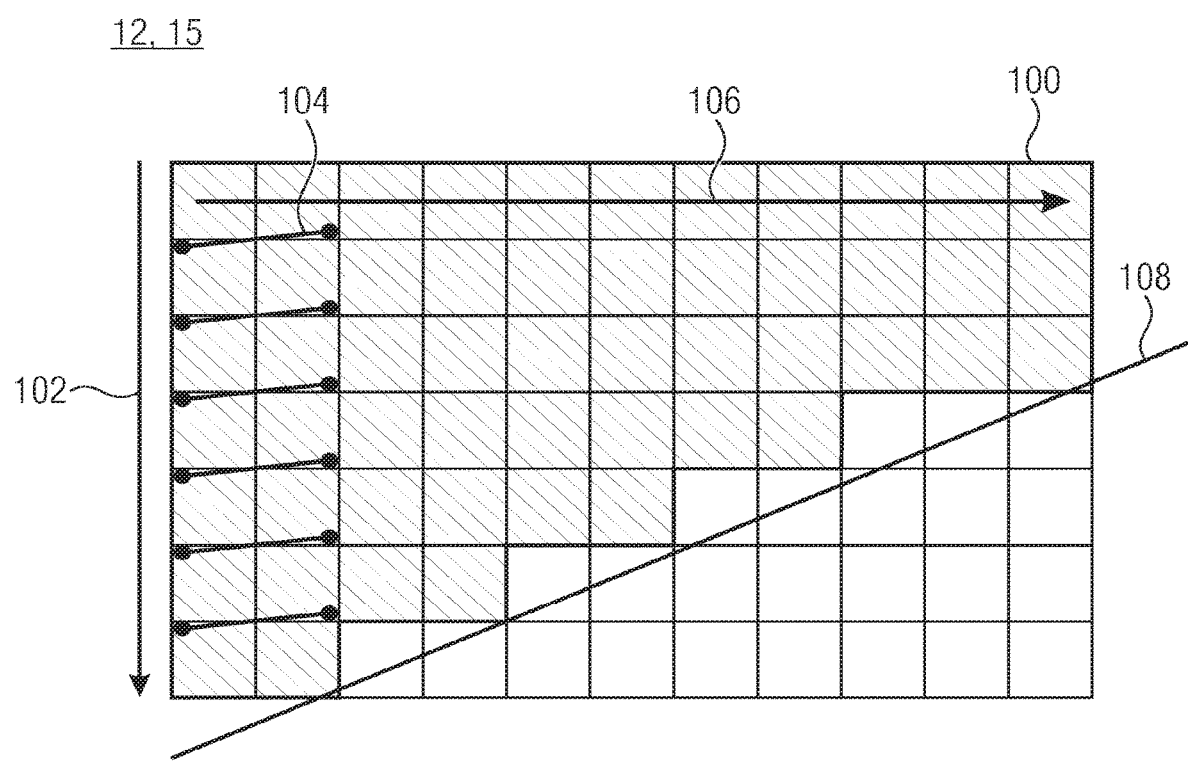
FIG. 18 shows a schematic diagram of a picture subdivided into substreams for WPP processing with additionally indicating the wavefront resulting when parallel decoding/encoding the picture using the WPP in accordance with an embodiment.

First of all, with respect to FIG. 18, it is described how WPP is currently implemented in HEVC. That is, this description shall also form a basis for optional implementations of the WPP processing of any of the above embodiments.

In the base layer, wavefront parallel processing allows parallel processing of coded tree block (CTBs) rows. Prediction dependencies are not broken across CTB rows. With regards to entropy coding, WPP changes the CABAC dependencies to the top-left CTB in the respective upper CTB row, as can be seen in FIG. 18. Entropy coding a CTB in following rows can start once entropy decoding of the corresponding upper-right CTB is finished.

In the enhancement layer, decoding of a CTB can start as soon as the CTBs containing the corresponding image area are fully decoded and available.

The decoding delay or offset indication concept of FIG. 16 may end-up in a signaling that facilitates initialization and operation of a decoder for layered bitstreams that make use of Tiles, WPP or Slices for parallelization.

Decoding of enhancement layer CTBs when using spatial scalability can start only once the base layer CTBs covering the corresponding image area are available. When parallelizing WPP with a layered bitstream with spatial scalability, layers may differ in terms of picture size, e.g. picture size scaling factors of 1.5 and 2 between layers are stated in the issued calls for proposals for a scalable extension of HEVC [1], and additionally maximum CTB sizes, 16, 32 and 64 image samples are supported in the main profile of HEVC. For quality scalability, the picture size scaling factor is usually constant but the maximum CTB sizes may still differ between layers.

The ratio between maximum CTB size and picture size scaling factors of the layers influence the layer decoding delay, i.e. the CTB row offset before first CTB row of the enhancement layer can be decoded with respect to the decoding of the base layer CTB rows. FIG. 19 reports the ratio of CTB that cover corresponding image areas in both layers with exemplary parameter values for picture size scaling factor and CTB sizes and the introduced layer decoding delay in terms of CTB rows.

For quality scalability between layers, the picture size scaling factor between layers is usually equal to 1 while the maximum CTB sizes in the respective layers may still differ and influence the layer decoding delay.

Syntax element structure 642 provides a decoder hint in the bitstream that signals the layer decoding delay for dependent spatial or quality enhancement layers when WPP processing is parallelized across spatial enhancement layers.

An embodiment uses picture size scaling factors and maximum CTB size scaling factors between the respective layers to determine the signaled layer decoding delay.

Depending on the type of scalability between independent base and dependent enhancement layer bitstream, the factors that influence the layer decoding delay differ.

In multiview scalability, layers represent camera views and mechanisms of inter layer prediction are used to perform prediction between camera view from various angles. The prediction uses mechanisms of motion compensation to compensate the differing position of cameras within the camera setup. In this case, the layer decoding delay is further restricted by the maximum or actual motion vectors in vertical direction compared to the case of spatial or quality scalability.

Syntax element structure 642 describes a decoder hint in the bitstream that signals the layer decoding delay for dependent camera views when WPP processing is parallelized across multiple camera views.

An embodiment uses picture size scaling factors, maximum CTB size scaling factors and maximum motion vector length in vertical direction between the respective layers to determine the signaled layer decoding delay.

An embodiment signals the layer decoding delay for spatial, quality or multiview scalability in terms of spatial segments, i.e. rows of CTBs when WPP is used, in the VUI syntax of the SPS associated with the enhancement layer or in a compiled for within the VPS extension syntax.

Tiles and Slices

Parallel processing with other partitioning techniques like tiles or slices can also benefit from a hint within the bitstream that indicates a decoding delay based on the division of pictures into spatial segments, i.e. tiles or slices. Information of the base layer (e.g. reconstructed image data) may be necessitated for the enhancement layer decoding process.

Syntax element structure 642 describes a decoder hint in the bitstream that signals the layer decoding delay for tiles and/or slices.

A possible embodiment of the invention uses spatial segments as unit to express an introduced layer processing delay depending on the type of parallelization technique used in the coded video sequence.

The syntax in FIG. 20 gives an exemplary embodiment for indication of min_spatial_segments_delay (an example for syntax element structure 642) in VUI parameters of the enhancement layer SPS for the parallelization tools WPP, tiles and slices.

min_spatial_segment_delay describes the decoding delay of the current layer introduced by coding dependencies with respect to the corresponding base layer in terms of spatial segments.

Depending on the value of min_spatial_segment_delay, the following applies:

If min_spatial_segment_delay is equal to 0, no limit on the minimum delay between decoding of layers is signaled Otherwise (min_spatial_segment_delay is not equal to 0), it is a requirement of bitstream conformance that exactly one of the following conditions shall be true:

In each picture parameter set that is activated within the coded video sequence, tiles_enabled_flag is equal to 0 and entropy_coding_sync_enabled_flag is equal to 0 (i.e. neither tiles nor WPP are used in the video sequence), and all base layer resources for the decoding process of first slice of the current layer in bitstream order are available when the first min_spatial_segment_delay slices of the base layer in bitstream order are decoded completely.

In each picture parameter set that is activated within the coded video sequence, tiles_enabled_flag is equal to 1 and entropy_coding_sync_enabled_flag is equal to 0 (i.e. tiles are used in the video sequence), and all base layer resources for the decoding process of the first tile of the current layer in bitstream order are available when the first min_spatial_segment_delay tiles are completely decoded that cover the same image area.

In each picture parameter set that is activated within the coded video sequence, tiles_enabled_flag is equal to 0 and entropy_coding_sync_enabled_flag is equal to 1 (i.e. WPP is used in the coded video sequence), and all base layer resources for the decoding process of the first CTB row in the current layer are available when the first min_spatial_segment_delay CTB rows of the base layer are completed.

Another exemplary embodiment is the indication of min_spatial_segments_delay in the VPS extension syntax as reported in [4] and extended as shown in FIG. 21.

min_spatial_segment_delay describes the decoding delay of the layer[i] introduced by coding dependencies with respect to the corresponding base layer in terms of spatial segments.

Depending on the value of min_spatial_segment_delay, the following applies:

If min_spatial_segment_delay is equal to 0, no limit on the minimum delay between decoding of layers is signaled Otherwise (min_spatial_segment_delay is not equal to 0), it is a requirement of bitstream conformance that exactly one of the following conditions shall be true:

In each picture parameter set that is activated within the coded video sequence, tiles_enabled_flag is equal to O and entropy_coding_sync_enabled_flag is equal to O (i.e. neither tiles nor WPP are used in the video sequence), and all base layer resources for the decoding process of first slice of the current layer in bitstream order are available when the first min_spatial_ segment_delay slices of the base layer in bitstream order are decoded completely.

In each picture parameter set that is activated within the coded video sequence, tiles_enabled_flag is equal to 1 and entropy_coding_sync_enabled_flag is equal to 0 (i.e. tiles are used in the video sequence), and all base layer resources for the decoding process of the first tile of the current layer in bitstream order are available when the first min_spatial_segment_delay tiles are completely decoded that cover the same image area.

In each picture parameter set that is activated within the coded video sequence, tiles_enabled_flag is equal to 0 and entropy_coding_sync_enabled_flag is equal to 1 (i.e. WPP is used in the coded video sequence), and all base layer resources for the decoding process of the first CTB row in the current layer are available when the first min_spatial_segment_delay CTB rows of the base layer are completed.

Various prediction modes supported by encoder and decoder as well as restrictions imposed onto prediction modes as well as context derivation for entropy coding/decoding in order to enable the parallel processing concepts, such as the tile and/or WPP concept, have been described above. It has also been mentioned above that encoder and decoder may operate on a block basis. For example, the above explained prediction modes are selected on a block basis, i.e. at a granularity finer than the pictures themselves. Before proceeding with describing another aspect of the present application, the relation between slices, tiles, WPP substreams and the just mentioned blocks shall be explained.

Figure 32:
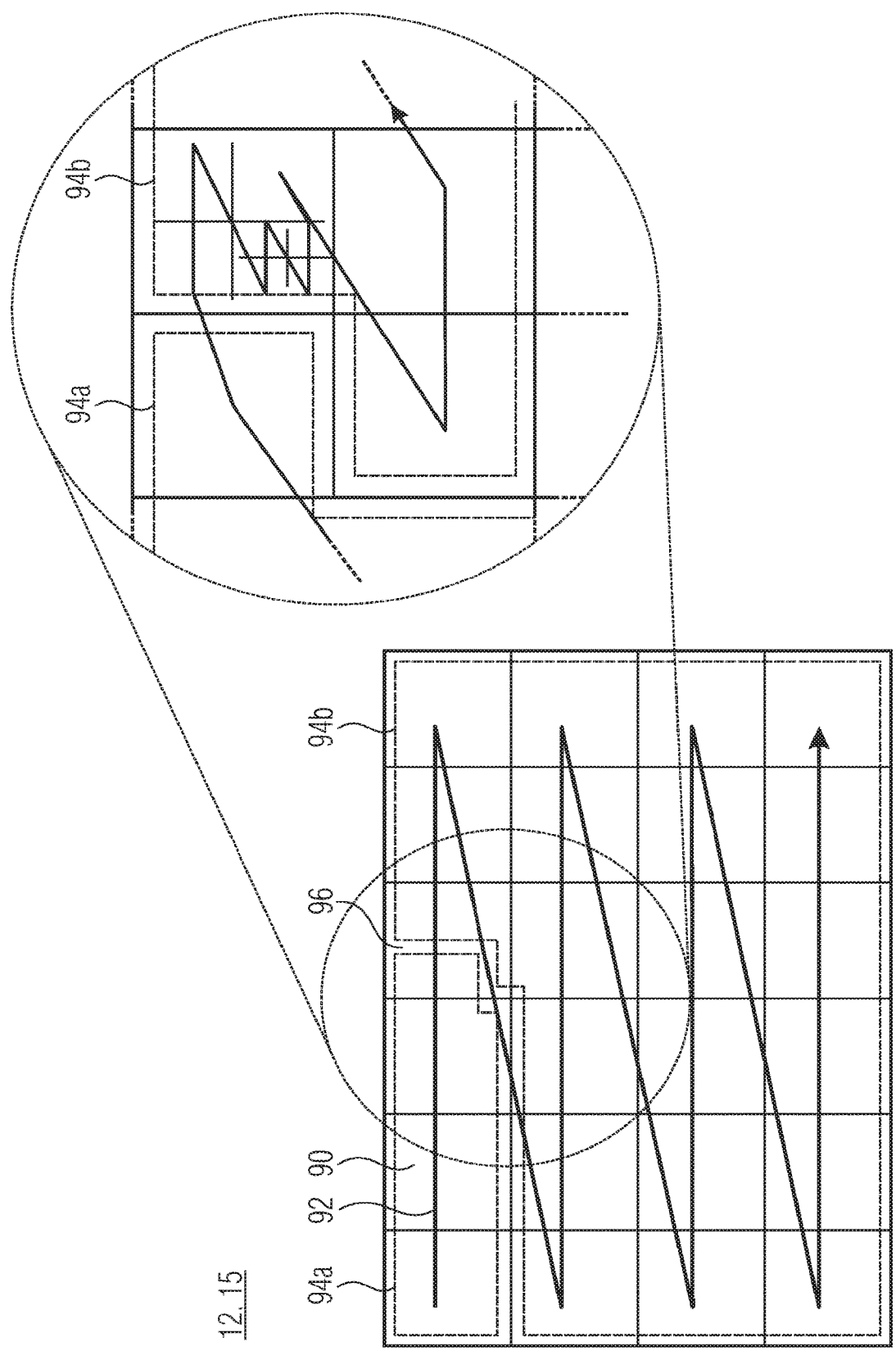
FIG. 32 shows a schematic diagram illustrating a picture of any layer, subdivided into blocks with indicating a further subdivision of the picture into spatial segments.

FIG. 32 shows a picture which may be a picture of layer 0, such as layer 12 or a picture of layer 1 such as picture 15. The picture is regularly subdivided into an array of blocks 90. Sometimes, these blocks 90 are called largest coding blocks (LCB), largest coding units (LCU), coding tree blocks (CTB) or the like. The subdivision of the picture into blocks 90 may form a kind of base or coarsest granularity at which the above described predictions and residual codings are performed and this coarsest granularity, i.e. the size of blocks 90, may be signaled and set by the encoder, individually for layer 0 and layer 1. For example, a multi-tree such as a quad-tree subdivision may be used and signaled within the data stream so as to subdivide each block 90 into prediction blocks, residual blocks and/or coding blocks, respectively. In particular, coding blocks may be the leaf blocks of a recursive multi-tree subdivisioning of blocks 90 and some prediction related decisions may be signaled at the granularity of coding blocks, such as prediction modes, and the prediction blocks at the granularity of which the prediction parameters such as motion vectors in case of temporal inter prediction and disparity vectors in case of inter layer prediction for example, is coded and residual blocks at the granularity of which the prediction residual is coded, may be the leaf blocks of separate recursive multi-tree subdivisionings of the code blocks.

A raster scan coding/decoding order 92 may be defined among blocks 90. The coding/decoding order 92 restricts the availability of neighboring portions for the purpose of spatial prediction: merely portions of the picture which according to the coding/decoding order 92 precede the current portion such as block 90 or some smaller block thereof, to which a currently to be predicted syntax element relates, are available for spatial prediction within the current picture. Within each layer, the coding/decoding order 92 traverses all blocks 90 of the picture so as to then proceed with traversing blocks of a next picture of the respective layer in a picture coding/decoding order which not necessarily follows the temporal reproduction order of the pictures. Within the individual blocks 90, the coding/decoding order 92 is refined into a scan among the smaller blocks, such as the coding blocks.

In relation to the just outlined blocks 90 and the smaller blocks, each picture is further subdivided into one or more slices along the just mentioned coding/decoding order 92. Slices 94a and 94b exemplarily shown in FIG. 32 accordingly cover the respective picture gaplessly. The border or interface 96 between consecutive slices 94a and 94b of one picture may or may not be aligned with borders of neighboring blocks 90. To be more precise, and illustrated at the right hand side of FIG. 32, consecutive slices 94a and 94b within one picture may border each other at borders of smaller blocks such as coding blocks, i.e. leaf blocks of a subdivision of one of blocks 90.

Slices 94a and 94b of a picture may form the smallest units in which the portion of the data stream into which the picture is coded may be packetized into packets, i.e. NAL units. A further possible property of slices, namely the restriction onto slices with regards to, for example, prediction and entropy context determination across slice boundaries, was described above. Slices with such restrictions may be called "normal" slices. As outlined in more detail below, besides normal slices "dependent slices" may exist as well.

Figure 33:
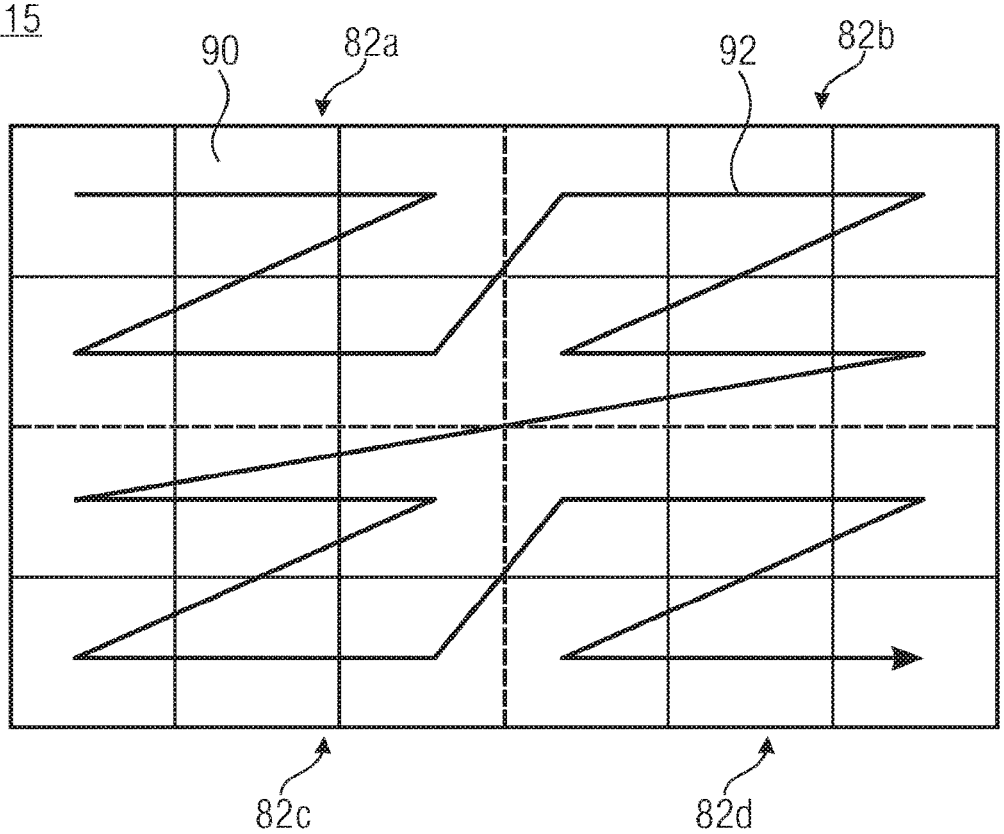
FIG. 33 shows a schematic diagram of a picture of any layer, subdivided into blocks and tiles.

The coding/decoding order 92 defined among the array of blocks 90 may change if the tile partitioning concept is used for the picture. This is shown in FIG. 33 where the picture is exemplarily shown to the partitioned into four tiles 82a to 82d. As illustrated in FIG. 33, tiles are themselves defined as a regular subdivision of a picture in units of blocks 90. That is, each tile 82a to 82d is composed of an array of n×m blocks 90 with n being set individually for each row of tiles and m being individually set for each column of tiles. Following the coding/decoding order 92, blocks 90 in a first tile are scanned in raster scan order first before proceeding to the next tile 82b and so forth, wherein the tiles 82a to 82d are themselves scanned in a raster scan order.

Figure 34:
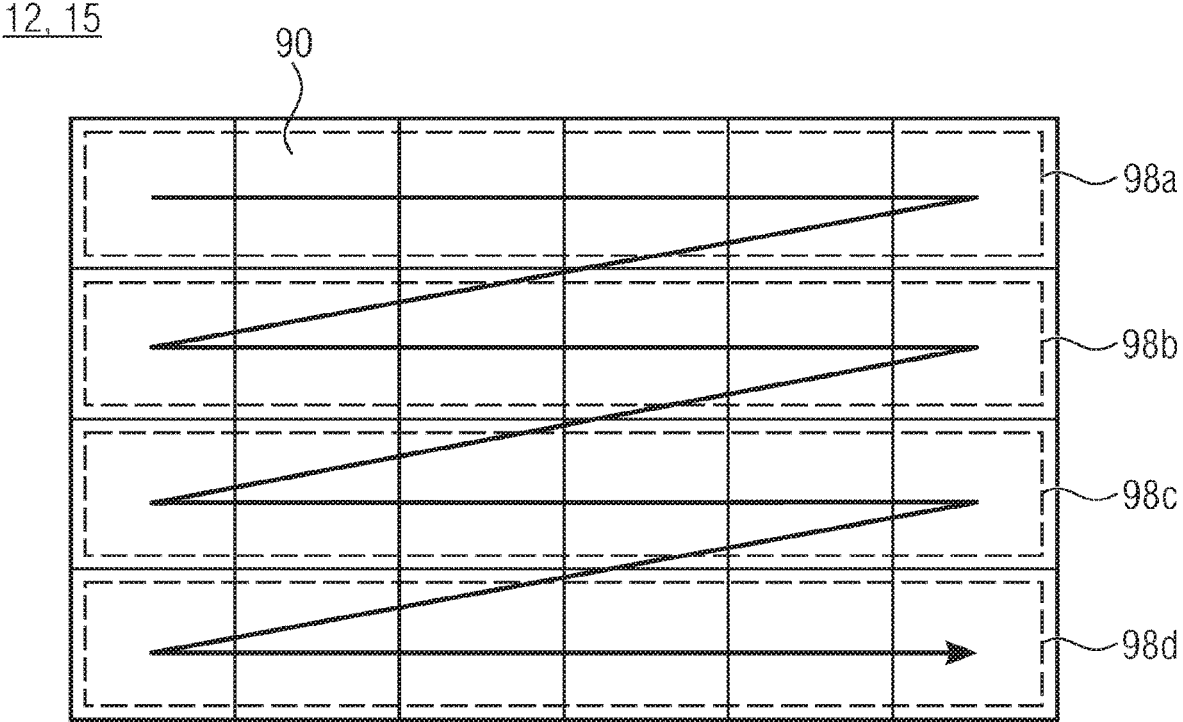
FIG. 34 shows a schematic diagram of a picture subdivided into blocks and substreams.

In accordance with a WPP stream partitioning concept, a picture is, along the coding/decoding order 92, subdivided in units of one or more rows of block 90 into WPP substreams 98a to 98d. Each WPP substream may, for example, cover one complete row of blocks 90 as illustrated in FIG. 34.

The tile concept and the WPP substream concept may, however, also be mixed. In that case, each WPP substream covers, for example one row of blocks 90 within each tile.

Even the slice partitioning of a picture may be co-used with the tile partitioning and/or WPP substream partitioning. In relation to tiles, each of the one or more slices the picture is subdivided into may either be exactly composed of one complete tile or more than one complete tile, or a subportion of merely one tile along the coding/decoding order 92. Slices may also be used in order to form the WPP substreams 98a to 98d. To this end, slices forming the smallest units for packetization may comprise normal slices on the one hand and dependent slices on the other hand: while normal slices impose the above-described restrictions onto prediction and entropy context derivation, dependent slices do not impose such restrictions. Dependent slices which start at the border of the picture from which the coding/decoding order 92 substantially points away rowwise, adopt the entropy context as resulting from entropy decoding block 90 in the immediately preceding row of blocks 90, and dependent slices starting somewhere else may adopt the entropy coding context as resulting from entropy coding/decoding the immediately preceding slice up to its end. By this measure, each WPP substream 98a to 98d may be composed of one or more dependent slices.

That is, the coding/decoding order 92 defined among blocks 90 linearly leads from a first side of the respective picture, here exemplarily the left side, to the opposite side, exemplarily the right side, and then steps to the next row of blocks 90 in downward/bottom direction. Available, i.e. already coded/decoded portions of the current picture, accordingly lie primarily to the left and to the top of the currently coded/decoded portion, such as the current block 90. Due to the disruption of predictions and entropy context derivations across tile boundaries, the tiles of one picture may be processed in parallel. Coding/decoding of tiles of one picture may even be commenced concurrently. Restrictions stem from the in-loop filtering mentioned above in case where same is allowed to cross tile boundaries. Commencing the coding/decoding of WPP substreams, in turn, is performed in a staggered manner from top to bottom. The intra-picture delay between consecutive WPP substreams is, measured in blocks 90, two blocks 90.

However, it would be favorable to even parallelize the coding/decoding of pictures 12 and 15, i.e. the time instant of different layers. Obviously, coding/decoding the picture 15 of the dependent layer has to be delayed relative to the coding/decoding of the base layer so as to guarantee that there are "spatially corresponding" portions of the base layer already available. These thoughts are valid even in case of not using any parallelization of coding/decoding within any of pictures 12 and 15 individually. Even in case of using one slice in order to cover the whole picture 12 and 15, respectively, with using no tile and no WPP substream processing, coding/decoding of pictures 12 and 15 may be parallelized. The signaling described next, i.e. aspect six, is a possibility to express such decoding/coding delay between layers even in such a case where, or irrespective of whether, tile or WPP processing is used for any of the pictures of the layers.

As became clear from the above description relating to the minimum coding delay between the coding of consecutive layers it became clear that the decoder would be able to determine the minimum decoding delay based on short-term syntax elements. However, in case of using long-term syntax elements as described above, so as to signal this inter-layer temporal delay in advance for a predetermined time period, the decoder may plan into the future using the guarantee provided and may more easily perform the workload allocation within the parallel decoding of the bitstream 40.

The aspect of the present application described next, namely the sixth aspect of the present application, is somehow related to aspect 3 in that the explicit signaling of any inter-layer offset is concerned. However, with respect to the sixth aspect of the present application, the syntax element structure signaling the inter-layer offset explicitly does not need to be signaled on a long-term basis relative to the short-term syntax element from which the inter-layer offset would otherwise be derivable. Rather, the sixth aspect of the present application exploits another finding: as became clear when describing FIGS. 17a to 17c, in case of base and enhancement layer pictures both being subdivided into blocks with a raster scan decoding order being defined thereamong, then the inter-layer offset between base and enhancement layer may efficiently be explicitly signaled by a measure which measures the inter-layer offset in units of base layer blocks. In connection with the aspect described further below, the base layer blocks in units of which the inter-layer offset is explicitly signaled is not restricted to spatial segments. Rather, other coding blocks may be used to this end. Accordingly, when describing an embodiment concerning the sixth aspect of the present application with respect to FIG. 34, the reference signs having been used with respect to FIGS. 16 to 17c are largely co-used and the description brought forward above with respect to the latter figures shall equally apply to the embodiment described further below in order to avoid unnecessitated repetition. Beyond this, reference is made to the description of FIGS. 32 and 33, as these figures form a possible coexistence between coding blocks on the one hand and spatial segments on the other hand.

Figure 35:
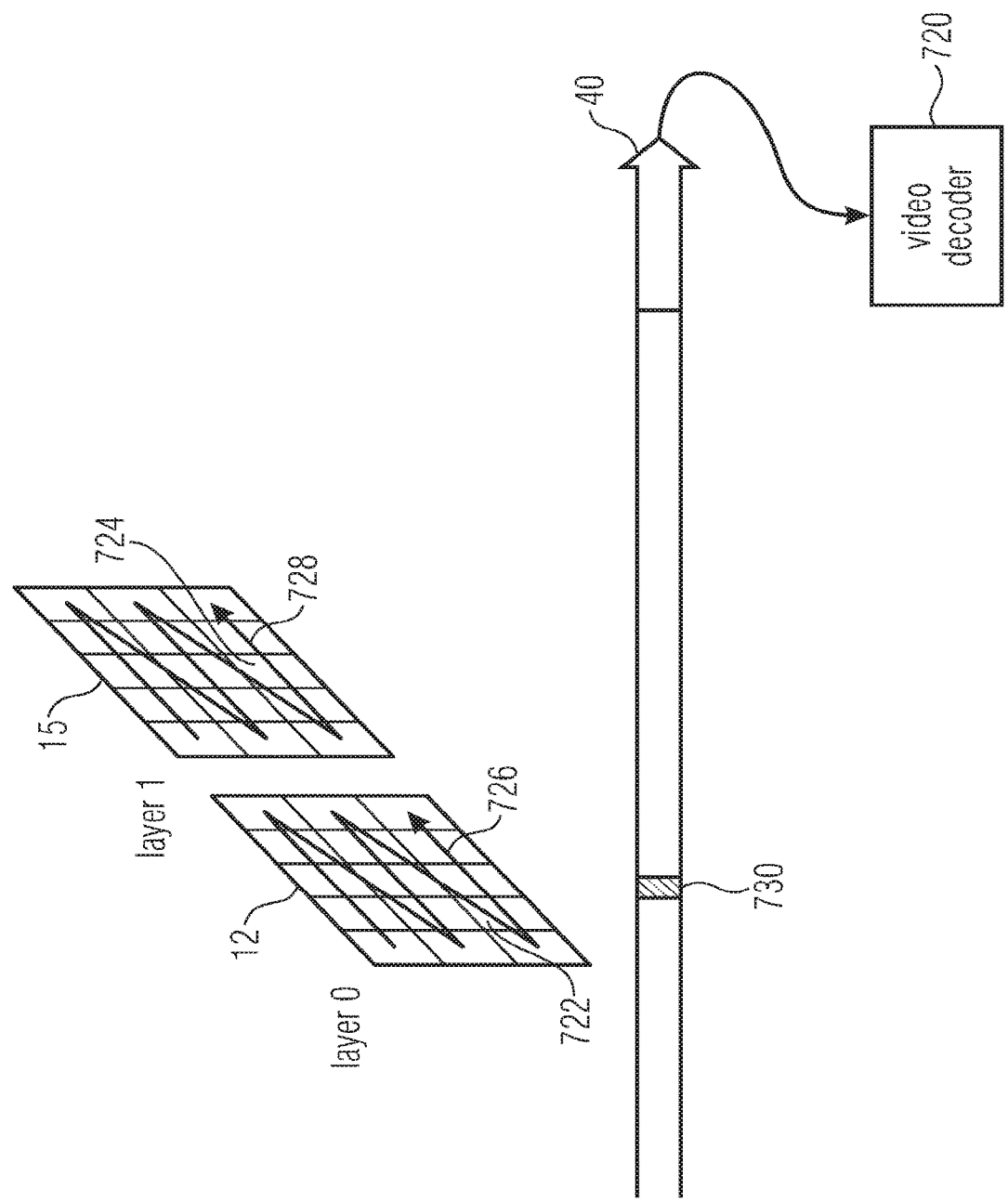
FIG. 35 shows a schematic block diagram of a video decoder in accordance with an embodiment where the video decoder is configured to use syntax element structure in the data stream so as to derive an inter-layer offset between inter-predictively processed pictures in units of blocks having a raster scan order defined thereamong.

Thus, FIG. 35 shows a video decoder 720 configured to receive a multi-layer video data stream 40 into which a scene is coded in a hierarchy of layers using inter-layer prediction from portions of a first layer to co-located portions of a second layer with, similar to the above figures, exemplarily showing layer 0 in juxtaposition to layer 1 as a representative example. Two-time aligned pictures 12 and 15 of both layers are exemplarily shown in FIG. 35. The pictures 12 of the base layer 0 are subdivided into an array of first blocks 722 and the pictures of the enhancement layer 1 are subdivided into an array of second blocks 724. A raster scan decoding order 726 is defined among blocks 722, and likewise a raster scan decoding order 728 is defined among blocks 724.

The video data stream 40 comprises a syntax element structure which indicates an inter-layer offset for parallely decoding pictures 12 and 15 by sequentially traversing the first and second blocks 722 and 724 in a temporally overlapping manner with the inter-layer offset between the traversal of the first and second blocks 722 and 724, measured in units of the base layer blocks 722. The video decoder 720 is configured to be responsive to this syntax element structure 730. In particular, the video decoder determines the inter-layer offset from the latter.

In agreement with the embodiment of FIG. 16, the syntax element structure 730 may indicate the inter-layer offset as a guarantee for success for the performing parallel decoding of time-aligned pictures 12 and 15 for a predetermined time period longer than the short-term time intervals at which optional syntax elements signal pictures' 12 and 15 subdivision into blocks 722 and 724, respectively. This is, however, not mandatory. Rather, the explicit signaling of the inter-layer offset by way of the syntax element structure 730 may be realized in data stream 40 at different scope such as for each time-aligned pair of base and enhancement layer pictures 12 and 15, for example, i.e. at the same interval as the signalization concerning the size and subdivision into blocks 722 and 724.

As a further agreement with the above embodiment, decoder 720 may use the inter-layer offset explicitly signaled by way of the syntax element structure 730 as a measure for the offset in commencing the traversal of the second blocks 724 relative to the traversal of the first blocks 722 in parallely decoding pictures 12 and 15, respectively. In other words, video decoder 720 may be configured to derive a count value from the syntax element structure 730, count the already decoded blocks 722 of base layer picture 12 along raster scan decoding order 726 while allowing commencing the decoding of the sequence of blocks 724 of the enhancement layer picture 15 along the decoding order 728 merely after the count of already decoded blocks 722 reaching the minimum count explicitly signaled by the syntax element structure 730. Accordingly, video decoder 720 does not need to inspect any highly complicated and distributed portions of the video data stream 40, which would otherwise enable video decoder 720 to otherwise compute an actual minimum inter-layer offset between commencing decoding blocks 722 on the one hand and blocks 724 on the other hand.

Interestingly, however, according to the embodiment of FIG. 35, blocks 722 and 724 do not necessarily represent spatial segments being especially dedicated for being subject to any parallel processing. Rather, blocks 722 and 724 may be usual coding blocks in units of which the content of pictures 12 and 15 is coded into video data stream 40, respectively. For example, blocks 722 and 724 may be tree root blocks into which pictures 12 and 15 are regularly, i.e. in rows and columns, subdivided, which tree root blocks are then further, individually, subdivided in a recursive multi-tree manner as described above with respect to FIG. 32, for example, with the resulting leaf blocks of the tree root blocks representing the pictures' 12 and 15 subdivision into coding blocks in units of which the prediction mode—selected among spatial, temporal and, with respect to FIG. 15, inter-layer prediction—is signaled in the video data stream 40.

Figure 36:
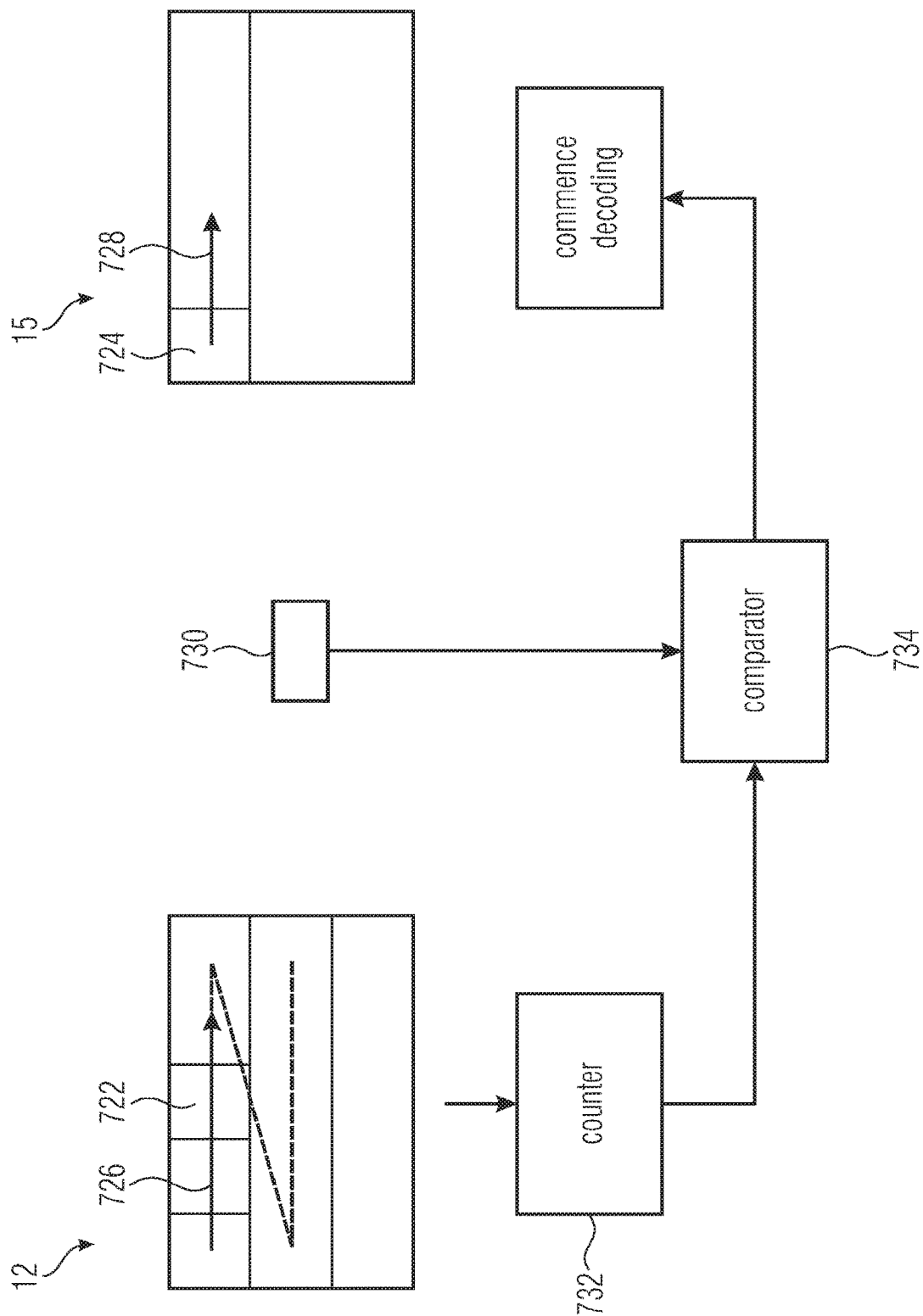
FIG. 36 shows a schematic diagram illustrating a possible mode of operation of the video decoder of FIG. 34 relating to the syntax element structure within the data stream in accordance with an embodiment.

In order to explain the embodiment of FIG. 35 in more detail, reference is made to FIG. 36. As shown in FIG. 36, the video decoder 720 may use a counter 732 in order to count the number of already decoded blocks 722 of base layer picture 12, with starting the count from the first block 722 of picture 12 in raster scan decoding order 726. A comparator 734 of decoder 720 compares this steadily increasing count output by counter 732, with the explicitly signaled value of the syntax element structure 730 as obtained from the video data stream 40. In case of the count fulfilling a predetermined relationship to the value indicated by the syntax element structure 730, such as, as soon as the count of counter 732 reaches or equals the value indicated by the syntax element structure 730, comparator activates or causes the commencing of decoding of enhancement layer picture 15, i.e. causes the decoding of the first block 724 of the enhancement layer picture 15 in raster scan decoding order 728 to be started.

As will be described in more detail below with respect to explicit examples for a syntax for a syntax element structure 730, it would be feasible to unify the syntax element structure of FIG. 35 with the syntax element structure and its aim of FIG. 16. This means the following. The syntax element structure 730 could have a set of possible values, i.e. a possible-values-set. A value out of a non-explicit-inter-layer-offset set of possible values could cause the video decoder 720 to disregard the value of the syntax element structure 730 and either not perform parallel decoding pictures 12 and 15 or determine any inter-layer offset on the basis of the short term syntax elements 602 as exemplarily mentioned with respect to FIG. 16. In case of the syntax element structure 730 assuming a value out of a second set of possible values, this would cause the video decoder 720 to perform the action already outlined with respect to FIG. 36, for example, according to which the value of the syntax element structure 730 would explicitly signal the inter-layer offset in units of the base layer blocks 722. However, there could be another subset of the possible values of the syntax element structure 730, which, when being assumed by the syntax element structure 730, causes video decoder 720 to act as described above with respect to FIG. 16: determine the inter-layer offset between base layer picture's 12 and enhancement layer picture's 15 decoding based on the syntax element structure's 730 value by interpreting the latter as measuring the inter-layer offset in units of spatial segments which may, but do not have to be, composed of integer ones of blocks 722 and 724, respectively.

Figure 37:
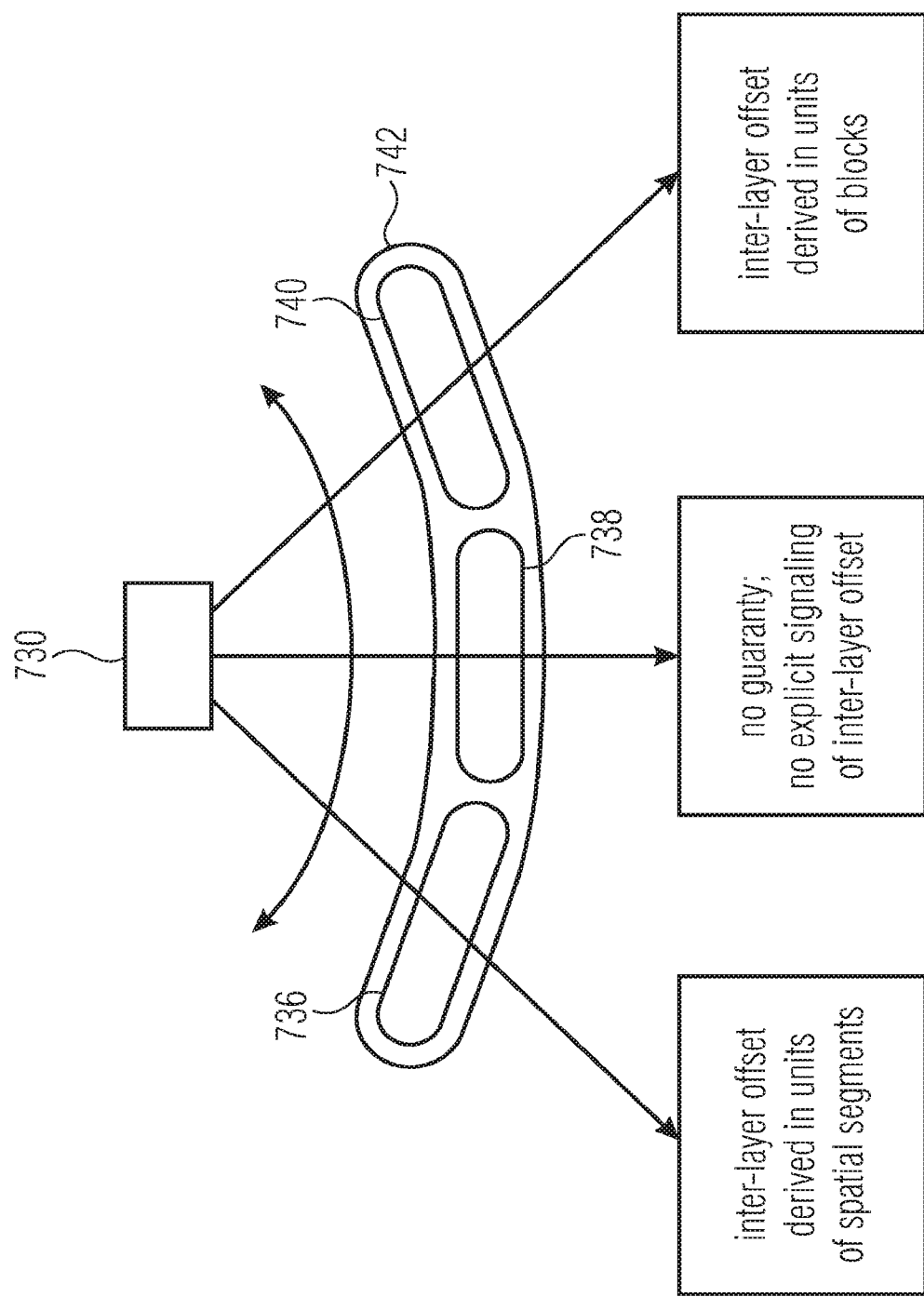
FIG. 37 shows a schematic diagram illustrating a mode of operation of the video decoder of FIG. 35 in connection with a further embodiment according to which the inter-layer offset signaling is switchable between different explicit signaling types, i.e. signaling in units of different types.

The just mentioned possibility of combining the embodiment of FIG. 35 with that of FIG. 16 is illustrated with respect to FIG. 37. As shown in FIG. 37, the video decoder may inspect the syntax element structure 730 in order to determine whether same has a value of a first subset 736, a second subset 738, or a third subset 740 out of a set of possible values 742. Depending on the investigation or check outcome, the decoder 720 either derives no guarantee out of the syntax element structure 730 and does not derive any explicit signaling concerning the inter-layer offset from the syntax element structure 730 or performs such deriving of the inter-layer offset from the syntax element structure 730, namely either in units of spatial segments or in units of blocks. No deriving/no guarantee takes place in case of the second subset 738, the deriving of the inter-layer offset in units of spatial segments takes place in case of subset 736, and deriving the inter-layer offset in units of blocks takes place in case of the syntax element 730 assuming a value out of the third subset 740. In the specific syntax example outlined further below, the syntax element structure comprises two flags, namely ctb_delay_enabled_flag and min_spatial_segment_delay, wherein ctp_delay_enabled_flag=0 and min_spatial_segment_delay≠0 corresponds to the case of subset 736, min_spatial_segment_delay=0 corresponds to the second subset 738, and ctp_delay_enabled_flag=1 and min_spatial_segment_delay≠0 correspond to the third subset 740.

Figure 38:
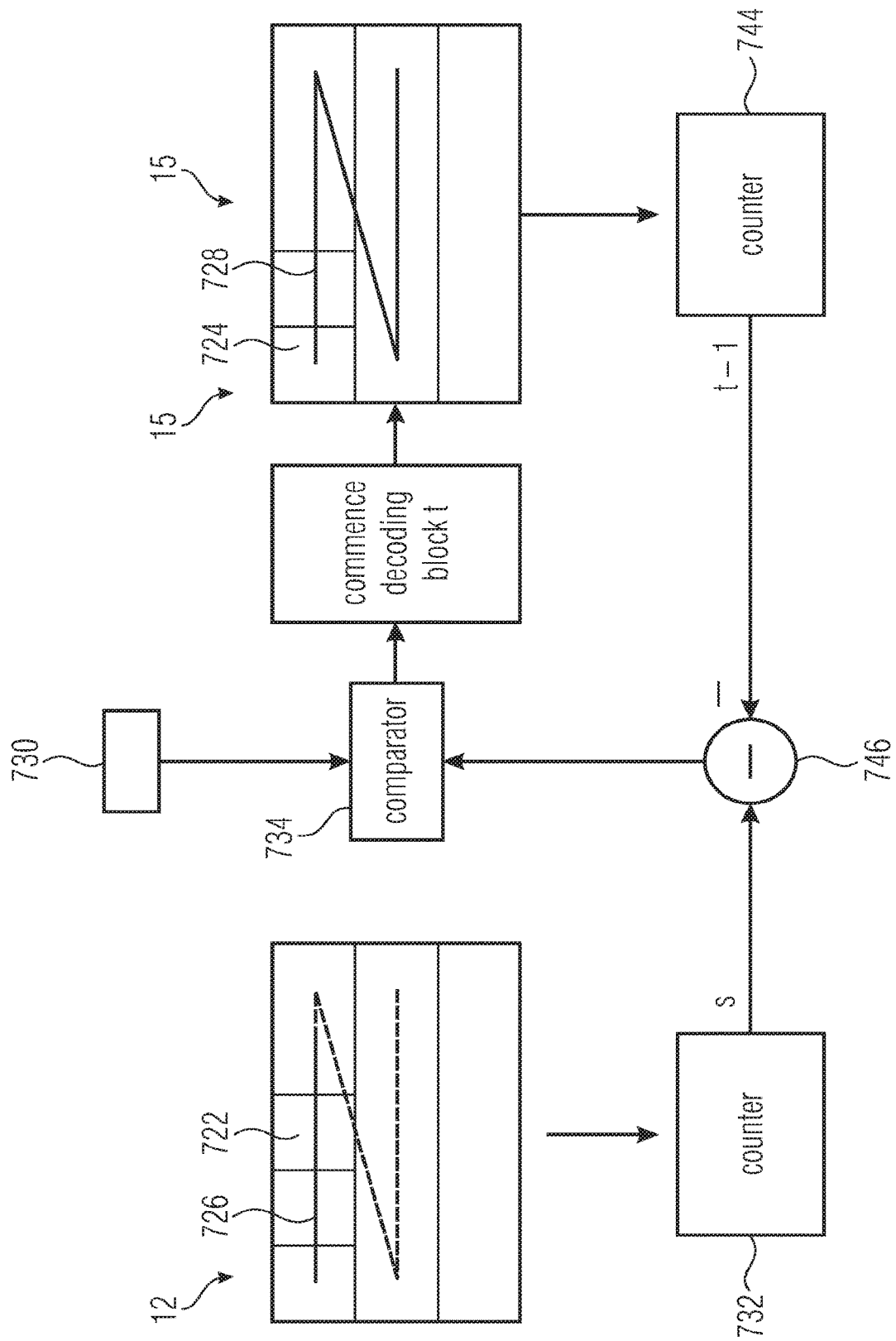
FIG. 38 shows a schematic diagram illustrating a mode of operation of the video decoder of FIG. 35 in accordance with an even further embodiment according to which the inter-layer offset is continuously surveyed during parallel decoding of base enhancement layer pictures.

Finally, with respect to FIG. 38, it is shown that decoder 720 may be configured to interpret any inter-layer offset signaled by the syntax element structure 730, to be not only an inter-layer offset with respect to the commencing of the decoding of the first block or spatial segment of the enhancement layer picture 15, but a continuous inter-layer offset which, when being obeyed, results in a conflict-free parallel decoding of pictures 12 and 15, respectively. As shown in FIG. 38, the counter 732 still counts the number of already decoded blocks 722 of the base layer picture 12, wherein, however, an additional counter 744 likewise counts the already decoded blocks 724 of the enhancement layer picture 15 along decoding order 728 wherein a subtractor 746 forms a difference out of both counts, namely s and t−1, i.e. computes s−t+1. This difference value is compared by comparator 734 with the inter-layer offset value derived from the syntax element structure 730 and as soon as both values, i.e. the derived inter-layer offset and the difference value of the counts have a predetermined relationship, such as the difference value being equal or exceeding the derived inter-layer offset, the decoding of block t in decoding order 728 among the enhancement layer blocks 724 is commenced. By this measure, a continuous survey between the cause of decoding blocks 722 of the base layer picture 12 on the one hand and blocks 724 of the enhancement layer picture 15 on the other hand is installed.

It is clear that the continuous survey according to FIG. 38 may also be applied to spatial segments. More generally, the description of FIGS. 38 and 36 may be readily transferred onto spatial segments as well and this statement also applies to the embodiment of FIG. 16 where the syntax element structure 642 may serve as the relevant syntax element structure shown at 730 in FIGS. 36 and 38. In other words, at least when using tiles as the spatial segments, there is also a raster scan decoding order defined thereamong so that the concept of FIG. 36 and FIG. 38 discussed with respect to coding blocks may be easily transferred onto the traversal of tiles and their decoding.

Briefly summarizing the sixth aspect and the embodiments described with respect thereto, the syntax element structure 730 may be inserted into the bitstream by a video encoder so as to provide the decoder with an explicit hint how to control the parallel decoding of base and enhancement layer pictures relative to each other. The inter-layer offset explicitly signaled by way of the syntax element structure may be activated or deactivated. If activated, the indication may be in units of blocks such as CTBs or, by way of more precise signaling, in a signaled one of units of such blocks and units of spatial segments. Due to the use of a raster scan order among base layer blocks on the one hand and enhancement layer blocks on the other hand, both leading, for example, row-wise from the left top corner to the right bottom corner of each picture 12/15 row by row from top to bottom, the inter-layer offset explicitly signaled by either be interpreted solely as a "trigger" for starting/commencing decoding the first block of the enhancement layer picture 15, or as a continuous "safety distance" between the currently decoded block of the base layer picture 12 on the one hand and the currently decoded block of the enhancement layer picture 15 on the other hand, i.e. for determining triggers for the decoding of each block of the enhancement layer picture 15. The description brought forward with respect to the sixth aspect may be transferred onto the description and the embodiments of the third aspect in that at least as far as the description of tiles as spatial segments is concerned, the interpretation and check of abeyance of the signaled inter-layer offset is concerned, the embodiments of FIGS. 36 and 38 may be used, the traversal of the decoded tiles within base and enhancement layer pictures along the raster scan tile decoding order may be controlled in a manner corresponding to the description of FIGS. 36 and 38.

Thus, as a measure for the "delay" spatial segments may be used, i.e. the delay may be expressed in units of spatial segments (tiles, slices, or CTB rows for WPP), or the delay/offset may be measured in units of blocks 90.

The High Efficiency Video Coding (HEVC) standard may be extended to conform to the sixth aspect as follows. In particular, parallel decoding of individual layers (or views) is allowed, if reference data is available. The minimum delay (specifically the layer decoding delay) between the decoding of the base layer coded tree block (CTB) and the decoding of the corresponding dependent enhancement layer CTB is determined through the granularity of parallelization tools such as tiles, wavefront or slice or the motion compensation vector is applicable (e.g. in stereoscopic or multiview video coding).

FIG. 20 showed a layer decoding delay indication realized by enhancement layer Sequence Parameter Set Syntax and semantics by the syntax element min_spatial_segment_delay.

min_spatial_segment_delay described the decoding delay of the current layer introduced by coding dependencies with respect to the corresponding base layer in terms of spatial segments.

A mechanism in the HEVC high level syntax that allows optionally expressing the layer decoding delay between an independent relative base layer and a dependent enhancement layer regardless of potential parallelization techniques in use based on a number of vertical and horizontal CTBs may be achieved as follows.

A flag or index (e.g. ctb_delay_enabled_flag) may be used to signal that the layer decoding delay (as signaled with a second syntax element) is expressed as a specific CTB address in the coded picture.

Figure 39:
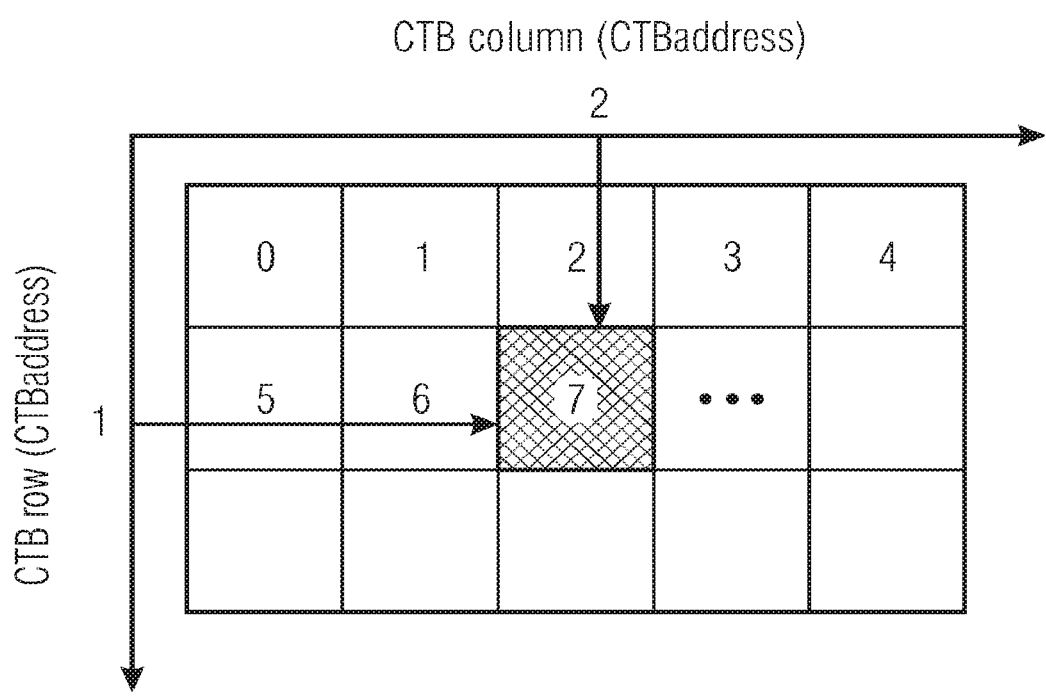
FIG. 39 shows a relationship between a rank of a certain block of a picture in accordance with a raster scan decoding order on the one hand and row and column indices on the other in accordance with an embodiment.

A CTB address in raster scan order clearly defines a horizontal a vertical position within the picture that is used to express the delay as can be seen from FIG. 39 and according to the following.

CTB coordinates=(CTB address % PicWidthInCTBs, CTB address/PicWidthInCTBs)

PicWidthInCTBs describes the width of the pictures in units of CTBs.

FIG. 39 shows the following. A CTB address, e.g. 7, within a picture defines a horizontal CTB column and vertical CTB row, e.g. the tuple (2,1).

If the flag is enabled, when decoding a CTB in the current dependent layer, the value of another syntax element (cp. min_spatial_segment_delay) is to be interpreted as an offset to a CTB address of a co-located CTB in the relative base layer picture.

Figure 40:
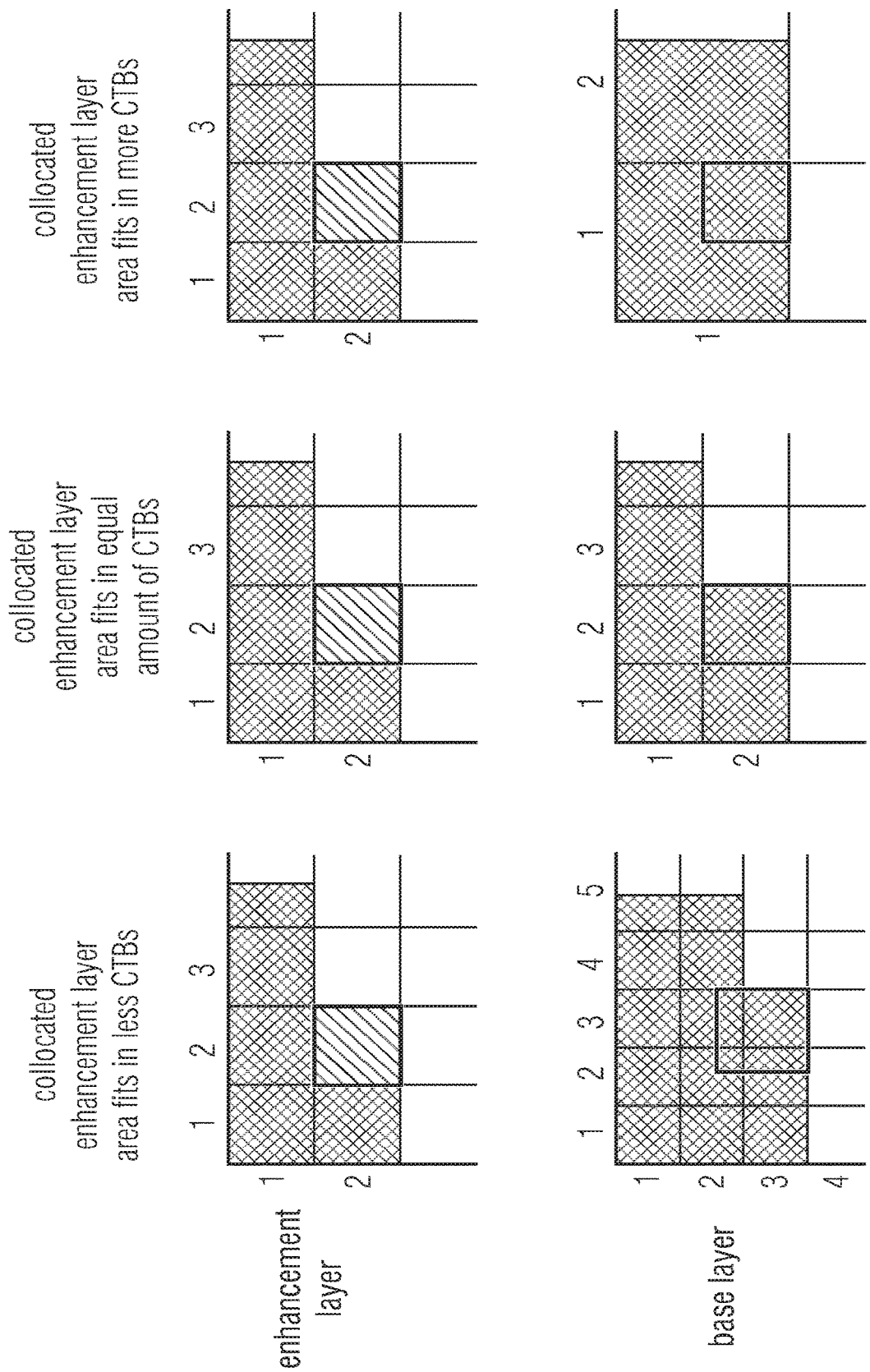
FIG. 40 shows different examples for relative regular subdivisions of base and enhancement layer pictures into blocks and the consequences resulting from these different examples.

The co-located CTB can be calculated according to the sizes of CTBs in the two respective layers and the widths of the pictures of the two respective layers, as illustrated in FIG. 40 and detailed in the course of the following description.

FIG. 40 contains three examples from left to right that show various setups of CTB sizes and pictures sizes in two respective base and enhancement layers, irrespective of picture scaling. The bold lined box in the base layer pictures marks an image area in the size of an enhancement layer CTB and its co-located image area in the CTB layout of the respective base layer.

An embodiment of such an optional CTB based layer decoding delay indication is given in the enhancement layer Sequence Parameter Set Syntax and semantics by the syntax element min_spatial_segment_delay in FIG. 41.

ctb_based_delay_enabled_flag being equal to 1 indicates that the delay signaled with min_spatial_segment_delay is given in units of CTBs. ctb_based_delay_enabled_flag indicates that min_spatial_segment_delay is not given in units of CTBs.

min_spatial_segment_delay describes the decoding delay of the current layer introduced by coding dependencies with respect to the corresponding base layer in terms of spatial segments.

Depending on the value of min_spatial_segment_delay, the following applies:

If min_spatial_segment_delay is equal to 0, no limit on the minimum delay between decoding of layers is signaled Otherwise (min_spatial_segment_delay is not equal to 0) and if ctb_based_delay_enabled_flag is equal to 1, it is a requirement of bit stream conformance that the following condition shall be true:

With $CtbSizeY_A$, $PicWidthInCtbsY_A$ and ctbAddrRsA being the CtbSizeY and PicWidthInCtbsY of a base layer A and the Ctb Address of a Ctb in base layer A in raster scan order, $CtbSizeY_B$, $PicWidthInCtbsY_B$ and $ctbAddrRs_B$ being the CtbSizeY and PicWidthInCtbsY of a dependent layer/view B and the Ctb Address of a Ctb of a dependent layer B in raster scan order and $CtbScalingFactors_{BA}$, $CtbRow_{BA}(ctbAddrRs)$ and $CtbCol_{BA}(ctbAddrRs)$ being determined as follows $Ctb ScalingFactorsu_A = (PicWidthInCtbsY_A / PicWidthInCtbsY_B)$ $CtbRows_{BA}(ctbAddrRs) = Ceil((Floor(ctbAddrRs/PicWidthInCtbsY_B)+1)*CtbScalingFactor_{BA})-1$ $CtbCols_{BA}(ctbAddrRs) = Ceil(((ctbAddrRs \% PicWidthInCtbsY_B)+1)*CtbScalingFactor_{BA})-1$ When decoding the CTB with ctbAddrRss of the current enhancement layer/view B, all necessitated base layer resources are available when the base layer CTB with $ctbAddrRs_A$ being equal to $PicWidthInCtbsY_A$ *$CtbRow_{BA}(ctbAddrRs_B)$+$CtbCol_{BA}(ctbAddrRs_B)$+ min_spatial_segment_delay is decoded completely.

Otherwise (min_spatial_segment_delay is not equal to 0 and ctb_based_delay_enabled is equal to 0), it is a requirement of bit stream conformance that exactly one of the following conditions shall be true:

In each picture parameter set that is activated within the coded video sequence, tiles_enabled_flag is equal to 0 and entropy_coding_sync_enabled_flag is equal to 0 (i.e. neither tiles nor WPP are used in the video sequence), and all base layer resources for the decoding process of first slice of the current layer in bit stream order are available when the first min_spatial_segment_delay slices of the base layer in bitstream order are decoded completely.

In each picture parameter set that is activated within the coded video sequence, tiles_enabled_flag is equal to 1 and entropy_coding_sync_enabled_flag is equal to 0 (i.e. tiles are used in the video sequence), and all base layer resources for the decoding process of the first tile of the current layer in bit stream order are available when the first min_spatial_segment_delay tiles are completely decoded that cover the same image area.

In each picture parameter set that is activated within the coded video sequence, tiles_enabled_flag is equal to 0 and entropy_coding_sync_enabled_flag is equal to 1 (i.e. WPP is used in the coded video sequence), and all base layer resources for the decoding process of the first CTB row in the current layer are available when the first min_spatial_segment_delay CTB rows of the base layer are completed.

Alternatively, the inter-layer offset may be signaled as a kind of worst case delay for ctb_based_delay_enabled_flag instead of a start-up delay for the first slices/tile/CTB row as in the former embodiments. A worst case delay gives a guarantee that during the course of decoding a spatial segment of a dependent picture, all necessitated respective base layer resources will be available when the co-located spatial segment plus the signaled offset is completely decoded.

An embodiment for a syntax is shown in FIG. 42.

min_spatial_segment_delay describes the decoding delay of the current layer introduced by coding dependencies with respect to the corresponding base layer in terms of spatial segments.

Depending on the value of min_spatial_segment_delay, the following applies:

If min_spatial_segment_delay is equal to 0, no limit on the minimum delay between decoding of layers is signaled Otherwise (min_spatial_segment_delay is not equal to 0), it is a requirement of bit stream conformance that exactly one of the following conditions shall be true:

In each picture parameter set that is activated within the coded video sequence, tiles_enabled_flag is equal to 0 and entropy_coding_sync_enabled_flag is equal to 0 (i.e. neither tiles nor WPP are used in the video sequence), and all base layer resources for the decoding process of any slice segment A of the current layer in bit stream order are available when the first slice segment C that follows (min_spatial_segment_delay− 1) slices in bitstream order in the base layer after the last slice segment B in bitstream order that contains at least a part of the same image area with respect to slice A in the current layer is decoded completely.

In each picture parameter set that is activated within the coded video sequence, tiles_enabled_flag is equal to 1 and entropy_coding_sync_enabled_flag is equal to 0

(i.e. tiles are used in the video sequence), and all base layer resources for the decoding process of any tile A of the current layer in bitstream order are available when the first tile C that follows (min_spatial_segment_delay−1) tiles in bitstream order after the last tile B in bitstream order that contains at least a part of the same image area with respect to tile A are completely decoded.

In each picture parameter set that is activated within the coded video sequence, tiles_enabled_flag is equal to 0 and entropy_coding_sync_enabled_flag is equal to 1 (i.e. WPP is used in the coded video sequence), and all base layer resources for the decoding process of the any CTB row A in the current layer are available when the first CTB row C that follows (min_spatial_segment_delay−1) CTB rows after the last CTB row B of the base layer that covers at least part of the same image area with respect to CTB row A of the enhancement layer in bitstream order are completely decoded.

A picture, or sub-coded-video-sequence based signaling of min_spatial_segment_delay is feasible as well. The scope of the SEI message in terms of associated NAL units is smaller than the coded video sequence in the temporal domain as given in FIG. 20 and is either defined by the position of the SEI message in the bitstream or by an index. One embodiment is given in the Layer_decoding_delay_SEI of FIG. 43.

Semantics with respect to the former described embodiments may change to reflect the scope of the SEI message and its syntax elements.

The above explicit examples may be slightly revised. In the above examples, the syntax element structure comprises min_spatial_segment_delay and ctb_based_delay_enabled_flag with min_spatial_segment_delay either measuring, in a one-dimensional or scalar manner—along the spatial segment/CTB decoding order-, the inter-layer coding offset in units of spatial segments or CTBs depending on ctb_based_delay_enabled_flag. But as the number of CTBs of the base layer picture is generally greater than the number of spatial segments such as tiles or substreams of the base layer picture, in a slightly different embodiment, in case of ctb_based_delay_enabled_flag indicating the CTB-based inter-layer offset indication, this inter-layer offset is not determined based on min_spatial_segment_delay only, but rather the latter syntax element is, in that case, interpreted as indicating the location of that CTb of the base layer picture in the horizontal dimension, the complete decoding of which may be used as a trigger by the decoder so as to commence decoding the enhancement layer picture. Naturally, min_spatial_segment_delay could alternatively be interpreted as indicating the base layer pictures's CTB along the vertical dimension. Depending on ctb_based_delay_enabled_flag, namely if same indicates the CTB based indication, a further syntax element is transmitted in the data stream which indicates the location of the base layer picture's CTB acting as the just mentioned trigger, in the other dimension.

That is, the following syntax fragment may be used for signaling, i.e. may be used as the syntax element structure:

The indices i and j may indicate the layer id of the base layer and the enhancement layer.

| | |
|---|---|
| min_spatial_segment_offset_plus1[ i ][ j ] | ue(v) |
| if( min_spatial_segment_offset_plus1[ i ][ j ] > 0 ) { | |
|     ctu_based_offset_enabled_flag[ i ][ j ] | u(1) |
|     if( ctu_based_offset_enabled_flag[ i ][ j ] ) | |
|         min_horizontal_ctu_offset_plus1[ i ][ j ] | ue(v) |

The semantics of the above syntax elements may be described as follows:

min_spatial_segment_offset_plus1[i][j] indicates the spatial region, in each picture of the j-th direct reference layer of the i-th layer, that is not used for inter-layer prediction for decoding of any picture of the i-th layer, by itself or together with min_horizontal_ctu_offset_plus1[i][j], as specified below. The value of min_spatial_segment_offset_plus1[i][j] shall be in the range of 0 to refPicWidthInCtbsY[i][j] *refPicHeightInCtbsY[i][j], inclusive. When not present, the value of min_spatial_segment_offset_plus1_[i][j] is inferred to be equal to 0.

ctu_based_offset_enabled_flag[i][j] equal to 1 specifies that the spatial region, in units of CTUs, in each picture of the j-th direct reference layer of the i-th layer, that is not used for inter-layer prediction for decoding of any picture of the i-th layer is indicated by min_spatial_segment_offset_plus1 [i][j] and min_horizontal ctu_offset_plus1 [i][j] together. ctu_based_offset_enabled_flag[i][j] equal to 0 specifies that the spatial region, in units of slice segments, tiles, or CTU rows, in each picture of the j-th direct reference layer of the i-th layer, that is not used for inter-layer prediction for decoding of any picture of the i-th layer is indicated by min_spatial_segment_offset_plus1_[i] only. When not present, the value of ctu_based_offset_enabled_flag[i] is inferred to be equal to 0.

min_horizontal_ctu_offsetplus1[i][j], when ctu_based_offset_enabled_flag [i][j] is equal to 1, indicates the spatial region, in each picture of the j-th direct reference layer of the i-th layer, that is not used for inter-layer prediction for decoding of any picture of the i-th layer, together with min_spatial_segment_offset_plus1_[i][j], as specified below. The value of min_horizontal_ctu_offset_plus1[i][j] shall be in the range of 0 to refPicWidthInCtbsY[i][j], inclusive.

When ctu_based_offset_enabled_flag[i][j] is equal to 1, the variable minHorizontalCtbOffset[i][j] is derived as follows:
minHorizontalCtbOffset[i][j]=(min_horizontal_ctu_offset_plus1[i][j]>0)? (min_horizontal_ctu_offset_plus1 [i][j]−1): (refPicWidthInCtbsY[i][j]−1)

The variables curPicWidthInSamplesa [i], curPicHeightInSamplesa [i], curCtblog2SizeY[i], curPicWidthInCtbsY [i], and curPicHeightInCtbsY[i] are set equal to PicWidthInSamples$_L$, PicHeightInSamples$_L$, Ctblog2SizeY, PicWidthInCtbsY, and PicHeightInCtbsY, respectively, of the i-th layer.

The variables refPicWidthInSamples$_L$[i][j], ref PicHeightInSamplesL[i][j], refCtblog2SizeY[i][j], refPicWidthInCtbsY[i][j], and refPicHeightInCtbsY[i][j] are set equal to PicWidthInSamples$_L$, PicHeightInSamplesL, Ctblog2SizeY, PicWidthInCtbsY, and PicHeightInCtbsY, respectively, of the j-th direct reference layer of the i-th layer.

The variables curScaledRefLayerLeftOffset[i][j], curScaledRefLayerTopOffset [i][j], curScaledRefLayerRightOffset [i][j] and curScaledRefLayerBottomOffset[i][j] are set equal to scaled_ref_layer_left_offset[j]<<1, scaled_ref_layer_top_offset[j]<<1, scaled_ref_layer_right_offset

[j]<<1, scaled_ref_layer_bottom_offset [j]<<1, respectively, of the j-th direct reference layer of the i-th layer.

The variable colCtbAddr[i][j] that denotes the raster scan address of the collocated CTU, in a picture in the j-th direct reference layer of the i-th layer, of the CTU with raster scan address equal to ctbAddr in a picture of the i-th layer is derived as follows:

The variables (xP, yP) specifying the location of the top-left luma sample of the CTU with raster scan address equal to ctbAddr relative to top-left luma sample in a picture of the i-th layer are derived as follows:
xP=(ctbAddr % curPicWidthInCtbsY[i])<<curCtblog2SizeY
yP=(ctbAddr/curPicWidthInCtbsY[i])<<curCtblog2SizeY The variables scaleFactorX[i][j] and scaleFactorY[i][j] are derived as follows: curScaledRefLayerPicWidthInSamples$_L$[i][j]=curPicWidthInSamples$_L$[i] curScaledRefLayerLeftOffset[i][j]=curScaledRefLayerRightOffset[i][j]
curScaledRefLayerPicWidthInSamples$_L$[i][j]=cur PicHeightInSamples$_L$[i] curScaledReflayerTopOffset[i][j]−curScaledRefLayerBottomOffset[i][j] scaleFactorX[i][j]=((ref PicWidthInSamples$_L$ [i][j]<<16)+
(curScaledRefLayerPicWidthInSamples$_L$ W[j]>>1)/ curScaledRefLayerPicWidthInSamples$_L$) [i][j]
scaleFactorY[i][j]=((refPicHeightInSamplesL [i][j]<<16)+ (curScaledRefLayerPicWidthInSamples>>1))/curScaledRefLayerPicWidthInSamples [i][$_j$]

The variables (xCol[I][j], yCol xCol[I][j]) specifying the collocated luma sample location in a picture in the j-th direct reference layer of the luma sample location (xP, yP) in the i-th layer are derived as follows:
xCol[i][j]=Clip3(0, (refPicWidthInSamples$_L$[i][j]−1), ((xP−curScaledRefLayerLeftOffset[i][j])*scaleFactorX[i][j]+(1<<15))>>16) yCol [i][j]=Clip3(0, (refPicHeightInSamplesL [i][j]−1), ((yP−curScaledRefLayerTopOffset[i][j])*scaleFactorY[i][j]+(1<<15))>>16))

The variable colCtbAddr[i][j] is derived as follows:
xColCtb[i][j]=xCol[i][j]>>refCtblog2SizeY[i][j]
yColCtb[i][j]=yCol[i][j]>>refCtblog2SizeY[i][j]
colCtbAddr[i][j]=xColCtb[i][j]+(yColCtb[i][j]*refPicWidthInCtbsY[i][j])

When min_spatial_segment_offset_plus1 [i][j] is greater than 0, it is a requirement of bitstream conformance that the following shall apply:

If ctu_based_offset_enabled_flag[i][j] is equal to 0, exactly one of the following applies:

In each PPS referred to by a picture in the j-th direct reference layer of the i-th layer, tiles_enabled_flag is equal to 0 and entropy_coding_sync_enabled_flag is equal to 0, and the following applies:

Let slice segment A be any slice segment of a picture of the i-th layer and ctbAddr be the raster scan address of the last CTU in slice segment A. Let slice segment B be the slice segment that belongs to the same access unit as slice segment A, belongs to the j-th direct reference layer of the i-th layer, and contains the CTU with raster scan address colCtbAddr[i][j]. Let slice segment C be the slice segment that is in the same picture as slice segment B and follows slice segment B in decoding order, and between slice segment B and that slice segment there are min_spatial_segment_offset_plus1_[i]−1 slice segments in decoding order. When slice segment C is present, the syntax elements of slice segment A are constrained such that no sample or syntax elements values in slice segment C or any slice segment of the same picture following C in decoding order are used for inter-layer prediction in the decoding process of any samples within slice segment A.

In each PPS referred to by a picture in the j-th direct reference layer of the i-th layer, tiles_enabled_flag is equal to 1 and entropy_coding_sync_enabled_flag is equal to 0, and the following applies:

Let tile A be any tile in any picture picA of the i-th layer and ctbAddr be the raster scan address of the last CTU in tile A. Let tile B be the tile that is in the picture picB belonging to the same access unit as picA and belonging to the j-th direct reference layer of the i-th layer and that contains the CTU with raster scan address colCtbAddr[i][j]. Let tile C be the tile that is also in picB and follows tile B in decoding order, and between tile B and that tile there are min_spatial_segment_offset_plus_1_[i]−1 tiles in decoding order. When slice segment C is present, the syntax elements of tile A are constrained such that no sample or syntax elements values in tile C or any tile of the same picture following C in decoding order are used for inter-layer prediction in the decoding process of any samples within tile A.

In each PPS referred to by a picture in the j-th direct reference layer of the i-th layer, tiles_enabled_flag is equal to O and entropy_coding_sync_enabled_flag is equal to 1, and the following applies:

Let CTU row A be any CTU row in any picture picA of the i-th layer and ctbAddr be the raster scan address of the last CTU in CTU row A. Let CTU row B be the CTU row that is in the picture picB belonging to the same access unit as picA and belonging to the j-th direct reference layer of the i-th layer and that contains the CTU with raster scan address colCtbAddr[i][j]. Let CTU row C be the CTU row that is also in picB and follows CTU row B in decoding order, and between CTU row B and that CTU row there are min_spatial_segment_offset_plus1 [i]−1 CTU rows in decoding order. When CTU row C is present, the syntax elements of CTU row A are constrained such that no sample or syntax elements values in CTU row C or row of the same picture following C are used for inter-layer prediction in the decoding process of any samples within CTU row A.

Otherwise (ctu_based_offset_enabled_flag[i][j] is equal to 1), the following applies:

The variable refCtbAddr[i][j] is derived as follows: xOffset[i][j]=((xColCtb[i][j]+minHorizontalCtbOffset[i][j])>(refPicWidthInCtbsY[i][j]))? (refPicWidthInCtbsY[i][j]−1−xColCtb[i][j]): (minHorizontalCtbOffset[i][j]) yOffset[i][j]=(min_spatial_segment_offset_plus1[i][j]−1)*refPicWidthInCtbsY[i][j] refCtbAddr[i][j]=colCtbAddr[i][j]+xOffset[i][j]+yOffset[i][j]

Let CTU A be any CTU in any picture picA of the i-th layer, and ctbAddr be the raster scan address ctbAddr of CTU A. Let CTU B be a CTU that is in the picture belonging to the same access unit as picA and belonging to the j-th direct reference layer of the i-th layer and that has raster scan address greater than refCtbAddr[i][j]. When CTU B is present, the syntax elements of CTU A are constrained such that no sample or syntax elements values in CTU Bare used for inter-layer prediction in the decoding process of any samples within CTU A.

That is, summarizing the just-presented embodiment, the CTB-based indication of the inter-layer offset may be done in a switchable way using a flag which switches between this CTB-based indication on the one hand the spatial segment based indication of the inter-layer offset on the other hand and in doing so, the CTB-based alternative may use the syntax element which transmitted unconditionally, i.e. irrespective of the CTB-based or spatial segment based inter-layer offset indication, that is the syntax element indicating the inter-layer offset in units of spatial segments in case of the spatial segment-wise indication being signaled, as one component, such as horizontal or vertical component, of the location of a "trigger CTB" in the base layer picture. Depending on the syntax element switching between the CTB based and spatial segment based inter-layer offset indication, a further syntax element is then transmitted or not. In particular, it is transmitted if the CTB based indication is signaled. In that case, the latter syntax element indicates the missing dimension of the location of the "trigger CTB". The decoder thus may identify the "trigger CTB" among the regular arrangement of CTBs of the base layer picture in rows and columns using the two syntax elements and as soon as this CTB has been decoded, the decoder may commence decoding the enhancement layer picture. Still, the indication of any inter-layer offset may be completely switched off by way of using one of the representable states of the first syntax element, i.e. min_spatial_segment_delay. Owing to the predetermined decoding order defined among CTBs, in the CTB-based inter-layer offset indication case, the decoder may still transfer the horizontal and vertical components of the position of the trigger CTB into a number of CTBs of the base layer picture which have to be completely decoded before commencing the decoding of the first CTB of the enhancement layer picture so that the decoder may use the embodiment of FIG. 36 so as to control the abeyance of the CTB-based indication of the inter-layer offset.

In the following, a further aspect of the present invention is described in more detail. The fourth aspect is about the problem that all participating network entities which receive the bitstream from the encoder are enabled to easily distinguish between the various layers conveyed in the multi-layer data stream. For example, intermediate network entities may be interested in excluding certain information layers from further transmission such as layers concerning sample resolutions exceeding some resolution threshold. The following description provides an overview of the current situation in the envisaged extension of HEVC.

The Video Parameter Set (VPS) of HEVC [1] provides high level access to a coded bitstream and contains information that is vital to process bitstreams at an intermediate or end device. The upcoming scalable and multiview extensions of HEVC will further benefit from the VPS extension that provides syntax designed for scalable bitstreams. One of the main tasks of the VPS extension is to provide a unified approach to interpretation of the nuh reserved_zero_6 bits in the NAL unit header. The nuh_reserved_zero_6 bits are intended to be relabeled as layer_id and serve as a generic layer identifier in a scalable video coding scenario. The layer_id syntax element in the NAL unit header is given in following table along the NAL unit header given in [1] and as shown in FIG. 22.

Two general approaches were considered in the design process [5]. Firstly, an approach that maps values of a single identifier in the header of NAL units to potentially multiple scalable identifiers as signaled in the VPS extension. Secondly, an approach that assigns individual bits (or blocks of bits) of a single identifier in the header of NAL to specific scalable identifiers signaled in the VPS extension.

The design of the current VPS extension syntax as reported in [4] uses the mapping approach but already contains all syntax elements necessitated for both approaches, namely two syntax elements indicate the types of scalability (cp. scalability_map) and the amount of layers per scalability dimension (cp. dimension_id_len_minus1).

The mapping approach introduces further syntax elements to the VPS extension syntax, i.e. the actual value of the scalable identifier coded as u(v) and optionally the layer_id if an encoder chooses to allocate the values of layer_id sparsely in a non-consecutive form.

In many very likely scalable scenarios, e.g. two or three spatial layer, two or three views and others, it is not necessitated to utilize all 63 values of the 6 bit layer identifier in the NAL unit header. For these scalable scenarios, the approach that assigns individual bits of the layer identifier in the NAL unit header to specific scalable dimension has two advantages when compared to a mapping-based approach:

Interpretation of layer identifier values in the NAL unit header in terms of scalability dimensions identifiers necessitates no indirection or look up.

VPS extension syntax elements necessitated for mapping approach do not need to be transmitted which account for a significant portion of the VSP extension bits for scalability signaling.

Intermediate devices do not need to store mapping table for each passing video bitstream.

In accordance with the concept of the fourth aspect described below, there may be a hint within the High Level Syntax of HEVC that indicates whether a mapping or a partitioning approach is used.

According to one embodiment, depending on the hint, a portion of the mapping related syntax elements (cp. vps_nuh_layer_id_present flag, layer_id_in_nuh[i] and dimension_id[i][j]) is either transmitted or left out and the syntax elements for scalability types (cp. scalability mask) and the amount of layers per scalability (cp. dimension_id_len_minus1), are signaled and have to be interpreted according to the hint either as information about the partitioning or the mapping of the scalable identifier in the NAL unit header.

Figure 23:
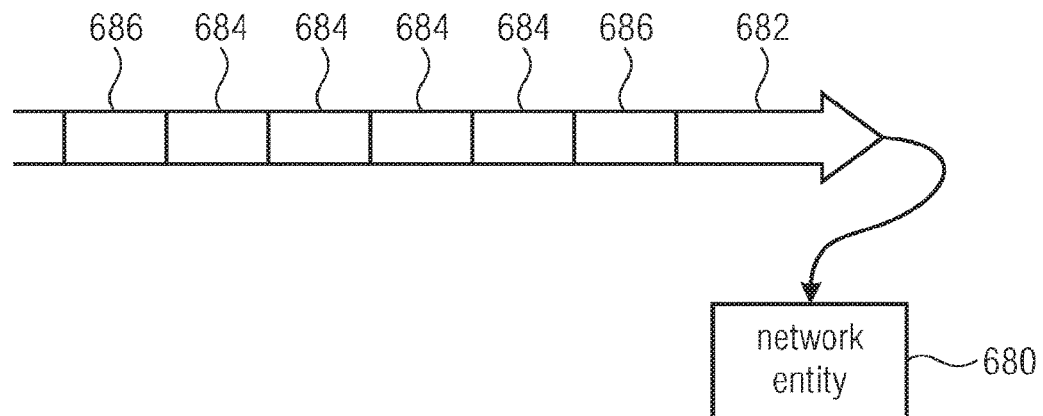
FIG. 23 shows a schematic block diagram of a network entity in accordance with an embodiment according to which scalable coding is alleviated by allowing switching between different layer indicator field interpretations.

An embodiment corresponding to, or exploiting, the concept of the fourth aspect of the present invention is presented with respect to FIG. 23. FIG. 23 shows a network entity which may be a video decoder as any one of those already discussed above, or may be an intermediate network entity resulting between encoder and decoder. The network entity is generally indicated using reference sign 680. It is for processing a multi-layer video data stream 682, such as for example any one of the data streams 40 mentioned above. In the case of network entity 680 being a video decoder, the processing would involve decoding the multi-layer video data stream 682. In the case of an intermediate network entity, the processing could, for example, encompass a forwarding of the video data stream.

A scene is coded into the multi-layer video data stream in layers so that, in each layer, this scene is coded in a different operational point of a scalability space spanned by scalability dimensions, wherein the multi-layer video data stream is composed of first NAL units, each of which is associated with one of the layers, and second NAL units interspersed within the first NAL units and presenting general information on the multi-layer video data stream. In other words, the first NAL units 684 may carry one or more slices of pictures of the video, with the "picture" corresponding to any of the layers of the multi-layer video data stream 682. In the above embodiments, for ease of description, merely two layers were discussed, layer 0 and layer 1. Naturally, the number of layers may be greater than two and even the sort of information which a layer contributes to any of the previous layers may differ from layer to layer. Besides the first NAL units 684, the NAL units 686 are shown to be interspersed between NAL units 684, but their transmission may be performed by way of a separate channel compared to the first NAL unit 684. The second NAL units present general information on the multi-layer video data stream in the manner set out in more detail below.

Figure 24:
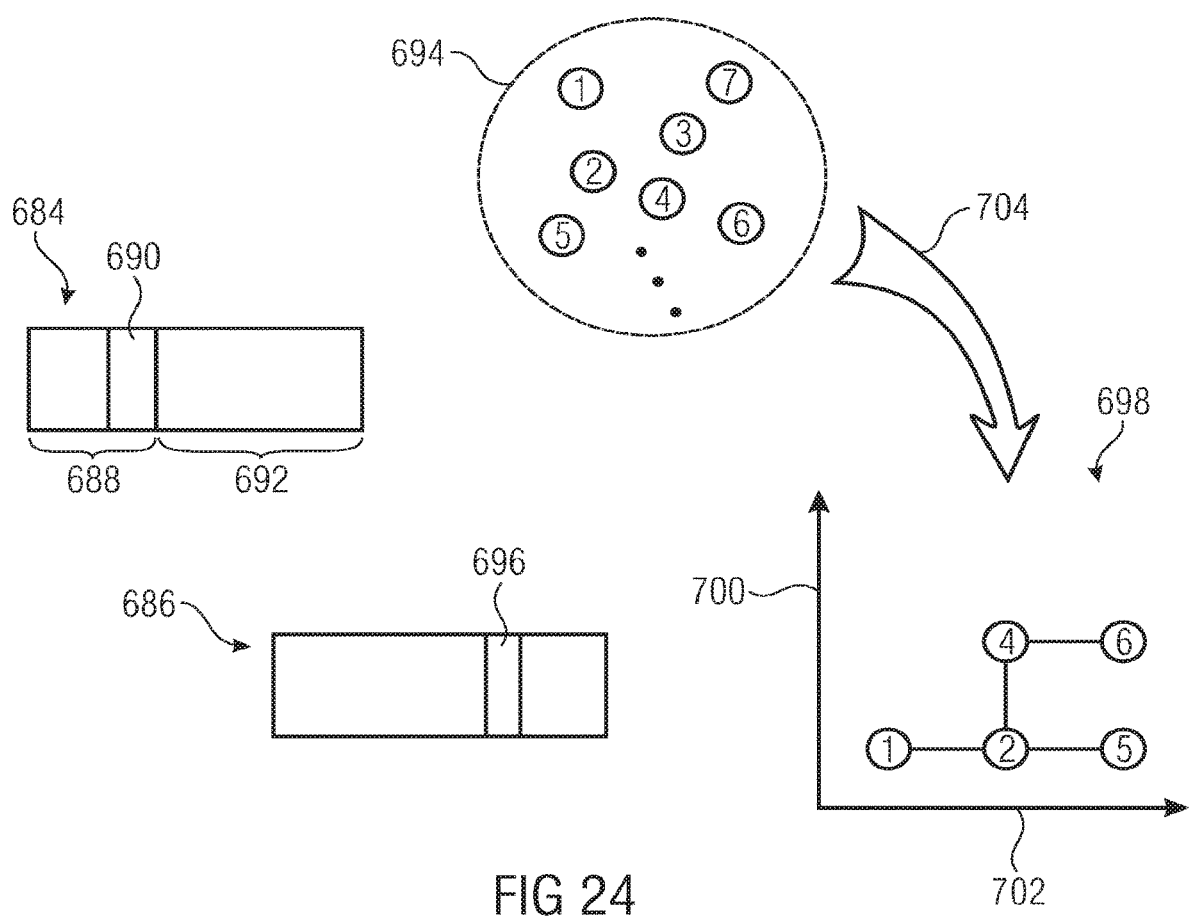
FIG. 24 shows a schematic diagram illustrating the way of switching in response to a type indicator field.

In order to describe the association between the first NAL units on the one hand and the set of layers of data stream 682, on the other hand, in more detail, reference is made to FIG. 24. FIG. 24 shows a first NAL unit 684 as a representative for all first NAL units 684, It comprises, within a header 688, a layer indicator field 690. Besides header 688, NAL unit 684 comprises payload data 692 concerning slice data as discussed above with respect to the other figures, i.e. data concerning the video content encoded using inter-layer prediction. FIG. 24 also shows the set of layers, namely 694. In particular, the set 694 of layers shown in FIG. 24, shall denote all of the possible layers which may be represented and distinguished from each other by way of the layer indicator field 690 in NAL unit 684. That is, the association function between set 694 on the one hand, and the possible values of the layer indicator field 690, shall be assumed as being a bijective one. In FIG. 24, the individual layers of set 694 are exemplarily illustrated using small circles, each having a certain number inscribed thereinto. Although these inscribed numbers suggest an order to be defined among the layers of set 694, it should be noted that the following discussion will reveal that the way the layers in set 694 are arranged or sorted is not derivable on the basis of the layer indicator field 690, only. Rather, to this end, the network entity 680 needs to inspect a type indicator field 696 in the interspersed second NAL units 686. However, this is described later.

In other words, until now each element of set 694 in FIG. 24 merely represents one of the possible states of the layer indicator field 690 in the NAL units 684. The layers in set 694 are distinguishable by way of the layer indicator field 690, but the semantic meaning and order among these layers does not become clear for the network entity 680 without additional information provided by the second NAL unit 686. Nevertheless, in reality the layers of set 694 form nodes of a tree with the branches between the trees corresponding to certain scalability dimensions or axes. One of the layers is, for example, the base layer and corresponds to the root of the tree. Each branch connecting two layers, i.e. two nodes of the tree, describes how a certain layer contributes to another layer, i.e. which sort of information is additionally provided using inter-layer prediction, the sort of information corresponding to the scalability dimension and may be, for example, spatial resolution increase, SNR increase, or the like. For the sake of simplicity, FIG. 24 shows a two-dimensional scalability space 698 spanned by two scalability dimensions 700 and 702 corresponding to, for example, spatial scalability and SNR scalability. An exemplary tree of layers and its extension through space 698 is shown in FIG. 24. FIG. 24 also shows that not all of the possible layers of set 694 may be present in data stream 682. In the exemplary case of FIG. 24, for example, merely five layers are actually used in the data stream 682.

FIG. 22, for example, showed that the layer indicator field may have 6 bits, thereby distinguishing $2^6=64$ possible states or possible layers of set 694. It is the mapping from these possible values or layers of set 694 onto the operational points in the scalability space 698 which may be adjusted in a manner described in more detail below by way of the second NAL unit 686. The mapping is indicated in FIG. 24 using reference sign 704. The "operational points" shall denote the positions of at least the actually present layers within set 694 within the scalability space 698. For example, the origin of scalability space 698 may be associated with the base layer or tree root, while each branch along any of axes 700 and 702 of scalability space 698 may have a fixed length of 1. The vectors pointing to the operational points in scalability space 698 may thus have integer valued coordinates.

Briefly summarizing the description brought forward so far, the multi-layer video data stream 682 provides information about a video content or scene in multiple layers. The layers are arranged in a tree with each layer being connected to the tree via a branch. Starting from a base layer forming the tree root, a next following layer contributes to the reconstructible version of the video content information concerning a certain kind of information, interpretable as scalability dimension. Accordingly, each layer is either the tree root layer or is connected to the latter through a certain path of branches and the NAL units 684 belonging to layers lying along this path are needed so as to reconstruct the video content at the respective layer. Naturally, it is advantageous if the mapping 704 is performed such that any "contributing" layer leading at a distal end of a respective branch with respect to the tree root has a value of the layer indicator field 690, which is higher than the value of the layer indicator field of the layer at the proximal end of the respective branch.

Figure 25:
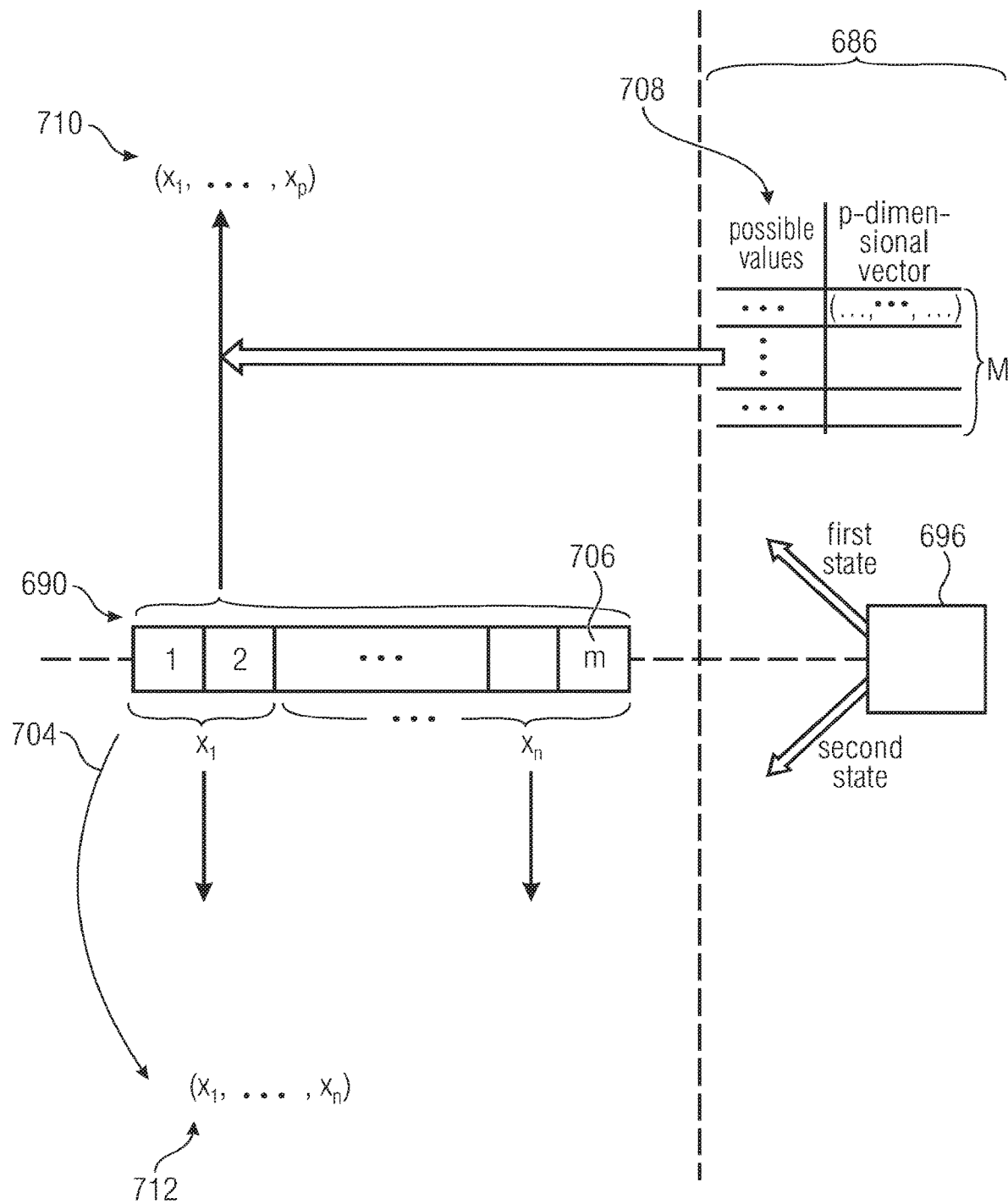
FIG. 25 shows a schematic diagram illustrating the switchable layer indicator field interpretation in accordance with an embodiment in further detail.

FIG. 25 shows the meaning of the type indicator field 696 in more detail. FIG. 25 shows the layer indicator field 690 as a field of fixed bit length. In any case, the length of field 690 is independent from the value of the type indicator field 696. However, if the type indicator field has a first state, the layer indicator field 690 is treated as a whole, i.e. all of its n bits are treated commonly to distinguish possible values thereof. Advantageously, a n-bit integer number is derived from the layer indicator field 690 by network entity 680 if the type indicator field 696 assumes the first state. In the case of type indicator field 696 assuming the first state, network entity 680 performs the mapping 704 of the possible values of the m-bit field 690 onto the operational points by use of mapping information conveyed within the second NAL units 686, the mapping information being indicated in FIG. 25 using reference sign 708. As shown in FIG. 25, the mapping information 708 comprises, for example, a table assigning to each actually used possible value of the layer indicator field 690 a vector pointing to the associated operational point of the respective possible value. That is, in case of the type indicator field 696 assuming the first state, the network entity 680 may derive the mapping information 708 from the second NAL units 686 and may perform for each layer indicator field 690 a look-up into the mapping information or table 708 so as to look-up the associated vector so as to locate the respective/associated operational point in space 698. The number p of dimensions of the vectors associated to the possible values in mapping information 708 may be set by default or may be signaled within the data stream, such as the second NAL units 686. Later on, it will be shown that the following information may be signaled in order to convey information about the mapping information 708: vps-_max_layers_minus1 may determine the number M of actually used possible values of the M-bit field 690. num_dimensions_minus1 may define the numbers of dimensions. The latter two variables may be transmitted using the syntax element scalability mask. The table itself may then be signaled via pairs of possible values on the one hand, namely layer_id_in_nuh, and a p-dimensional vector, namely dimension_id[i][j]. The mapping 704 then leads to a p-dimensional vector, namely the one mapped via the mapping information 708 onto this respective vector 710 pointing to the operational point within space 698 associated with the layer of the NAL unit having layer indicator field 690.

If, however, the type indicator field 696 assumes a second state, the mapping 704 is performed differently. In particular, the mapping is performed in that case by splitting the layer indicator field 690 into more than one portion, i.e. by splitting up the sequence of m-bits of field 690 into a number n of consecutive sub-sequences of bits. Each portion thus obtained is used as a coordinate $x_1 \ldots x_n$ of an n-dimensional vector 712, which in turn points to the operational point within the scalability space 698, associated with the layer of the NAL unit comprising the layer indicator field 690. For example, the m-bits of the layer indicator field 690 are split up into n portions by forming a first portion out of the first (most significant) m1 bits of field 690, a second portion out of the following m2 (next less significant) bits of field 690 and so forth up to the n-th portion with $m_1 + \ldots + m_n = m$. Th bits of each portion may directly be treated as an integer value representation.

In the case of the type indicator field assuming the second state, the number of dimensions n may be set by default or signaled via the data stream. In case of the specific embodiment described herein after, n is derived based on the same syntax element used in order to determine p in case of the type indicator field 696 assuming the first state, namely based on scalability_mask. The bit length of the portions into which the layer indicator field 690 is subdivided, namely $m_1, \ldots, m_n$, are also exemplarily signaled via syntax elements dimension_id_len_minus1, but again, the subdivision may be achieved by default without explicit transmission.

It should be noted that the same syntax structure, such as scalability_mask, being parsable irrespective of the type indicator field 696, may indicate the number and semantic meaning of dimensions of the scalability space. It might be, that the allowed states of this syntax element are restricted—relative to the mapping case—onto a proper subset of available possible states of that syntax element in case of the type indicator field 696 indicating the component-wise interpretation of the layer indicator field, however, since, for example, the maximum number of dimensions of the scalability space being available (or settable) in the mapping case (first state of type indicator filed) might be higher than the maximum number available in the component interpretation case (first state of type indicator filed). The encoder would obey this restriction accordingly.

Exemplary use cases for the embodiment of FIGS. 23 to 25 are:

Mass Multi Party Conferencing

In a mass conversational service scenario based on RTP, e.g. a web conference, transferred video between multiple parties is adapted in a multipoint control unit (MCU) that has to be aware of the parameter sets of the respective video bitstreams. Each party provides a thumbnail bitstream and two bitstreams with enhanced spatial resolution, e.g. 720p and 4K, of a speaker. The MCU takes decisions about which streams to provide to which party. Easy parsing of scalability parameters is therefore a significant relief for the MCU. A partitioning based approach would necessitate less computational and memory resources compared to a mapping based approach of scalability signaling.

Transport Systems

In transport systems, such as RTP or MPEG2-TS, mapping the scalability related codec information to respective elements could benefit from a less complex and bit saving mechanism such as partitioning compared to the mapping-based approach. It is unlikely that transport systems will adopt a scalability signaling in the fashion of a mapping approach but will rather resolve the mapping indirection and produce dedicated scalability identifiers for each scalability dimension which will in turn be explicitly signaled such as in the partitioning approach.

The example in FIG. 26 presents a possible embodiment as a syntax flag in the VPS extension syntax that allows switching between a mapping and a partitioning based approach for scalability signaling in the extensions of HEVC, based on the VPS extension syntax as reported in [4].

dedicated_scalability_ids_flag with a value equal to 1 indicates that the bits of the layer_id field in the NAL unit header are split according to the values of dimension_id_len_minus_1_[ ] and belong to the respective scalability dimensions signaled in scalability_mask. dedicated_scalability_ids_flag with a value equal to 1 indicates that the syntax elements vps_nuh_layer_id_present_flag, layer_id_in_nuh[i] and dimension_id[i][j] are not signaled. dedicated_scalability_ids_flag with a value equal to 1 indicates that the derivation of variables describing the scalable identifiers of the corresponding NAL unit use only the respective associated bits of the scalable identifier in the NAL unit header (cp. layer_id), e.g. in a fashion as follows:

DependencyId=layer_id && 0x07
QualityId=layer_id && 0x38 dedicated_scalability_ids_flag with a value equal to O indicates that the syntax elements vps_nuh_layer_id_present_flag, layer_id_in_nuh[i] and dimension_id[i][j] are signaled and the bits of layer_id in the NAL unit header are not associated to a specific scalability dimension but mapped to scalable identifiers in the VPS extension. dedicated_scalability_ids_flag with a value equal to O indicates that the derivation of variables describing the scalable identifiers of the corresponding NAL unit uses the syntax elements dimension_id[i][j] given layer_id is signaled in the NAL unit header, e.g. in a fashion as follows:

if (layer_id==layer_id_in_nuh[0]){
DependencyId=dimension_id[0][0]
QualityId=dimension_id[0][1]

dimension_id_len_minus1[i] when dedicated_scalability_ids_flag is equal to 0 indicates the length in bits of dimension_id[i][j]. dimension_id_len_minus1_[i] when dedicated_scalability_ids_flag is equal to 1 indicates the number of bits of layer_id in the NAL unit header associated with the i-th scalability dimension as indicated by scalability_mask.

Figure 27:
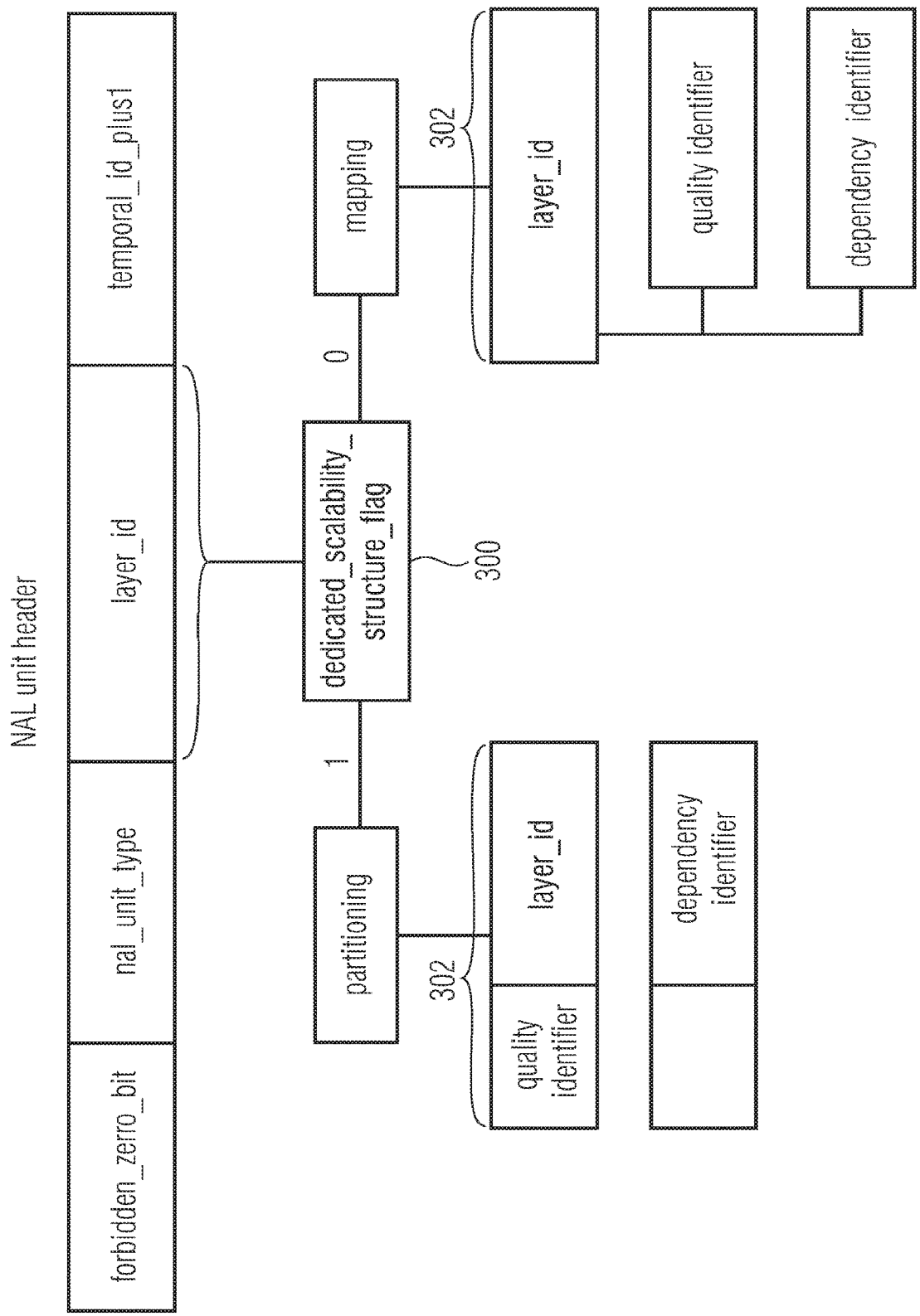
FIG. 27 shows a schematic diagram illustrating the layer indicator field switching relating to the syntax of FIG. 26.

The flow chart in FIG. 27 further illustrates the possible embodiment of the invention. Scalable identifiers are either derived from the bits of layer_id directly via a masked bit copy or signaled in the VPS via association to a specific value of layer_id.

Another syntax example is shown in FIG. 31. Here, the type indicator filed is signaled by "splitting_flag", while the layer indicator filed is called nuh_layer_id. Depending on "splitting_flag", the mapping concept or the partitioning concept is used for deriving the respective NAL unit's layer's operational point in scalability space from the nuh_layer_id. The partitioning concept is, exemplarily, signaled by splitting_flag being equal to 1. Then, scalable identifiers, i.e. the vector components concerning the scalability dimensions of the scalability space, can be derived from the nuh_layer_id syntax element in the NAL unit header by a bit masked copy. The respective bit mask for the i-th scalable dimension, the i-th component of vector 712 in FIG. 25, is defined as follows. In particular, splitting_flag equal to 1 indicates that the dimension_id[i][j] syntax elements are not present (i.e. no mapping information 708 is present) and that the binary representation of the nuh_layer_id value in the NAL unit header is split into a sequence of NumScalabilityTypes, i.e. n, segments, $x_{1\ldots n}$ with lengths, in bits, according to the values of dimension_id_len_minus1[j] and that the values of dimension_id[LayerIdxInVps[nuh_layer_id]][j], i.e. the components $x_{1\ldots n}$ of vector 712, are inferred from the NumScalabilityTypes segments of field 690. The semantic meaning and number of scalability axes of the scalability space is signaled by a sequence of flags scalability_mask_flag indicating for each of a here exemplarily fixed number of predefined scalability types as to whether the respective scalability type belongs to any of the scalability dimensions of the scalability space 698 or not. In particular, network entity 680 is able to derive the scalability space, i.e. semantic meaning and number of scalability axes NumScalabilityTypes, from the sequence of flags scalability_mask_flag according to the for loop in FIG. 31:

```
for( i = 0, NumScalabilityTypes = 0; i < 16; i++ ) {
    scalability_mask_flag[ i ]
    NumScalabilityTypes += scalability_mask_flag[ i ]
}
``` where scalability_mask_flag[i] equal to 1 indicates that the i-th scalability dimension is present. and scalability_mask_flag[i] equal to 0 indicates that the i-th scalability dimension is not present. Here, i=1 may denote MultiviewView scalability, i=2 may denote spatial/SNR scalability and i=0 may denote the addition of depth map information. Other scalability dimension types may exist as well and, naturally, the just outlined example is merely illustrative. Assuming the length of nuh_layer_id to be exemplarily be 6, the partitioning or masked copy may be done as follows:

The variable dimBitOffset[0] is set equal to 0 and for j in the range of 1 to NumScalabilityTypes−1, inclusive, dimBitOffset[j] is derived as follows:

$$dimBitOffset[j] = \sum_{dimIdx=0}^{j-1} (\text{dimension\_id\_len\_minus1}[dimIdx] + 1)$$

The value of dimension id_len_minus1[NumScalabilityTypes−1] is inferred to be equal to 5—dimBitOffset[NumScalabilityTypes−1].

The value of dimBitOffset[NumScalabilityTypes] is set equal to 6.

It is a requirement of bitstream conformance that when NumScalabilityTypes is greater than 0, dimBitOffset[NumScalabilityTypes−1] shall be less than 6.

For j from O to NumScalabilityTypes−1, inclusive, dimension_id[i][j] is inferred to be equal to ((nuh_layer_id & ((1<<dimBitOffset[j+1])−1))>>dimBitOffset[j]).

Summarizing, the following syntax elements are involved with associating each first NAL unit with its operational point in the scalability space:

1) nuh_layer_id i.e. layer indicator filed 690
2) the sequence of scalability_mask_flag, i.e. information revealing number and meaning of scalability axes 700, 702 of space 698, and thus the number n of portions $x_i$ of field
3) dimension_id_len_minus1, i.e. the bit length, of each portion $x_i$ of field 690 for each of the axes (all except one, because the remaining one may be inferred to encompass all remaining bits 706 of field 690
4) vps_max_layers_minus1 is transmitted, in accordance with an optional embodiment of FIG. 31, also, this syntax element indicating the number of used/actual layers among the possible $\Sigma_i\ 2^{m_i}$ ones, along with a sequence of vps_max_layers_minus1 possible values of the partitioned layer indicator field, i.e. a sequence of layer_id_in_nuh[i], thereby defining a rank order among the possible operational points In case of splitting_flag being equal to 0, the mapping concept is used. The mapping information 708 is then transmitted using the following information:

1) the sequence of scalability_mask_flag, i.e. information revealing number and meaning of scalability axes 700, 702 of space 698, and thus the number p of components of the M vectors in table 708
2) dimension_id_len_minus1, i.e. the bit length, of each component $x_j$ of the vectors dimension_id[i]u] in table 708, i.e. one for each of the axes of space 698
3) layer_id_in_nuh[i] serve, optionally, as indices for the list of M vectors dimension_id[i][j]
4) vps_max_layers_minus1 is optionally transmitted also although not shown in FIG. 31, indicating the number M of used/actual layers among the possible $\Sigma_1\ 2^{dimension\ id\ len\ minus1[i]}$ ones Thus, in case of splitting_flag being equal to 0, the vectors 710 are derived inherently by partitioning without explicit signaling, i.e. without signaling dimension_id[i][j] which is inferred instead.

Thus, in accordance with the fourth aspect, i.e. the concept of "switchable interpretation of NAL unit layer identifier" the bitstream 40 may comprise NAL units, namely VPS NAL units, which comprise a type indicator filed 300 via which it is possible to switch between the mapping concept and the bit-splitting concept to interpret the layer indicator field 302 in the "normal" NAL units. Thus, the same bit positions of the field 302 are used in both modes, but the interpretation of the bits and the interpretation prescription information signaled, namely the mapping information or the split and semantic information, transferred in the bitstream changes between the modes. Although this necessitates the additional transmission of the type indicator field, this concept, altogether, leads to a more efficient bitstream transmission as the advantages of the mapping concept and the bit-splitting concept can be exploited as needed because both concepts are differently suitable for different multi-layer data such as, depending on the number of layers or the like.

The fifth aspect of the present application concerns a multi-standard multi-layer video decoder interface. The concept set out hereinafter describes an transport layer decoder and the interface between the transport layer decoder (like MPEG transport stream or RTP) and a scalable video decoder that supports different video coding standards in different layers (e.g. H.264/AVC in the base layer and HEVC in enhancement layers).

A scalable video bitstream is composed of layers: It consists of one base layer, which contains an independently decodable video signal and one or more enhancement layers which can only be decoded in combination with the base layer (and potentially other enhancement layers) and provide a higher temporal resolution (temporal scalability), spatial resolution (spatial scalability), quality (SNR scalability), higher bit depth (bit depth scalability) video signal or other camera views (multiview scalability).

Existing scalable video coding standards like H.264/AVC SVC define both base and enhancement layers in the same standard. They are designed in a way, that a scalable bitstream has the same basic format as a non-scalable bitstream. If a scalable bitstream is input into a non-scalable decoder, it can still find the packet type and discard the packets that are unknown.

HEVC is the first video coding standard allows using a different video coding standard for the base layer (e.g. H.264/AVC). The packet formats for both standards are different, so a base layer decoder cannot understand the enhancement layer packets. On the other hand the enhancement layer decoder can understand the enhancement layer packet format, but not the base layer packet format.

In audio/video systems a transport layer is used to combine several audio and video streams and to provide metadata like timing and stream type.

In existing multi-layer transport layer decoders the access units of base and enhancement layer are multiplexed into a single video data stream (e.g. Annex B Byte stream of H.264/AVC). This video stream is the input into the video decoder.

If different video coding standards are used for base and enhancement layer, base and enhancement layer packets cannot be composed into a single bitstream in all cases.

In accordance with an embodiment of the fifth aspect, a transport layer decoder distinguishes the following cases:

1. the video decoder reading the output can only decode the base layer
2. the video decoder reading the output can decode base and enhancement layers and base and enhancement layers are encoded using the same video coding standard
3. the video decoder reading the output can decode base and enhancement layers and base and enhancement layers are encoded using different video coding standards In case 1 the transport layer decoder uses the following behavior:

Only the packets containing the base layer are extracted from the transport layer and input into the single-standard single-layer video decoder in a format specified in the video coding standard.

Figure 28:
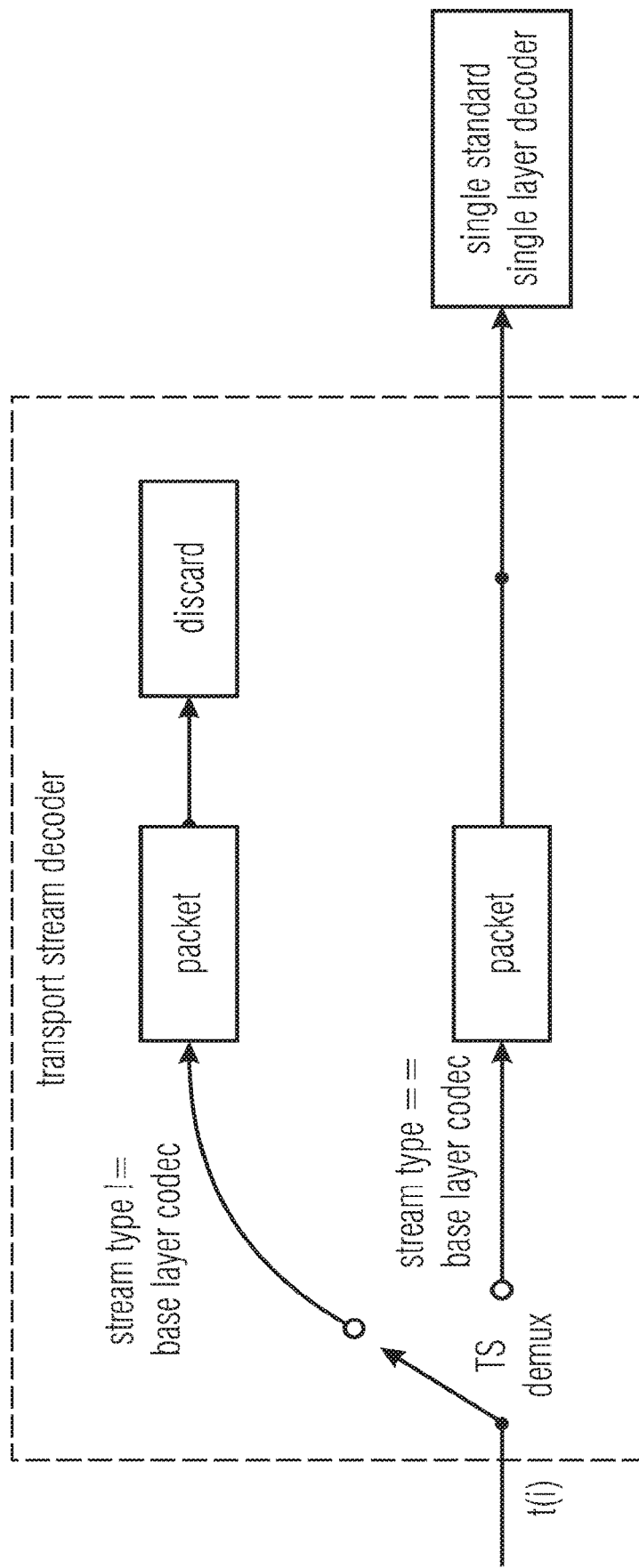
FIG. 28 shows a block diagram of a transport stream decoder configured to simply discard enhancement layer NAL units of a codec other than the base layer codec.

A specific embodiment is a transport stream decoder that extracts H.264/AVC NAL units from an MPEG-2 transport stream by selecting only the stream that has the stream type "AVC video stream conforming to one or more profiles defined in Annex A of ITU-T Rec. H.264 |ISO/IEC 14496-10 or AVC video sub-bit stream" assigned and inputs them to the H.264/AVC video decoder in the byte stream format defined in Annex B of the H.264/AVC specification. NAL units belonging to streams whose stream type is not equal to the stream type "AVC video stream conforming to one or more profiles defined in Annex A of ITU-T Rec. H.264|ISO/IEC 14496-10 or AVC video sub-bit stream" are discarded within the transport stream decoder. FIG. 28 gives an illustration of a specific embodiment.

In case 2 the transport layer decoder uses the following behavior:

Packets from base and enhancement layers are extracted from the transport layer and input into the single-standard multi-layer video decoder in a format specified in the video coding standard.

Figure 29:
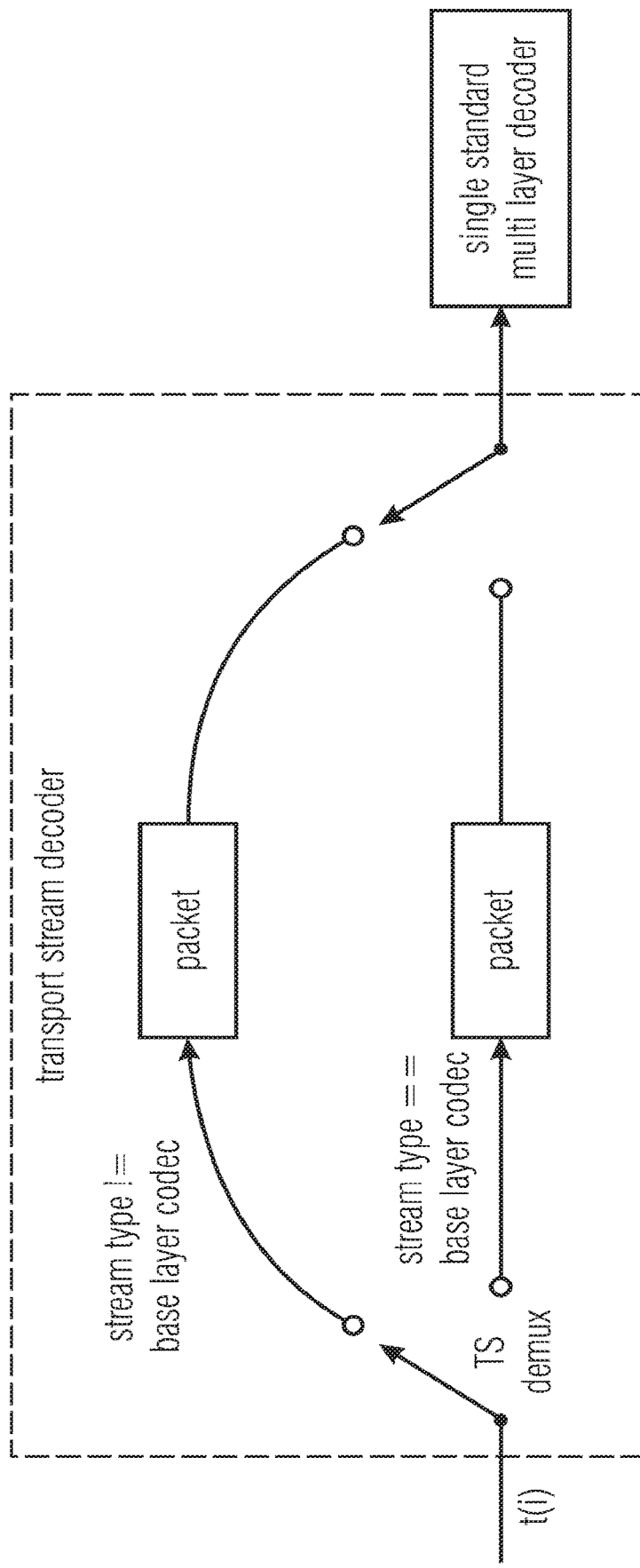
FIG. 29 shows a block diagram of a transport stream decoder interfacing a single standard multi-layer decoder, illustrating the transport stream decoder's behavior in accordance with an embodiment.

A specific embodiment could extract H.264/AVC NAL units from an MPEG-2 transport stream by selecting the base layer stream that has the stream type "AVC video stream conforming to one or more profiles defined in Annex A of ITU-T Rec. H.264|ISO/IEC 14496-10 or AVC video sub-bit stream" assigned and also one or more enhancement layer streams that have the stream type "SVC video sub-bit stream of an AVC video stream conforming to one or more profiles defined in Annex G of ITU-T Rec. H.264|ISO/IEC 14496-10" assigned. The NAL units of the different layer are multiplexed into the byte stream format defined in Annex B of the H.264/AVC specification and input into the H.264/AVC SVC video decoder. FIG. 29 gives an illustration of a specific embodiment.

In case 3 the transport layer decoder uses the following behavior:

Packets from base and enhancement layers are extracted from the transport layer. These packets are handed to the multi-standard multi-layer video decoder in one of the ways described in the following section.

Interface A

If the enhancement layer standard packet format allows carrying base layer packets, the base layer packets are encapsulated in the enhancement layer format. This means a header is added to each base layer packet that can be understood by the enhancement layer standard video decoder and which allows the enhancement layer video decoder to identify the package as base layer of a different video coding standard.

Figure 30:
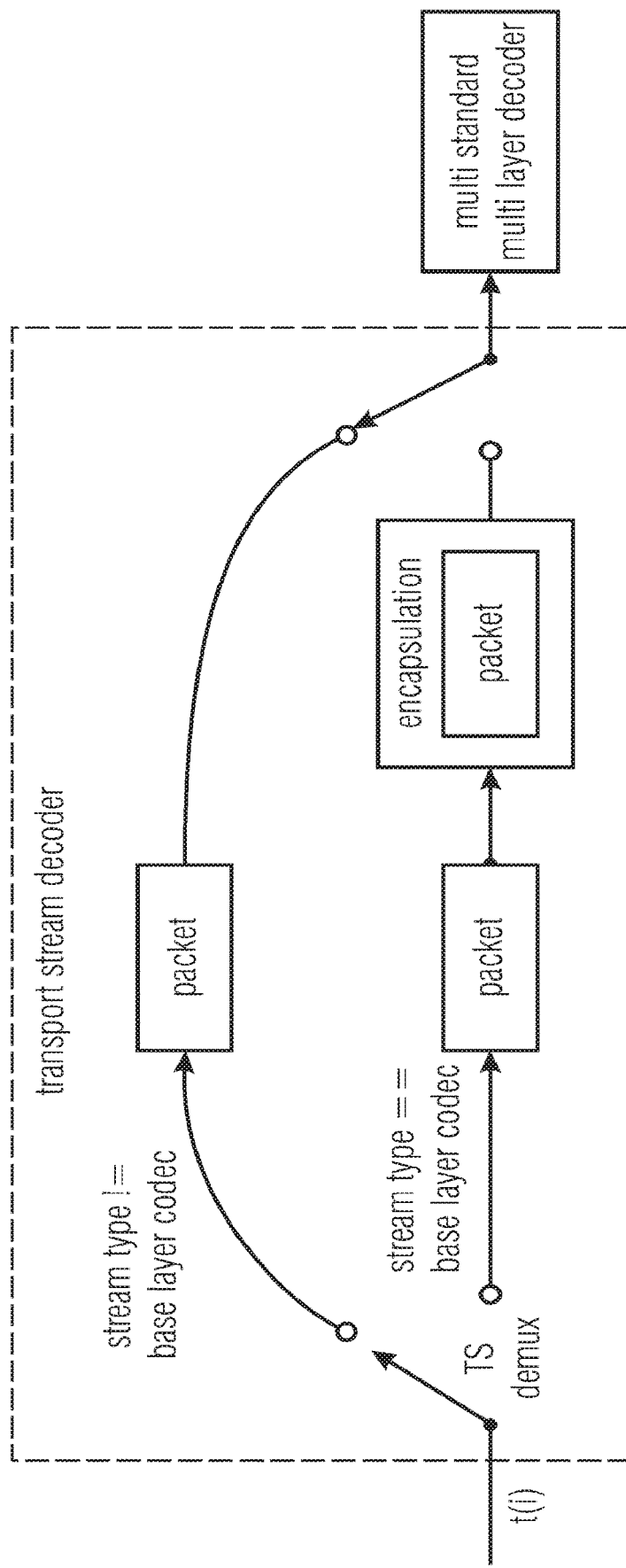
FIG. 30 shows a transport stream decoder interfacing a multi-standard multi-layer decoder and the transport stream decoder's behavior in accordance with an embodiment.

In a specific embodiment of the invention the H.264/AVC NAL unit is used as payload of an HEVC NAL unit, i.e. an HEVC NAL unit header is added in front of the H.264/AVC NAL unit header. A field in the HEVC NAL unit header (e.g. nal_unit_type) is used to identify the payload as NAL unit of H.264/AVC. The bitstream can be input into the video decoder in HEVC Annex B byte stream format. FIG. 30 gives an illustration of a specific embodiment.

Interface B

A different channel is used for each layer of the scalable bitstream. The video coding standard is determined in the decoder by the channel selection.

In a specific embodiment of the invention for two layers are handed over in two separate channels. The first channel is used only for H.264/AVC base layer packets (or Annex B byte stream) while the second channel is used only for HEVC enhancement layer packets.

Interface C

A metadata field indicating the type of the video coding standard is associated with each packet passed from the transport stream decoder to the multi-standard multi-layer video decoder. Other metadata, like e.g. timing can be signaled in the same way.

In a specific embodiment, each base layer NAL unit is identified as H.264/AVC NAL unit by the associated metadata field and each enhancement layer NAL unit is identified as HEVC NAL unit by the associated metadata field.

Thus, the concept of the fifth aspect may be described as a "Multi-Standard Multi-Layer Video Decoder Interface" providing possibilities as to how to combine bitstreams of different codecs.

Figures 43, 44:
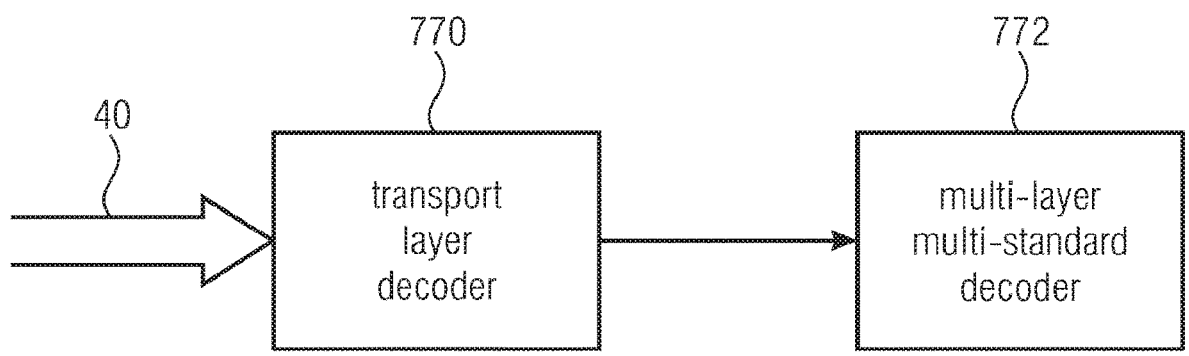
FIG. 43 shows a syntax example according to which the embodiments of FIGS. 16 and 35 could be signaled at another portion of the multi-layer data stream.
FIG. 44 shows a schematic block diagram of a transport layer decoder interfacing to a multi-layer multi-standard decoder in accordance with an embodiment.

Thus, in accordance with the fifth aspect of the present application, a transport layer decoder may be configured as outlined in the following with respect to FIG. 44. The transport layer decoder shown in FIG. 44 is generally indicated using reference sign 770. The transport layer decoder 770 is configured to subject an inbound multi-layer video data stream 40 into which a scene is coded in layers, to decoding by a multi-standard multi-layer decoder 772 with which the transport layer decoders 770 output interface is connected. The multi-layer video data stream 40 is composed NAL units as was already outlined above with respect to the various other aspects of the present application, which description shall be transferrable onto the embodiment of Fig. Each of the NAL units is associated with one of the layers. The layers are associated with different codecs, i.e. with different standards. For each layer, the NAL units associated with the respective layer are coded using the same codec, namely the one with which the respective layer is associated.

The transport layer decoder 770 is configured to identify, for each NAL unit, which codec same is associated with, and handover the NAL units of the multi-layer video data stream 40 to the multi-standard multi-layer decoder which uses inter-layer prediction between layers associated with different codecs to decode the multi-layer video data stream.

As mentioned above, each NAL unit may be associated with one of the layers of the multi-layer video data stream 40 by way of a certain layer indicator field as already outlined above with respect to the fourth aspect of the present application. Some, or most, of the NAL units may carry content related data, namely one or more slices. By collecting all NAL units concerning a certain set of layers, the video content or scene coded into data stream 40 may be decoded by decoder 772 at an information amount conferred by this set of layers. With regard to the layer dependency, the option of having more than one scalability dimension and so forth, reference is made to the description of the fourth aspect of the present application.

The multi-layer multi-standard decoder 772 is able to handle different codecs/standards. Examples for different standards have been presented above, i.e. H.264, HEVC, but other standards may mixed up as well. The different codecs/standards are not restricted to hybrid codecs. Rather, a mixture of different kinds of codecs may be used as well. The inter-layer prediction used by the multi-layer multi-standard decoder 772 may relate to prediction parameters used in the different layers, or may refer to the picture samples of the various time-aligned layers. This has already been described above with respect to the other aspects and embodiments.

The transport layer decoder 770 may be configured to perform the handing over of NAL units belonging to layers of codecs which the multi-layer multi-standard decoder 772 is able to cope with, only. That is, the handing over performed by the transport layer decoder 770 may depend on the transport layer decoder's 770 identification of the codec to which each NAL unit is associated. In particular, the transport layer decoder 770 may perform the following for each NAL unit:

Identify the layer which the NAL unit currently inspected is associated with by inspecting, for example, the layer indicator field in the NAL unit's NAL unit header.

Based on an association between the layers of data stream 40 on the one hand and the codecs/standards of which same are, which association is derived by the transport layer decoder 770 based on an inspection of respective high level syntax of data stream 40, the transport layer decoder 40 determines whether the currently inspected NAL unit fulfills two criteria: the NAL unit layer belongs to the subset of layers to be forwarded to decoder 772, which subset is determined by the currently inspected NAL units layers operational point in scalability space and an external prescription as to which operational points within the scalability space are allowed to be forwarded to the multi-layer multi-standard decoder 772 and which are not. Further, the transport layer decoder 770 checks whether the currently inspected NAL units layers codec belongs to the set of codecs/standards which the multi-layer multi-standard decoder 772 is able to deal with.

If the check reveals that both criteria are fulfilled by the currently inspected NAL unit, then the transport layer decoder 770 forwards the current NAL unit to decoder 772 for being decoded.

Different possibilities exist for transport layer decoder 770, to determine the above mentioned association between layers contained in data stream 40 on the one hand the codecs/standards underlying the same on the other hand. For example, as discussed above with respect to "interface B", different channels may be used in order to convey the data stream 40, namely NAL units of layers of one codec/standard on one channel, and NAL units of layers coded in accordance with another codec/standard on another channel. By this measure, the transport layer decoder 770 is able to derive the just-mentioned association between layers on the one hand and codecs/standards on the other hand by distinguishing between the various channels. For example, the transport layer decoder 770 determines, for each NAL unit of data stream 40, the channel on which the respective NAL unit arrives so as to identify the codec/standard with which the respective NAL unit or the respective NAL unit's layer is associated.

Additionally or alternatively, the transport layer decoder 770 may forward NAL units of layers belonging to different codec/standards to the multi-layer multi-standard decoder 772 in a manner depending on the respective codecs/standards so that NAL units of layers belonging to one codec/standard are transmitted on one channel to decoder 772, and NAL unit of layers of a different codec/standard are forwarded to multi-layer multi-standard decoder 772, on another channel.

The "different channels" may be provided by the underlying transport layer. That is, the distinguishing between different channels may be realized by distinguishing between different channel identifiers as provided by the underlying transport layer, which is not shown in FIG. 44 for ease of understanding.

Another possibility of handing over the data stream 40 to multi-layer multi-standard decoder 772 would be that transport layer decoder 770 encapsulates those NAL units having been identified as being associated with a layer which is associated with any codec different from a predetermined codec, using NAL unit headers of the predetermined codec having a NAL unit type indicator set to a state indicating the codec of the respective layer. This means the following: the predetermined codec may be, for example, any codec of any enhancement layer of data stream 40. The base layer codec, for example, i.e. the codec associated with the base layer of data stream 40, may be different from the predetermined codec which is, for example, HEVC. Accordingly, transport layer decoder 770 may turn data stream 40 into a data stream conforming to the predetermined codec when passing on the same to multi-layer multi-standard decoder 772. To this end, the transport layer decoder 770 encapsulates each NAL unit belonging to a layer not coded using a predetermined codec, using NAL unit headers of the predetermine codec and sets a NAL unit type indicator within that NAL unit header, to a state indicating a codec of the respective actual layer. For example, base layer NAL units are, for example, of H.264 and NAL units of the base layer would, accordingly, be encapsulated using HEVC and NAL unit headers having the NAL unit type indicator set to a state indicating H.264. The multi-layer multi-standard 772 would accordingly receive an HEVC conforming data stream.

Naturally, as described with respect to interface C, it would be alternatively possible that transport layer decoder 770 provides each NAL unit of the inbound data stream 40 with metadata indicating the codec with which the layer associated with the respective NAL unit is associated. The data stream's 40 NAL units would accordingly be forwarded to decoder 772 in a thus extended manner.

Using the alternatives just described, it is feasible to extend a content encoded into a data stream by further layers which, however, are coded using another codec such as, for example, a newer codec, and the existing part of the codec 40 does not need to be amended. Multi-layer multi-standard decoders in turn, which are able to deal with the newer codec, i.e. the newly added one, are able to treat such mixtures of existing data streams with layers coded using the newer codec.

Thus, parallel/low delay video coding concepts for HEVC scalable bitstreams were presented above.

The High Efficiency Video Coding (HEVC) standard [1] initially features two dedicated parallelization tools that allow parallel processing on encoder and decoder side: tiles and wavefront parallel processing (WPP). These tools allow parallelization within a picture that target processing time improvements while minimizing coding efficiency loss when compared to HEVC coded video that does not feature parallel processing within individual pictures.

In a scalable [2] or multiview [3] HEVC bitstream, a decoded base layer or base view picture is used to predict the enhancement layer or dependent view picture. In the above description, the term layer was used to also cover the concept of views simultaneously.

The above embodiments described a scalable video decoder that can start decoding of an enhancement layer picture before the decoding of the associated base layer picture has been finalized. Picture area decoding is pipelined based on high level parallelization tools that are used in each layer. Base and enhancement layer decoder can operate in parallel to each other and also in parallel within the actual layer. The amount of parallelism within each layer can differ between base and enhancement layers. Further, a signaling was described that is necessitated to properly set up a parallel decoding environment for a specific bitstream.

As a general note the following is noted: the above embodiments described decoders and correspondingly designed encoders in accordance with various aspects. As far as all these aspects are concerned, it is noted that they may all have in common that decoder and encoder support WPP and/or tile parallel processing and accordingly wherever details thereabout are described, these details shall be treated as concurrently applying to any of the other aspects and their correspond descriptions so as to either lead to new embodiments of these other aspects, or complement the descriptions of embodiments of these other aspects—irrespective as to whether the respective aspect onto which a respective description is be transferred, has been described using terms "portions", "spatial segments" or the like instead of tiles/substreams for more generally denoting parallel processable segments of a picture. The same applies to details regarding coding/prediction parameters and descriptions setting out possible ways of subdividing the pictures: all aspects may be implemented so as to result in decoders/encoders which use a subdivisioning into LCUs/CTBs with determining tiles and/or susbtreams in units of the same. Additionally, in any of these aspects, the LCUs/CTBs may further be subdivided into coding blocks by use of recursive multi-tree subdivision as described above with respect to a subset of the aspects and their embodiments. And additionally or alternatively, the slice concept may be adopted by embodiments of all aspects, from those aspects with respect to which the relation between slices and substreams/tiles has been described.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Thus, the following aspects have been discussed above:

A first aspect concerns a video decoder for decoding a multi-layer video data stream 40 into which a scene is coded in a hierarchy of layers using inter-layer prediction from a first layer to a second layer, the video decoder supporting parallel decoding the multi-layer video data stream in spatial segments 80 into which pictures 12, 15 of the layers are sub-divided, wherein the decoder is configured to inspect a long-term syntax element structure (606; e.g. tile_boundaries_aligned_flag) of the multi-layer video data stream so as to interpret the long-term syntax element structure assuming a value out of a first possible-values-set (e.g. tile_boundaries_aligned_flag=1), as a guarantee that, during a predetermined time period 608, the pictures 15 of the second layer are subdivided so that borders between the spatial segments of the pictures of the second layer overlay every border of the spatial segments of the pictures 12 of the first layer and periodically determine, in time intervals 604 smaller than the predetermined time period, the subdivision of the pictures of the first layer and the second layer into the spatial segments based on short-term syntax elements (602; e.g. column_width_minus1[i] and column_width_minus1[i]) of the multi-layer video data stream, and if the long-term syntax element structure has assumed a value out of a second possible-values-set (e.g. tile_boundaries_aligned_flag=0), periodically determine, in the time intervals smaller than the predetermined time period, the subdivision of the pictures of the layers into the spatial segments from the short-term syntax elements of the multi-layer video data stream such that, at least for a first possible value of the short-term syntax elements, there exists a border between the spatial segments of the pictures of the second layer not overlaying any of the borders of the spatial segments of the first layer, and, at least for a second possible value of the short-term syntax elements, borders between the spatial segments of the pictures of the second layer overlay every border of the spatial segments of the first layer.

A second aspect concerns the video decoder according to aspect 1, wherein the video decoder is configured to decode the pictures of the layers using intra-picture spatial prediction with disrupting the intra-picture spatial prediction for each spatial segment at a boundary of the respective spatial segment; or decode the pictures of the layers using intra-picture spatial prediction by decoding the spatial segments of a picture of the first layer in parallel with supporting the intra-picture spatial prediction crossing boundaries of the spatial segments of the picture of the first layer and obeying a decoding delay between the decoding of the spatial segments of the picture of the first layer, and by decoding the spatial segments of a picture of the second layer in parallel with supporting the intra-picture spatial prediction crossing boundaries of the spatial segments of the picture of the second layer and obeying a decoding delay between the decoding of the spatial segments of the picture of the second layer.

A third aspect concerns the video decoder according to aspect 1 or 2, supporting tile parallel decoding the multi-layer video data stream in tiles into which pictures of the layers are sub-divided, wherein the decoder is configured to interpret the long-term syntax element assuming the value out of the first possible-values-set, as a guarantee that, during a predetermined time period, the pictures of the second layer are subdivided so that borders between the tiles of the pictures of the second layer overlay every border of the tiles of the first layer and periodically determine, in time intervals smaller than the predetermined time period, a tile refinement of a subdivision of the pictures of the second layer relative to the first layer based on the short-term syntax elements, and if the long-term syntax element has assumed the value out of the second possible-values-set, periodically determine, in time intervals smaller than the predetermined time period, the subdivision of the pictures of the layers into the tiles from the short-term syntax elements of the multi-layer video data stream such that, at least for a first possible value of the short-term syntax elements, there exists a border between the tiles of the pictures of the second layer not overlaying any of the borders of the tiles of the first layer, and, at least for a second possible value of the short-term syntax elements, borders between the tiles of the pictures of the second layer overlay every border of the tiles of the first layer.

A fourth aspect concerns the video decoder according to aspect 3, wherein the video decoder is configured to decode the pictures of the layers using intra-picture spatial prediction with disrupting the intra-picture spatial prediction for each tile at a boundary of the respective tile.

A fifth aspect concerns the video decoder according to aspect 1 or 2, wherein the decoder is configured to interpret the long-term syntax element structure assuming a value out of a first possible-values-set, as a guarantee that, during a predetermined time period, the pictures of the second layer are subdivided so that each spatial segment of the pictures of the first layer is made up of exactly n spatial segments of the pictures of second layer with n depending on the value of the long-term syntax element structure, and if the long-term syntax element is set to a value of a second possible-values-set, periodically determine, in time intervals smaller than the predetermined time period, the inter-layer offset within the predetermined period based on the short-term syntax elements of the of the multi-layer video data stream.

A sixth aspect concerns the video decoder according to aspect 1 or 2, wherein the decoder is configured to decide on commencing or not commencing a trial to decode the second layer of the multi-layer video data stream depending on the long-term syntax element structure assuming the value out of the first possible-values or not.

A seventh aspect concerns the video decoder according to any of aspects 1 to 6, wherein the video decoder is a hybrid video decoder.

An eighth aspect concerns a video encoder for encoding a scene into a multi-layer video data stream in a hierarchy of layers using inter-layer prediction from a first layer to a second layer so that the multi-layer video data stream is decodable in parallel in spatial segments into which pictures of the layers are sub-divided, wherein the encoder is configured to insert a long-term syntax element structure 606 and short-term syntax elements 602 into the multi-layer video data stream, the short-term syntax elements defining, in time intervals, the subdivision of the pictures of the first layer and the second layer into the spatial segments, and switch between setting the long-term syntax element structure to
- a value out of a first possible-values-set with, during a predetermined time period 608 greater than the time intervals, setting the short-term syntax elements to a proper subset out of a set of possible settings, the proper subset being chosen so that, during the predetermined time period, the pictures of the second layer are subdivided so that borders between the spatial segments of the pictures of the second layer overlay every border of the spatial segments of the first layer, or
- a value out of a second possible-values-set with, during the predetermined time period, setting the short-term syntax elements to any of the set of possible settings, the set of possible settings encompassing at least one setting according to which a border exists between the spatial segments of the pictures of the second layer not overlaying any of the borders of the spatial segments of the first layer, and at least another setting according to which borders between the spatial segments of the pictures of the second layer overlay every border of the spatial segments of the first layer.

A ninth aspect concerns the video encoder according to aspect 8, wherein the video encoder is configured to encode the pictures of the layers using intra-picture spatial prediction with disrupting the intra-picture spatial prediction for each spatial segment at a boundary of the respective spatial segment; or encode the pictures of the layers using intra-picture spatial prediction and entropy encoding with adapting entropy context probabilities, by supporting the intra-picture spatial prediction crossing boundaries of the spatial segments of a picture of the first layer and initializing the entropy context probabilities for the entropy encoding of the subsets of the spatial segments of the picture of the first layer individually or under adopting the entropy context probabilities of a, in accordance with an order among the subsets, previous subset of the spatial segments of the picture of the first layer at an intermediately adapted state, and by supporting the intra-picture spatial prediction crossing boundaries of the spatial segments of a picture of the second layer and initializing the entropy context probabilities for the entropy encoding of the subsets of the spatial segments of the picture of the second layer individually or under adopting the entropy context probabilities of a, in accordance with an order among the subsets, previous subset of the spatial segments of the picture of the second layer at an intermediately adapted state.

A tenth aspect concerns the video encoder according to aspect 8 or 9, wherein the spatial segments are tiles and the encoder is configured to if setting the long-term syntax element structure to
- a value out of the first possible-values-set (tile_boundaries_aligned_flag=1), set, during a predetermined time period greater than the time intervals, the short-term syntax elements to a proper subset out of a set of possible settings, the proper subset being chosen so that, during the predetermined time period, the second layer's pictures' subdivision into tiles coincides or refines the first layer's pictures' subdivision into tiles, or
- a value out of a second possible-values-set (tile_boundaries_aligned_flag=0), set, during the predetermined time period, the short-term syntax elements to any of the set of possible settings such that the short-term syntax elements are, at least for one time interval during the predetermined time period, set to a first possible value of the set of possible settings, according to which there exists a border between the tiles of the pictures of the second layer not overlaying any of the borders of the tiles of the first layer, and, at least for another time interval during the predetermined time period, set to a second possible value of the set of possible settings, according to which borders between the tiles of the pictures of the second layer overlay every border of the tiles of the first layer.

An eleventh aspect concerns the video encoder according to aspect 10, wherein the video encoder is configured to encode the pictures of the layers using intra-picture spatial prediction with disrupting the intra-picture spatial prediction for each tile at a boundary of the respective tile.

A twelfth aspect concerns the video encoder according to aspect 8 or 9, wherein the encoder is configured to if setting the long-term syntax element structure to
- a value out of the first possible-values-set, setting using the predetermined time period greater than the time intervals, the short-term syntax elements to a proper subset out of a set of possible settings, the proper subset being chosen so that, during the predetermined time period, each spatial segment of the pictures of the first layer is made up of exactly n spatial segments of the pictures of second layer with n depending on the value of the long-term syntax element structure.

A thirteenth aspect concerns a decoder for decoding a spatially scalable bitstream 40 into which a picture is coded in different spatial layers and, for at least one of the spatial layers, in first spatial segments, wherein the decoder is configured to upsample a picture 12 of a first spatial layer so as to obtain an upsampled reference picture and predict a picture 15 of a second spatial layer using the upsampled reference picture, wherein the decoder is responsive to a syntax element (616; e.g., independent_tile_upsampling_idc) in the spatially scalable bitstream so as to, depending on the syntax element, interpolate 620 the picture of the first spatial layer such that any partition of a partitioning 622 of the upsampled reference picture, which depends on the first spatial segments, is independent from portions of the picture of the first spatial layer covered by any of the other partitions of the partitioning, or such that any partition of the partitioning 622 of the upsampled reference picture is dependent on portions of the picture of the first spatial layer covered by another partition of the partitioning spatially neighbouring the respective partition.

A fourteenth aspect concerns the decoder according to aspect 13, wherein the decoder is configured to decode the different spatial layers in parallel.

A fifteenth aspect concerns the decoder according to aspect 13 or 14, wherein the decoder is responsive to the syntax element 616 in the spatially scalable bitstream so as to, depending on the syntax element, interpolate 620 the picture of the first spatial layer such that any portion of the upsampled reference picture spatially covered by any of the first spatial segments, is independent from portions of the picture of the first spatial layer covered by any other of the first spatial segments, or such that any portion of the upsampled reference picture spatially covered by any of the first spatial segments, is dependent on portions of the picture of the first spatial layer covered by any other spatial segment of the first spatial segments, neighbouring the respective spatial segment.

A sixteenth aspect concerns the decoder according to any of aspects 13 to 15, wherein the spatially scalable bitstream has the picture of the second spatial layer coded thereinto in the first spatial segments.

A seventeenth aspect concerns the decoder according to any of aspects 13 to 16, wherein the decoder is configured to perform the decoding using intra-picture spatial prediction with disrupting the intra-picture spatial prediction for each first spatial segment at a boundary of the respective first spatial segment or with supporting the intra-picture spatial prediction crossing boundaries of the first spatial segments, entropy decoding each first spatial segment using an adaptation of entropy context probabilities and initializing the entropy context probabilities of the first spatial segments independent from any other first spatial segment or under adopting the entropy context probabilities of a, in accordance with an order among the first spatial segments, previous first spatial segment as adapted up to an intermediate position of the previous first spatial segment.

An eighteenth aspect concerns the decoder according to aspect 13 or 14, wherein the spatially scalable bitstream has the picture of the first spatial layer coded thereinto in the first spatial segments, wherein the spatially scalable bitstream has the picture of the second spatial layer coded thereinto in second spatial segments, wherein the decoder is responsive to the syntax element 606 in the spatially scalable bitstream so as to, depending on the syntax element, interpolate the picture of the first spatial layer (e.g., independent_tile_upsampling_idc=2) such that any portion of the upsampled reference picture spatially covered by any of the second tiles, is independent from portions of the picture of the first spatial layer spatially covered by any other of the second tiles, or (e.g., independent_tile_upsampling_idc=1) such that any partition of the upsampled reference picture spatially confined by spatially co-located boundaries of the first and second tiles is independent from portions of the picture of the first spatial layer covered by any other partition of the upsampled reference picture, spatially confined by spatially co-located boundaries of the first and second tiles, or (e.g., independent_tile_upsampling_idc=0) such that any portion of the upsampled reference picture spatially covered by any of the second tiles, is dependent on portions of the picture of the first spatial layer covered by any other second tile neighbouring the respective tile.

A nineteenth aspect concerns the decoder according to any of aspects 13 to 18, wherein the decoder is configured to, in order to achieve the independence, fill fragments of a filter kernel used in the interpolation of the picture of the first spatial layer, which protrude into any such portion of the picture of the first spatial layer, covered by any of the other partitions of the partitioning, using a fallback rule according to which the fragments are filled independent from the respective portion of the picture of the first spatial layer into which the filter kernel protrudes.

A twentieth aspect concerns the decoder according to aspect 19, wherein the decoder is configured to use the fallback rule also in filling fragments of the filter kernel protruding an outer boundary of the picture of the first spatial layer.

A twenty-first aspect concerns the decoder according to any of aspects 13 to 20, wherein the decoder is a video decoder and configured to by responsive to the syntax element 606 in the spatially scalable bitstream on a per-picture or per-picture-sequence basis.

A twenty-second aspect concerns the decoder according to any of aspects 13 to 21, wherein the spatially scalable bitstream has the picture of the first spatial layer coded thereinto in the first spatial segments, wherein the spatially scalable bitstream has the picture of the second spatial layer coded thereinto in second spatial segments, wherein the partitioning's borders either correspond to a logical AND of a spatial overlay of borders of the first and second spatial segments or the borders of the second spatial segments, wherein the decoder is responsive to the syntax element 606 in the spatially scalable bitstream so as to, depending on the syntax element, fill fragments of a filter kernel used in the interpolation of the picture of the first spatial layer, which protrude from one partition into a neighboring partition of the partitioning using a fallback rule according to which the fragments are filled independent from the respective portion of the picture of the first spatial layer into which the filter kernel protrudes, or using the respective portion of the picture of the first spatial layer into which the filter kernel protrudes.

A twenty-third aspect concerns the decoder according to any of aspects 13 to 22, wherein the decoder is configured to decode the first and second layers in parallel using an inter-layer offset being dependent on the syntax element 606.

A twenty-fourth aspect concerns the decoder according to aspect 13 or 23, wherein the decoder is configured to place the partitioning's borders so as to correspond to the logical AND of a spatial overlay of borders of the first and second spatial segments or the borders of the second spatial segments, depending on the syntax element.

A twenty-fifth aspect concerns an encoder for encoding a picture into a spatially scalable bitstream in different spatial layers and, for at least one of the spatial layers, in first spatial segments, wherein the encoder is configured to upsample a picture of a first spatial layer so as to obtain an upsampled reference picture and predict a picture of a second spatial layer using the upsampled reference picture, wherein the encoder is configured to set and insert a syntax element 606 into the spatially scalable bitstream and, depending on the syntax element, interpolate the picture of the first spatial layer such that any partition of a partitioning of the upsampled reference picture, which depends on the first spatial segments, is independent from portions of the picture of the first spatial layer covered by any of the other partitions of the partitioning, or such that any partition of the partitioning of the upsampled reference picture is dependent on portions of the picture of the first spatial layer covered by another partition of the partitioning spatially neighbouring the respective partition.

A twenty-sixth aspect concerns the encoder according to aspect 25, wherein the encoder is configured to set and insert the syntax element into the spatially scalable bitstream and to, depending on the syntax element, interpolate the picture of the first spatial layer such that any portion of the upsampled reference picture spatially covered by any of the first spatial segments, is independent from portions of the picture of the first spatial layer covered by any other of the first spatial segments, or such that any portion of the upsampled reference picture spatially covered by any of the first spatial segments, is dependent on portions of the picture of the first spatial layer covered by any other spatial segment of the first spatial segments, neighbouring the respective first spatial segment.

A twenty-seventh aspect concerns the encoder according to aspect 25 or 26, wherein the encoder is configured to encode the picture of the first spatial layer thereinto the spatially scalable bitstream in the first spatial segments.

A twenty-eighth aspect concerns the encoder according to aspect 27, wherein the encoder is configured to encode the picture of the first spatial layers using intra-picture spatial prediction with disrupting the intra-picture spatial prediction for each first spatial segment at a boundary of the respective first spatial segment.

A twenty-ninth aspect concerns the encoder according to aspect 27 or 28, wherein the encoder is configured to the picture of the second spatial layer coded into the spatially scalable bitstream in second spatial segments, wherein the encoder is configured to set and insert the syntax element into the spatially scalable bitstream and, depending on the syntax element, interpolate the picture of the first spatial layer such that any portion of the upsampled reference picture spatially covered by any of the second spatial segments, is independent from portions of the picture of the first spatial layer spatially covered by any other of the second spatial segments, or such that any partition of the upsampled reference picture spatially confined by spatially co-located boundaries of the first and second spatial segments is independent from portions of the picture of the first spatial layer covered by any other partition of the upsampled reference picture, spatially confined by spatially co-located boundaries of the first and second spatial segments, or such that any portion of the upsampled reference picture spatially covered by any of the second spatial segments, is dependent on portions of the picture of the first spatial layer covered by any other second spatial segment neighbouring the respective spatial segment.

A thirtieth aspect concerns the encoder according to aspect 29, wherein the encoder is configured to encode the picture of the second spatial layer using intra-picture spatial prediction with disrupting the intra-picture spatial prediction for each second spatial segment at a boundary of the respective second spatial segment.

A thirty-first aspect concerns the encoder according to any of aspects 25 to 30, wherein the encoder is configured to, in order to achieve the independence from any portion of the picture of the first spatial layer, fill fragments of a filter kernel used in the interpolation of the picture of the first spatial layer, protruding into any such portion of the picture of the first spatial layer, using a fallback rule according to which the fragments are filled independent from the respective portion of the picture of the first spatial layer into which the filter kernel protrudes.

A thirty-second aspect concerns the encoder according to aspect 31, wherein the encoder is configured to use the fallback rule also in filling fragments of the filter kernel protruding an outer boundary of the picture of the first spatial layer.

A thirty-third aspect concerns the encoder according to any of aspects 25 to 32, wherein the encoder is a video encoder and configured to set and insert the syntax element into the spatially scalable bitstream on a per-picture or per-picture-sequence basis.

A thirty-fourth aspect concerns a video decoder for decoding a multi-layer video data stream into which a scene is coded in a hierarchy of layers using inter-layer prediction from a first layer to a second layer, the video decoder supporting parallel decoding the multi-layer video data stream in spatial segments into which pictures of the layers are partitioned by sequentially traversing the spatial segments in a temporally overlapping manner with an inter-layer delay between the traversal of spatial segments of pictures of the first layer relative to the traversal of spatial segments of pictures of the second layer, the video decoder configured to inspect a long-term syntax element structure (e.g. min_spatial_segment_delay) of the multi-layer video data stream so as to if the long-term syntax element structure (e.g. min_spatial_segment_delay; ≠0) is set to a value of a first set of possible values, use the value of the long-term syntax element to determine the inter-layer offset in advance for a predetermined time period and periodically determine, in time intervals smaller than the predetermined time period, sizes and locations of the spatial segments of the pictures of the first layer and the spatial segments of the pictures of the second layer, and spatial sampling resolutions of the pictures of the first layer and the pictures of the second layer, respectively, based on short-term syntax elements 602 of the of the multi-layer video data stream;

if the long-term syntax element is set to a value of a second set (e.g. min_spatial_segment_delay=0) of possible values disjoint to the first set of possible values, periodically determine, in time intervals smaller than the predetermined time period, the inter-layer offset within the predetermined period based on the short-term syntax elements of the of the multi-layer video data stream.

A thirty-fifth aspect concerns the video decoder of aspect 34, wherein the video decoder is configured to, in parallel, decode the multi-layer video data stream in sub-streams out of which pictures of the layers are partitioned and which are composed of rows of blocks into which the pictures of the layers are regularly sub-divided, using wavefront parallel processing by sequentially traversing the substreams in a temporally overlapping manner with an intra-picture inter-substream delay between the traversal of immediately consecutive substreams of the same picture and the inter-layer offset between the traversal of substreams of pictures of the first layer relative to the traversal of substreams of pictures of the second layer.

A thirty-sixth aspect concerns the video decoder according to aspect 35, wherein the video decoder is configured to decode the sub-streams in parallel with supporting intra-picture spatial prediction crossing boundaries of the sub-streams.

A thirty-seventh aspect concerns the video decoder of aspect 34, wherein the video decoder is configured to decode the multi-layer video data stream in tiles out of which pictures of the layers are partitioned, with traversing the tiles at a tile order among the tiles within each of the pictures of the first and second layers and decoding immediately succeeding tiles of pictures of the first layer and immediately succeeding tiles of pictures of the second layer in parallel with the inter-layer offset between the traversal of the tiles of the pictures of the first layer relative to the traversal of tiles of the pictures of the second layer.

A thirty-eighth aspect concerns the video decoder according to aspect 37, wherein the video decoder is configured to decode the pictures of the first and second layers using intra-picture spatial prediction with disrupting the intra-picture spatial prediction for each tile at a boundary of the respective tile.

A thirty-ninth aspect concerns the video decoder of any of aspects 34 to 38, wherein the video decoder is configured to use the value of the long-term syntax element in determining the inter-layer offset by using the value of the long-term syntax element as a measure for the inter-layer offset in units of spatial segments of the pictures of the first layer.

A fortieth aspect concerns the video decoder of any of aspects 34 to 39, wherein the video decoder is configured to use the value of the long-term syntax element in determining the inter-layer offset by using the value of the long-term syntax element as a number of spatial segments of the pictures of the first layer by which the decoding of a first spatial segment of the pictures of the second layer is to be delayed relative to commencing the decoding and traversal of the pictures of the first layer.

A forty-first aspect concerns a video encoder for encoding a scene into a multi-layer video data stream in a hierarchy of layers using inter-layer prediction from a first layer to a second layer such that the multi-layer video data stream is decodable in spatial segments into which pictures of the layers are partitioned by sequentially traversing the spatial segments in a temporally overlapping manner with an inter-layer offset between the traversal of spatial segments of pictures of the first layer relative to the traversal of spatial segments of pictures of the second layer, the video encoder configured to Insert and set a long-term syntax element structure (min_spatial_segment_delay) and short-term syntax elements into the multi-layer video data stream, the short-term syntax elements of the of the multi-layer video data stream defining, in a periodical basis, in time intervals, sizes and locations of the spatial segments of the pictures of the first layer and the spatial segments of the pictures of the second layer, and spatial sampling resolutions of the pictures of the first layer and the pictures of the second layer, respectively, wherein the encoder is configured to switch between setting the long-term syntax element structure (min_spatial_segment_delay≠0) to a value of a first set of possible values, with the value signaling the inter-layer offset for a predetermined time period greater than the time intervals, with, for the predetermined time period, setting the short-term syntax elements to a proper subset out of a set of possible settings, the proper subset being chosen so that, during the predetermined time period, the sizes and the locations of the spatial segments of the pictures of the first layer and the spatial segments of the pictures of the second layer, and the spatial sampling resolutions of the pictures of the first layer and the pictures of the second layer, respectively, enable decoding the multi-layer video data stream by sequentially traversing the spatial segments in the temporally overlapping manner with an actual inter-layer offset which is smaller than or equal to the inter-layer offset signaled by the long-term syntax element, between the traversal of spatial segments of pictures of the first layer relative to the traversal of spatial segments of pictures of the second layer;

the long-term syntax element to a value of a second set (min_spatial_segment_delay=0) of possible values disjoint to the first set of possible values, with, during the predetermined time period, setting the short-term syntax elements to any of the set of possible settings, the set of possible settings encompassing at least one setting according to which the sizes and the locations of the spatial segments of the pictures of the first layer and the spatial segments of the pictures of the second layer, and the spatial sampling resolutions of the pictures of the first layer and the pictures of the second layer, respectively, disable decoding the multi-layer video data stream by sequentially traversing the spatial segments in the temporally overlapping manner with an actual inter-layer offset which is smaller than or equal to the inter-layer offset signaled by the long-term syntax element, between the traversal of spatial segments of pictures of the first layer relative to the traversal of spatial segments of pictures of the second layer, and at least another setting according to which the sizes and the locations of the spatial segments of the pictures of the first layer and the spatial segments of the pictures of the second layer, and the spatial sampling resolutions of the pictures of the first layer and the pictures of the second layer, respectively, enable decoding the multi-layer video data stream by sequentially traversing the spatial segments in the temporally overlapping manner with an actual inter-layer offset which is smaller than or equal to the inter-layer offset signaled by the long-term syntax element, between the traversal of spatial segments of pictures of the first layer relative to the traversal of spatial segments of pictures of the second layer.

A forty-second aspect concerns the video encoder of aspect 41, wherein the video encoder is configured perform the encoding such that the spatial segments are substreams out of which pictures of the layers are partitioned and which are composed of rows of blocks into which the pictures of the layers are regularly sub-divided, in a manner allowing, in parallel, decoding the multi-layer video data stream in the sub-streams using wavefront parallel processing by sequentially traversing the substreams in a temporally overlapping manner with an intra-picture inter-substream delay between the traversal of immediately consecutive substreams of the same picture and the inter-layer offset between the traversal of substreams of pictures of the first layer relative to the traversal of substreams of pictures of the second layer.

A forty-third aspect concerns the video encoder according to aspect 42, wherein the video encoder is configured to encode the sub-streams using intra-picture spatial prediction and entropy encoding with adapting entropy context probabilities, by supporting the intra-picture spatial prediction crossing boundaries of the sub-streams and initializing the entropy context probabilities for entropy encoding the substreams individually or under adopting the entropy context probabilities of a, in accordance with an order among the substreams, previous substream at an intermediately adapted state.

A forty-fourth aspect concerns the video encoder of aspect 41, wherein the video encoder is configured perform the encoding such that the spatial segments are tiles out of which pictures of the layers are partitioned, in a manner allowing decoding the multi-layer video data stream in the tiles by traversing the tiles at a tile order among the tiles within each of the pictures of the first and second layers and decoding immediately succeeding tiles of pictures of the first layer and immediately succeeding tiles of pictures of the second layer in parallel with the inter-layer offset between the traversal of the tiles of the pictures of the first layer relative to the traversal of tiles of the pictures of the second layer.

A forty-fifth aspect concerns the video encoder according to aspect 44, wherein the video encoder is configured to encode the pictures of the first and second layers using intra-picture spatial prediction with disrupting the intra-picture spatial prediction for each tile at a boundary of the respective tile.

A forty-sixth aspect concerns the video encoder of any of aspects 41 to 45, wherein the video encoder is configured such that the value of the long-term syntax element defines a measure for the inter-layer offset in units of spatial segments of the pictures of the first layer.

A forty-seventh aspect concerns the video decoder of any of aspects 41 to 46, wherein the video encoder is configured to set the value of the long-term syntax element so as to signal a number of spatial segments of the pictures of the first layer by which the decoding of a first spatial segment of the pictures of the second layer is to be delayed relative to commencing the decoding and traversal of the pictures of the first layer.

A forty-eighth aspect concerns a network entity for processing a multi-layer video data stream into which a scene is coded in layers so that, in each layer, the scene is coded in a different operational point of a scalability space spanned by scalability dimensions, wherein the multi-layer video data stream is composed of first NAL units each of which as associated with one of the layers, and second NAL units interspersed within the first NAL units and presenting general information on the multi-layer video data stream, the network entity being configured to inspect a type indicator field (696, e.g. dedicated_scalability_ids_flag) in the second NAL units;

if the type indicator field has a first state (e.g. dedicated_scalability_ids_flag=0), read mapping information (e.g. layer_id_in_nuh[i], dimension_id[i][j]) mapping possible values of a layer indicator field (e.g. layer_id) in the first NAL unit headers to the operational points from the second NAL units and associate the first NAL units with the operational points in the first NAL units via the layer indicator field and the mapping information;

if the type indicator field has a second state (dedicated_scalability_ids_flag=1), associate the first NAL units with the operational points by splitting the layer indicator field in the first NAL units into more than one portion and locating the operational point of the first NAL units by using the values of the portions as coordinates of a vector within the scalability space.

A forty-ninth aspect concerns the network entity according to aspect 48, wherein the network entity is configured to if the type indicator field has the second state (dedicated_scalability_ids_flag=1), associate the first NAL units with the operational points by dividing the layer indicator field in the first NAL units into the more than one portion according to a syntax element (dimension_id_len_minus1) in the second NAL units, locating the operational point of the first NAL units by using the values of the portions as coordinates of a vector within the scalability space, and semantically determining the scalability dimensions according to a further syntax element (scalability_mask) in the second NAL units.

A fiftieth aspect concerns the network entity according to aspect 48 or 49, wherein the network entity is configured to if the type indicator field has the first state (dedicated_scalability_ids_flag=0), determining number p and semantic meaning of the scalability dimensions from a further syntax element (scalability_mask) in the second NAL units and associate the possible values of the layer indicator field with the operational points by reading a list 708 of p-dimensional vectors from the second NAL units.

A fifty-first aspect concerns the network entity according to aspect 50, wherein the network entity is configured to skip reading the list from the second NAL units if the type indicator field has the second state.

A fifty-second aspect concerns the network entity according to any of aspects 49 or 51, wherein the network entity is configured to read the further syntax element from the second NAL units irrespective of the type indicator field having the first or the second state, and such that the size of the layer indicator field is the same irrespective of the type indicator field having the first or the second state.

A fifty-third aspect concerns the network entity according to any of aspects 48 or 52, wherein the network entity comprises a video decoder.

A fifty-fourth aspect concerns a video encoder for encoding a scene into a multi-layer video data stream in layers so that, in each layer, the scene is coded in a different operational point of a scalability space spanned by scalability dimensions, wherein the multi-layer video data stream is composed of first NAL units each of which as associated with one of the layers, and second NAL units interspersed within the first NAL units and presenting general information on the multi-layer video data stream, the video encoder being configured to insert a type indicator field into the second NAL units and switch between setting the type indicator field such that same has a first state, with inserting mapping information mapping possible values of a layer indicator field in the first NAL unit headers to the operational points into the second NAL units and setting the layer indicator filed in the first NAL units such that the first NAL units' operational points are associated with the respective layer indicator field via the mapping information;

the type indicator field such that same has a second state (dedicated_scalability_ids_flag=1), with setting the layer indicator field in the first NAL units by splitting the layer indicator field in the first NAL units into more than one portion and setting the more than portion so that the values of the portions correspond to coordinates of a vector within the scalability space, pointing to the operational point associated with the respective first NAL unit.

A fifty-fifth aspect concerns the video encoder according to aspect 54, wherein the video encoder is configured to when setting the type indicator field such that same has the second state, set and insert a syntax element into the second NAL units which defines as to who the layer indicator field in the first NAL units are divided into the more than one portion, and set and insert a further syntax element into the second NAL units which semantically defines the scalability dimensions.

A fifty-sixth aspect concerns a multi-layer video datastream into which a scene is coded in layers so that, in each layer, the scene is coded in a different operational point of a scalability space spanned by scalability dimensions, wherein the multi-layer video data stream is composed of first NAL units each of which as associated with one of the layers, and second NAL units interspersed within the first NAL units and presenting general information on the multi-layer video data stream, wherein a type indicator field (696, e.g. dedicated_scalability_ids_flag) is present in the second NAL units depending on which if the type indicator field has a first state (e.g. dedicated_scalability_ids_flag=0), mapping information in the second NAL units maps possible values of a layer indicator field (e.g. layer_id) in the first NAL unit headers to the operational points;

if the type indicator field has a second state (dedicated_scalability_ids_flag=1), the layer indicator field in the first NAL units is split into more than one portion with the operational point of the first NAL units being defined by the values of the portions as coordinates of a vector within the scalability space.

A fifty-seventh aspect concerns a transport layer decoder for subjecting a multi-layer video data stream into which a scene is coded in layers, to decoding by a multi-standard multi-layer decoder, wherein the multi-layer video data stream is composed of NAL units each of which is associated with one of the layers, wherein the layers are associated with different codecs so that, for each layer, the NAL units associated with the respective layer are coded using the codec with which the respective layer is associated, the transport layer decoder being configured to identify, for each NAL unit, as to which codec same is associated with, and hand over the NAL units of the multi-layer video data stream to the multi-standard multi-layer decoder which uses inter-layer prediction between layers associated with different codecs to decode the multi-layer video data stream.

A fifty-eighth aspect concerns the video decoder according to aspect 57, further configured to encapsulate NAL units having been identified as being associated with a layer which is associated with any codec different from a predetermined codec, using NAL unit headers of the predetermined codec having a NAL unit type indicator set to a state indicating the codec of the respective layer.

A fifty-ninth aspect concerns the video decoder according to aspect 57 or 58, further configured to perform the identification depending on a channel on which the NAL units arrive respectively.

A sixtieth aspect concerns the video decoder according to any of aspects 57 or 59, further configured to perform the handing over such that the NAL units associated with different codecs are handed over to the multi-standard multi-layer decoder on different channels.

A sixty-first aspect concerns the video decoder according to aspect 57 or 60, further configured to provide each NAL unit with meta data indicating the codec with which the layer associated with the respective NAL unit is associated.

A sixty-second aspect concerns a video decoder for decoding a multi-layer video data stream into which a scene is coded in a hierarchy of layers using inter-layer prediction from portions of a first layer to co-located portions of a second layer, wherein pictures of the first layer are sub-divided into an array of first blocks and pictures of the second layer are sub-divided into an array of second blocks, wherein a raster scan decoding order is defined among the first blocks and the second blocks, respectively, the video decoder configured to determine, depending on a syntax element structure (e.g., ctb_delay_enabled_flag, min_spatial_segment_delay) of the multi-layer video data stream, an inter-layer offset for parallel decoding the pictures of the first and second layers by sequentially traversing the first and second blocks in a temporally overlapping manner with the inter-layer offset between the traversal of first blocks of pictures of the first layer relative to the traversal of spatial second blocks of pictures of the second layer, measured in units of the first blocks.

A sixty-third aspect concerns the video decoder according to aspect 62, wherein the syntax element structure is a long-term syntax element structure, and the video decoder is configured to perform the determination in advance for a predetermined time period, and periodically determine, in time intervals smaller than the predetermined time period, sizes and locations of the first blocks of the pictures of the first layer and the second blocks of the pictures of the second layer, and spatial sampling resolutions of the pictures of the first layer and the pictures of the second layer, respectively, based on short-term syntax elements of the of the multi-layer video data stream.

A sixty-fourth aspect concerns the video decoder according to aspect 63, wherein the video decoder supports parallel decoding the multi-layer video data stream in spatial segments which are sequentially arranged along the raster scan decoding order, and into which pictures of the layers are partitioned, by sequentially traversing the spatial segments in a temporally overlapping manner with the inter-layer offset between the traversal of spatial segments of pictures of the first layer relative to the traversal of spatial segments of pictures of the second layer, the video decoder configured to inspect the long-term syntax element structure of the multi-layer video data stream so as to if the long-term syntax element structure (e.g., ctb_delay_enabled_flag=0, min_spatial_segment_delay≠0) is set to a value of a first set of possible values, use the value of the long-term syntax element structure to determine the inter-layer offset in advance for a predetermined time period measuring the inter-layer offset in units of spatial segments of the pictures of the first layer and periodically determine, in time intervals smaller than the predetermined time period, sizes and locations of the spatial segments of the pictures of the first layer and the spatial segments of the pictures of the second layer, and spatial sampling resolutions of the pictures of the first layer and the pictures of the second layer, respectively, based on short-term syntax elements of the of the multi-layer video data stream;

If the long-term syntax element structure is set to a value of a second set (e.g., min_spatial_segment_delay=0) of possible values disjoint to the first set of possible values, periodically determine, in time intervals smaller than the predetermined time period, the inter-layer offset within the predetermined period based on the short-term syntax elements of the of the multi-layer video data stream; and If the long-term syntax element is set to a value of a third set (e.g., ctb_delay_enabled_flag=1, min_spatial_segment_delay≠0) of possible values disjoint to the first and second sets of possible values, perform the determination of the inter-layer offset in units of the first blocks and the periodical determination of the sizes and locations of the first blocks of the pictures of the first layer and the second blocks of the pictures of the second layer, and spatial sampling resolutions of the pictures of the first layer and the pictures of the second layer, respectively.

A sixty-fifth aspect concerns the video decoder of aspect 63 or 64, wherein the video decoder supports parallel decoding the multi-layer video data stream in sub-streams out of which pictures of the layers are partitioned and which are composed of rows of the first and second blocks, using wavefront parallel processing by sequentially traversing the substreams in a temporally overlapping manner with an intra-picture inter-substream delay between the traversal of immediately consecutive substreams of the same picture and an inter-layer offset between the traversal of substreams of pictures of the first layer relative to the traversal of substreams of pictures of the second layer.

A sixty-sixth aspect concerns the video decoder according to any of aspects 64 to 65, wherein the long-term syntax element structure comprises a unit flag (c.p., exemplarily, ctb_delay_enabled_flag) and a delay indicator (c.p., exemplarily, min_spatial_segment_delay), wherein the video decoder is configured to, in inspecting the long-term syntax element structure, inspect the delay indicator to determine as to whether the same is set to zero or not, if the delay indicator is set to zero, determining that the value of the long-term syntax element structure is set to a value of the second set, and if the delay indicator is set to a non-zero value, use the non-zero value to determine the value of the long-term syntax element structure and determine that the value of the long-term syntax element structure is set to a value of the first set if the unit flag is zero, and that the value of the long-term syntax element structure is set to a value of the third set if the unit flag is one.

A sixty-seventh aspect concerns the video decoder according to any of aspects 65 to 66, configured to rely on the inter-layer offset in commencing parallel decoding first and second layer.

A sixty-eighth aspect concerns the video decoder according to any of aspects 62 to 67, configured to check as to whether a numbers of spatial segments or coding blocks of the first layer have been decoded completely with the number s uniquely depending on the syntax element structure, and defer commencing decoding the second layer during decoding the first layer unless the check reveals that, among spatial segments or coding blocks of the first layer, at least s have been decoded completely.

A sixty-ninth aspect concerns the video decoder according to any of aspects 62 to 68, configured to rely on the inter-layer offset in commencing, and completely processing, parallel decoding first and second layer.

A seventieth aspect concerns the video decoder according to any of aspects 62 to 69, configured to check as to whether a numbers of spatial segments or coding blocks of the first layer have been decoded completely with the numbers uniquely depending on the syntax element structure and a number t-1 of already decoded spatial segments or coding blocks of the second layer, and defer commencing decoding ant-th spatial segment or coding block of the second layer during decoding the first layer unless the check reveals that, among spatial segments or coding blocks of the first layer, at least s have been decoded completely.

A seventy-first aspect concerns a method for decoding a multi-layer video data stream 40 into which a scene is coded in a hierarchy of layers using inter-layer prediction from a first layer to a second layer, the video decoder supporting parallel decoding the multi-layer video data stream in spatial segments 80 into which pictures 12, 15 of the layers are sub-divided, wherein the method comprises inspecting a long-term syntax element structure (606; e.g. tile_boundaries_aligned_flag) of the multi-layer video data stream so as to interpreting the long-term syntax element structure assuming a value out of a first possible-values-set (e.g. tile_boundaries_aligned_flag=1), as a guarantee that, during a predetermined time period 608, the pictures 15 of the second layer are subdivided so that borders between the spatial segments of the pictures of the second layer overlay every border of the spatial segments of the pictures 12 of the first layer and periodically determining, in time intervals 604 smaller than the predetermined time period, the subdivision of the pictures of the first layer and the second layer into the spatial segments based on short-term syntax elements (602; e.g. column_width_minus1[i] and column_width_minus1[i]) of the multi-layer video data stream, and if the long-term syntax element structure has assumed a value out of a second possible-values-set (e.g. tile_boundaries_aligned_flag=0), periodically determining, in the time intervals smaller than the predetermined time period, the subdivision of the pictures of the layers into the spatial segments from the short-term syntax elements of the multi-layer video data stream such that, at least for a first possible value of the short-term syntax elements, there exists a border between the spatial segments of the pictures of the second layer not overlaying any of the borders of the spatial segments of the first layer, and, at least for a second possible value of the short-term syntax elements, borders between the spatial segments of the pictures of the second layer overlay every border of the spatial segments of the first layer.

A seventy-second aspect concerns a method for encoding a scene into a multi-layer video data stream in a hierarchy of layers using inter-layer prediction from a first layer to a second layer so that the multi-layer video data stream is decodable in parallel in spatial segments into which pictures of the layers are sub-divided, wherein the method comprises inserting a long-term syntax element structure 606 and short-term syntax elements 602 into the multi-layer video data stream, the short-term syntax elements defining, in time intervals, the subdivision of the pictures of the first layer and the second layer into the spatial segments, and switching between setting the long-term syntax element structure to a value out of a first possible-values-set with, during a predetermined time period 608 greater than the time intervals, setting the short-term syntax elements to a proper subset out of a set of possible settings, the proper subset being chosen so that, during the predetermined time period, the pictures of the second layer are subdivided so that borders between the spatial segments of the pictures of the second layer overlay every border of the spatial segments of the first layer, or a value out of a second possible-values-set with, during the predetermined time period, setting the short-term syntax elements to any of the set of possible settings, the set of possible settings encompassing at least one setting according to which a border exists between the spatial segments of the pictures of the second layer not overlaying any of the borders of the spatial segments of the first layer, and at least another setting according to which borders between the spatial segments of the pictures of the second layer overlay every border of the spatial segments of the first layer.

A seventy-third aspect concerns a method for decoding a spatially scalable bitstream 40 into which a picture is coded in different spatial layers and, for at least one of the spatial layers, in first spatial segments, wherein the method comprises upsampling a picture 12 of a first spatial layer so as to obtain an upsampled reference picture and predict a picture 15 of a second spatial layer using the upsampled reference picture, wherein the method for decoding is responsive to a syntax element (616; e.g., independent_tile_upsampling_idc) in the spatially scalable bitstream so as to, depending on the syntax element, interpolate 620 the picture of the first spatial layer such that any partition of a partitioning 622 of the upsampled reference picture, which depends on the first spatial segments, is independent from portions of the picture of the first spatial layer covered by any of the other partitions of the partitioning, or such that any partition of the partitioning 622 of the upsampled reference picture is dependent on portions of the picture of the first spatial layer covered by another partition of the partitioning spatially neighbouring the respective partition.

A seventy-fourth aspect concerns a method for encoding a picture into a spatially scalable bitstream in different spatial layers and, for at least one of the spatial layers, in first spatial segments, wherein the method comprises upsampling a picture of a first spatial layer so as to obtain an upsampled reference picture and predict a picture of a second spatial layer using the upsampled reference picture, wherein the method comprises setting and inserting a syntax element 606 into the spatially scalable bitstream and, depending on the syntax element, interpolating the picture of the first spatial layer such that any partition of a partitioning of the upsampled reference picture, which depends on the first spatial segments, is independent from portions of the picture of the first spatial layer covered by any of the other partitions of the partitioning, or such that any partition of the partitioning of the upsampled reference picture is dependent on portions of the picture of the first spatial layer covered by another partition of the partitioning spatially neighbouring the respective partition.

A seventy-fifth aspect concerns a method for decoding a multi-layer video data stream into which a scene is coded in a hierarchy of layers using inter-layer prediction from a first layer to a second layer, the video decoder supporting parallel decoding the multi-layer video data stream in spatial segments into which pictures of the layers are partitioned by sequentially traversing the spatial segments in a temporally overlapping manner with an inter-layer delay between the traversal of spatial segments of pictures of the first layer relative to the traversal of spatial segments of pictures of the second layer, the method comprises inspecting a long-term syntax element structure (642; e.g. min_spatial_segment_delay) of the multi-layer video data stream so as to if the long-term syntax element structure (e.g. min_spatial_segment_delay≠0) is set to a value of a first set of possible values, using the value of the long-term syntax element to determine the inter-layer offset in advance for a predetermined time period and periodically determining, in time intervals smaller than the predetermined time period, sizes and locations of the spatial segments of the pictures of the first layer and the spatial segments of the pictures of the second layer, and spatial sampling resolutions of the pictures of the first layer and the pictures of the second layer, respectively, based on short-term syntax elements 602 of the of the multi-layer video data stream;

if the long-term syntax element is set to a value of a second set (e.g. min_spatial_segment_delay=0) of possible values disjoint to the first set of possible values, periodically determining, in time intervals smaller than the predetermined time period, the inter-layer offset within the predetermined period based on the short-term syntax elements of the of the multi-layer video data stream.

A seventy-sixth aspect concerns a method for encoding a scene into a multi-layer video data stream in a hierarchy of layers using inter-layer prediction from a first layer to a second layer such that the multi-layer video data stream is decodable in spatial segments into which pictures of the layers are partitioned by sequentially traversing the spatial segments in a temporally overlapping manner with an inter-layer offset between the traversal of spatial segments of pictures of the first layer relative to the traversal of spatial segments of pictures of the second layer, the method comprising Inserting and setting a long-term syntax element structure (min_spatial_segment_delay) and short-term syntax elements into the multi-layer video data stream, the short-term syntax elements of the of the multi-layer video data stream defining, in a periodical basis, in time intervals, sizes and locations of the spatial segments of the pictures of the first layer and the spatial segments of the pictures of the second layer, and spatial sampling resolutions of the pictures of the first layer and the pictures of the second layer, respectively, wherein the method comprises switching between setting the long-term syntax element structure (min_spatial_segment_delay≠0) to a value of a first set of possible values, with the value signaling the inter-layer offset for a predetermined time period greater than the time intervals, with, for the predetermined time period, setting the short-term syntax elements to a proper subset out of a set of possible settings, the proper subset being chosen so that, during the predetermined time period, the sizes and the locations of the spatial segments of the pictures of the first layer and the spatial segments of the pictures of the second layer, and the spatial sampling resolutions of the pictures of the first layer and the pictures of the second layer, respectively, enable decoding the multi-layer video data stream by sequentially traversing the spatial segments in the temporally overlapping manner with an actual inter-layer offset which is smaller than or equal to the inter-layer offset signaled by the long-term syntax element, between the traversal of spatial segments of pictures of the first layer relative to the traversal of spatial segments of pictures of the second layer;

the long-term syntax element to a value of a second set (min_spatial_segment_delay=0) of possible values disjoint to the first set of possible values, with, during the predetermined time period, setting the short-term syntax elements to any of the set of possible settings, the set of possible settings encompassing at least one setting according to which the sizes and the locations of the spatial segments of the pictures of the first layer and the spatial segments of the pictures of the second layer, and the spatial sampling resolutions of the pictures of the first layer and the pictures of the second layer, respectively, disable decoding the multi-layer video data stream by sequentially traversing the spatial segments in the temporally overlapping manner with an actual inter-layer offset which is smaller than or equal to the inter-layer offset signaled by the long-term syntax element, between the traversal of spatial segments of pictures of the first layer relative to the traversal of spatial segments of pictures of the second layer, and at least another setting according to which the sizes and the locations of the spatial segments of the pictures of the first layer and the spatial segments of the pictures of the second layer, and the spatial sampling resolutions of the pictures of the first layer and the pictures of the second layer, respectively, enable decoding the multi-layer video data stream by sequentially traversing the spatial segments in the temporally overlapping manner with an actual inter-layer offset which is smaller than or equal to the inter-layer offset signaled by the long-term syntax element, between the traversal of spatial segments of pictures of the first layer relative to the traversal of spatial segments of pictures of the second layer.

A seventy-seventh aspect concerns a method for processing a multi-layer video data stream into which a scene is coded in layers so that, in each layer, the scene is coded in a different operational point of a scalability space spanned by scalability dimensions, wherein the multi-layer video data stream is composed of first NAL units each of which as associated with one of the layers, and second NAL units interspersed within the first NAL units and presenting general information on the multi-layer video data stream, the method comprising inspecting a type indicator field (696, e.g. dedicated_scalability_ids_flag) in the second NAL units;

if the type indicator field has a first state (e.g. dedicated_scalability_ids_flag=0), reading mapping information (e.g. layer_id_in_nuh[i], dimension_id[i][j]) mapping possible values of a layer indicator field (e.g. layer_id) in the first NAL unit headers to the operational points from the second NAL units and associate the first NAL units with the operational points in the first NAL units via the layer indicator field and the mapping information;

if the type indicator field has a second state (dedicated_scalability_ids_flag=1), associating the first NAL units with the operational points by splitting the layer indicator field in the first NAL units into more than one portion and locating the operational point of the first NAL units by using the values of the portions as coordinates of a vector within the scalability space.

A seventy-eighth aspect concerns a method for encoding a scene into a multi-layer video data stream in layers so that, in each layer, the scene is coded in a different operational point of a scalability space spanned by scalability dimensions, wherein the multi-layer video data stream is composed of first NAL units each of which as associated with one of the layers, and second NAL units interspersed within the first NAL units and presenting general information on the multi-layer video data stream, the method comprising inserting a type indicator field into the second NAL units and switching between setting the type indicator field such that same has a first state, with inserting mapping information mapping possible values of a layer indicator field in the first NAL unit headers to the operational points into the second NAL units and setting the layer indicator filed in the first NAL units such that the first NAL units' operational points are associated with the respective layer indicator field via the mapping information;

the type indicator field such that same has a second state (dedicated_scalability_ids_flag=1), with setting the layer indicator field in the first NAL units by splitting the layer indicator field in the first NAL units into more than one portion and setting the more than portion so that the values of the portions correspond to coordinates of a vector within the scalability space, pointing to the operational point associated with the respective first NAL unit.

A seventy-ninth aspect concerns a method for subjecting a multi-layer video data stream into which a scene is coded in layers, to decoding by a multi-standard multi-layer decoder, wherein the multi-layer video data stream is composed of NAL units each of which is associated with one of the layers, wherein the layers are associated with different codecs so that, for each layer, the NAL units associated with the respective layer are coded using the codec with which the respective layer is associated, the method comprises identifying, for each NAL unit, as to which codec same is associated with, and handing over the NAL units of the multi-layer video data stream to the multi-standard multi-layer decoder which uses inter-layer prediction between layers associated with different codecs to decode the multi-layer video data stream.

An eightieth aspect concerns a method for decoding a multi-layer video data stream into which a scene is coded in a hierarchy of layers using inter-layer prediction from portions of a first layer to co-located portions of a second layer, wherein pictures of the first layer are sub-divided into an array of first blocks and pictures of the second layer are sub-divided into an array of second blocks, wherein a raster scan decoding order is defined among the first blocks and the second blocks, respectively, the method comprises determining, depending on a syntax element structure (e.g., ctb_delay_enabled_flag, min_spatial_segment_delay) of the multi-layer video data stream, an inter-layer offset for parallel decoding the pictures of the first and second layers by sequentially traversing the first and second blocks in a temporally overlapping manner with the inter-layer offset between the traversal of first blocks of pictures of the first layer relative to the traversal of spatial second blocks of pictures of the second layer, measured in units of the first blocks.

An eighty-first aspect concerns a computer program having a program code for performing, when running on a computer, a method according to any of aspects 71 to 80.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A video decoder for decoding a multi-layer video data stream into which a video is coded in layers, wherein the video decoder is configured for decoding the multi-layer video data stream in accordance with spatial segments derived by sub-dividing pictures of the video, the video decoder comprising:

an entropy decoder configured for, with respect to a spatial segment of a picture related to a first layer or a second layer of the layers, entropy decoding data from the multi-layer video data stream to obtain residual data and a coding parameter;

a predictor configured for generating a prediction signal associated with the spatial segment based at least on the coding parameter; and a combiner configured for combining the prediction signal and the residual data to reconstruct a portion of the picture, wherein the video decoder is configured for determining subdivision of pictures of the first and second layers by decoding a long-term syntax element and a short-term syntax element from the multi-layer video data stream, wherein the long-term syntax element having a first value indicates that a picture of the second layer is subdivided in a manner that at least one of the spatial segments of the picture of the second layer is spatially aligned with a corresponding one of the spatial segments of a picture of the first layer, and determining the subdivision of the pictures of the first layer and the second layer into their respective spatial segments based on the short-term syntax element.

2. The video decoder according to claim 1, wherein the video decoder is configured for decoding the pictures of the first or second layer using intra-picture spatial prediction with disrupting the intra-picture spatial prediction for each spatial segment at a boundary of the respective spatial segment, or decoding the pictures of the layers using intra-picture spatial prediction by decoding the spatial segments of a picture of the first layer in parallel with supporting the intra-picture spatial prediction crossing boundaries of the spatial segments of the picture of the first layer and obeying a decoding delay between the decoding of the spatial segments of the picture of the first layer, and by decoding the spatial segments of a picture of the second layer in parallel with supporting the intra-picture spatial prediction crossing boundaries of the spatial segments of the picture of the second layer and obeying a decoding delay between the decoding of the spatial segments of the picture of the second layer.

3. The video decoder according to claim 1, wherein the spatial segments into which the pictures are sub-divided include tiles.

4. The video decoder according to claim 3, wherein the video decoder is configured for decoding the pictures of the layers using intra-picture spatial prediction with disrupting the intra-picture spatial prediction for each tile at a boundary of the respective tile.

5. The video decoder according to claim 1, wherein each spatial segment of the picture of the first layer is made up of exactly n spatial segments of the picture of second layer with n depending on the value of the long-term syntax element, and if the long-term syntax element has a second value, the video decoder is configured for determining, in time intervals smaller than a predetermined time period, an inter-layer offset within the predetermined time period based on the short-term syntax element.

6. The video decoder according to claim 1, wherein the video decoder is configured to start decoding the second layer of the multi-layer video data stream depending on the value of the long-term syntax element.

7. The video decoder according to claim 1, wherein the video decoder is a hybrid video decoder.

8. The video decoder according to claim 1, wherein the long-term syntax element having the first value indicates that, during a predetermined time period, the picture of the second layer is subdivided such that borders between the spatial segments of the picture of the second layer overlay every border of the spatial segments of the picture of the first layer.

9. A video encoder for encoding a video into a multi-layer video data stream in layers so that the multi-layer video data stream is decodable in accordance with spatial segments derived by sub-dividing pictures of the video, the video encoder comprising:

a predictor configured for generating, with respect to a spatial segment of a picture related to a first layer or a second layer of the layers, a prediction signal based on a coding parameter;

a residual determiner configured for determining residual data associated with the spatial segment of the picture; and an entropy encoder configured for entropy encoding the coding parameter and the residual data into the multi-layer video data stream, wherein the video encoder is configured for signaling subdivision of pictures of the first and second layers by inserting a long-term syntax element and a short-term syntax element into the multi-layer video data stream, the long-term syntax element having a first value indicates that a picture of the second layer is subdivided in a manner that at least one of the spatial segments of the picture of the second layer is spatially aligned with a corresponding one of the spatial segments of the picture of the first layer, and the short-term syntax element defining the subdivision of the pictures of the first layer and the second layer into their respective spatial segments.

10. The video encoder according to claim 9, wherein the video encoder is configured for encoding the pictures of the first or second layer using intra-picture spatial prediction with disrupting the intra-picture spatial prediction for each spatial segment at a boundary of the respective spatial segment, or encoding the pictures of the layers using intra-picture spatial prediction and entropy encoding with adapting entropy context probabilities, by supporting the intra-picture spatial prediction crossing boundaries of the spatial segments of a picture of the first layer and initializing the entropy context probabilities for the entropy encoding of the subsets of the spatial segments of the picture of the first layer individually or under adopting the entropy context probabilities of a, in accordance with an order among the subsets, previous subset of the spatial segments of the picture of the first layer at an intermediately adapted state, and by supporting the intra-picture spatial prediction crossing boundaries of the spatial segments of a picture of the second layer and initializing the entropy context probabilities for the entropy encoding of the subsets of the spatial segments of the picture of the second layer individually or under adopting the entropy context probabilities of a, in accordance with an order among the subsets, previous subset of the spatial segments of the picture of the second layer at an intermediately adapted state.

11. The video encoder according to claim 9, wherein the spatial segments include tiles.

12. The video encoder according to claim 11, wherein the video encoder is configured for encoding the pictures of the layers using intra-picture spatial prediction with disrupting the intra-picture spatial prediction for each tile at a boundary of the respective tile.

13. The video encoder according to claim 9, wherein when the long-term syntax element is set to the first value, each spatial segment of the picture of the first layer is made up of exactly n spatial segments of the picture of second layer with n depending on the value of the long-term syntax element.

14. The video encoder according to claim 9, wherein the long-term syntax element having the first value indicates that, during a predetermined time period, the picture of the second layer is subdivided such that borders between the spatial segments of the picture of the second layer overlay every border of the spatial segments of the picture of the first layer.

15. A non-transitory computer-readable medium for storing video data, comprising:
- a data stream stored in the non-transitory computer-readable medium and comprising a multi-layer video data stream into which a video is coded in layers, the decoding of the multi-layer video data stream being performed in accordance with spatial segments derived by sub-dividing pictures of the video by executing operations using a processor, the operations including:
- entropy decoding data from the multi-layer video data stream to obtain, with respect to a spatial segment of a picture of a first layer or a second layer of the layers, residual data and a coding parameter;
- generating a prediction signal associated with the spatial segment based at least on the coding parameter;
- combining the prediction signal and the residual data to reconstruct a portion of the picture; and
- determining subdivision of pictures of the first and second layers by
- decoding a long-term syntax element and a short-term syntax element from the multi-layer video data stream, wherein the long-term syntax element having a first value indicates that a picture of the second layer is subdivided in a manner that at least one of the spatial segments of the picture of the second layer is spatially aligned with a corresponding one of the spatial segments of a picture of the first layer, and
- determining the subdivision of the pictures of the first layer and the second layer into their respective spatial segments based on the short-term syntax element.

16. The non-transitory computer-readable medium according to claim 15, the operations further including:
- decoding the pictures of the first or second layer using intra-picture spatial prediction with disrupting the intra-picture spatial prediction for each spatial segment at a boundary of the respective spatial segment, or
- decoding the pictures of the layers using intra-picture spatial prediction by decoding the spatial segments of a picture of the first layer in parallel with supporting the intra-picture spatial prediction crossing boundaries of the spatial segments of the picture of the first layer and obeying a decoding delay between the decoding of the spatial segments of the picture of the first layer, and by decoding the spatial segments of a picture of the second layer in parallel with supporting the intra-picture spatial prediction crossing boundaries of the spatial segments of the picture of the second layer and obeying a decoding delay between the decoding of the spatial segments of the picture of the second layer.

17. The non-transitory computer-readable medium according to claim 15, wherein the spatial segments into which the pictures are sub-divided include tiles.

18. The non-transitory computer-readable medium according to claim 17, the operations further including decoding the pictures of the layers using intra-picture spatial prediction with disrupting the intra-picture spatial prediction for each tile at a boundary of the respective tile.

19. The non-transitory computer-readable medium according to claim 15, wherein each spatial segment of the picture of the first layer is made up of exactly n spatial segments of the picture of second layer with n depending on the value of the long-term syntax element.

20. The non-transitory computer-readable medium according to claim 15, wherein the long-term syntax element having the first value indicates that, during a predetermined time period, the picture of the second layer is subdivided such that borders between the spatial segments of the picture of the second layer overlay every border of the spatial segments of the picture of the first layer.

* * * * *